United States Patent
Lotter et al.

(10) Patent No.: US 11,089,110 B2
(45) Date of Patent: *Aug. 10, 2021

(54) MOBILE COMMUNICATION DEVICE MONITORING SYSTEMS AND METHODS

(71) Applicant: eAgency, Inc., Newport Beach, CA (US)

(72) Inventors: Robert A. Lotter, Las Vegas, NV (US); Timothy S. Allard, Sheridan, OR (US)

(73) Assignee: eAgency, Inc., Newport Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/752,572

(22) Filed: Jan. 24, 2020

(65) Prior Publication Data

US 2020/0374349 A1    Nov. 26, 2020

Related U.S. Application Data

(63) Continuation of application No. 16/056,460, filed on Aug. 6, 2018, now Pat. No. 10,547,687, which is a
(Continued)

(51) Int. Cl.
*H04L 29/08*  (2006.01)
*H04M 15/00*  (2006.01)
(Continued)

(52) U.S. Cl.
CPC ......... *H04L 67/125* (2013.01); *G06Q 50/188* (2013.01); *H04L 9/0637* (2013.01);
(Continued)

(58) Field of Classification Search
CPC ..... H04L 67/125; H04L 67/22; H04L 9/0637; H04L 9/3236; H04L 2209/38;
(Continued)

(56) References Cited

U.S. PATENT DOCUMENTS

| | | | | |
|---|---|---|---|---|
| 6,959,182 B2 * | 10/2005 | Lingafeldt | ........... | H04M 11/002 379/111 |
| 2002/0143934 A1 * | 10/2002 | Barker | .................... | H04L 41/18 709/224 |

(Continued)

*Primary Examiner* — Mong-Thuy T Tran
(74) *Attorney, Agent, or Firm* — Haynes and Boone, LLP

(57) ABSTRACT

Systems and methods are directed to monitoring the communications to and from a mobile communication device in accordance with one or more embodiments. For example in accordance with an embodiment, data services a mobile communication device's applications may be monitored against smart contracts stored in a central data center repository and/or written to a blockchain. Other data services may include all forms of communications between the mobile communication device and a third party along with changes to application or data within the mobile communication device. Monitoring the mobile communication device may be done to determine compliance with the smart contracts and whether a penalty or reward on device usage should be applied.

34 Claims, 39 Drawing Sheets

Related U.S. Application Data continuation-in-part of application No. 15/138,174, filed on Apr. 25, 2016, now Pat. No. 10,045,327, which is a continuation-in-part of application No. 14/228,040, filed on Mar. 27, 2014, now Pat. No. 9,324,074, which is a continuation-in-part of application No. 13/405,907, filed on Feb. 27, 2012, now Pat. No. 8,712,396, which is a continuation-in-part of application No. 12/014,494, filed on Jan. 15, 2008, now Pat. No. 8,126,456, which is a continuation-in-part of application No. 11/695,500, filed on Apr. 2, 2007, now Pat. No. 7,996,005.

(60) Provisional application No. 60/885,384, filed on Jan. 17, 2007.

(51) Int. Cl.
| | |
|---|---|
| *H04L 9/06* | (2006.01) |
| *G06Q 50/18* | (2012.01) |
| *H04M 15/30* | (2006.01) |
| *H04W 4/24* | (2018.01) |
| *H04L 9/32* | (2006.01) |
| *H04M 15/28* | (2006.01) |
| *H04M 1/72463* | (2021.01) |
| *H04W 12/37* | (2021.01) |
| *H04M 1/67* | (2006.01) |

(52) U.S. Cl.
CPC ............ *H04L 9/3236* (2013.01); *H04L 67/22* (2013.01); *H04M 1/72463* (2021.01); *H04M 15/00* (2013.01); *H04M 15/28* (2013.01); *H04M 15/30* (2013.01); *H04M 15/41* (2013.01); *H04W 4/24* (2013.01); *H04W 12/37* (2021.01); *H04L 2209/38* (2013.01); *H04L 2209/56* (2013.01); *H04M 1/67* (2013.01)

(58) Field of Classification Search
CPC ........... H04L 2209/56; H04W 12/0027; G06Q 50/188; H04M 1/72577; H04M 1/67; H04M 15/00; H04M 15/28; H04M 15/30; H04M 15/41; H04M 4/24
USPC .......................................................... 455/410
See application file for complete search history.

(56) References Cited

U.S. PATENT DOCUMENTS

| | | | |
|---|---|---|---|
| 2003/0076941 A1* | 4/2003 | Tiliks | H04M 3/38 379/196 |
| 2005/0003804 A1* | 1/2005 | Huomo | H04W 4/50 455/414.1 |
| 2005/0086255 A1* | 4/2005 | Schran | H04L 67/22 |
| 2005/0260973 A1* | 11/2005 | van de Groenendaal | H04M 1/67 455/411 |
| 2006/0114832 A1* | 6/2006 | Hamilton | H04L 67/14 370/244 |
| 2006/0181411 A1* | 8/2006 | Fast | G01S 5/0018 340/539.13 |
| 2006/0209809 A1* | 9/2006 | Ellingham | H04L 63/306 370/356 |
| 2007/0061451 A1* | 3/2007 | Villado | H04L 63/1408 709/224 |
| 2007/0143472 A1* | 6/2007 | Clark | H04L 43/00 709/224 |
| 2008/0005319 A1* | 1/2008 | Anderholm | H04L 41/0866 709/224 |
| 2008/0009268 A1* | 1/2008 | Ramer | G06F 16/9535 455/412.1 |
| 2008/0014869 A1* | 1/2008 | Demirbasa | H04W 12/082 455/41.2 |
| 2008/0168135 A1* | 7/2008 | Redlich | G06F 21/6218 709/204 |

* cited by examiner

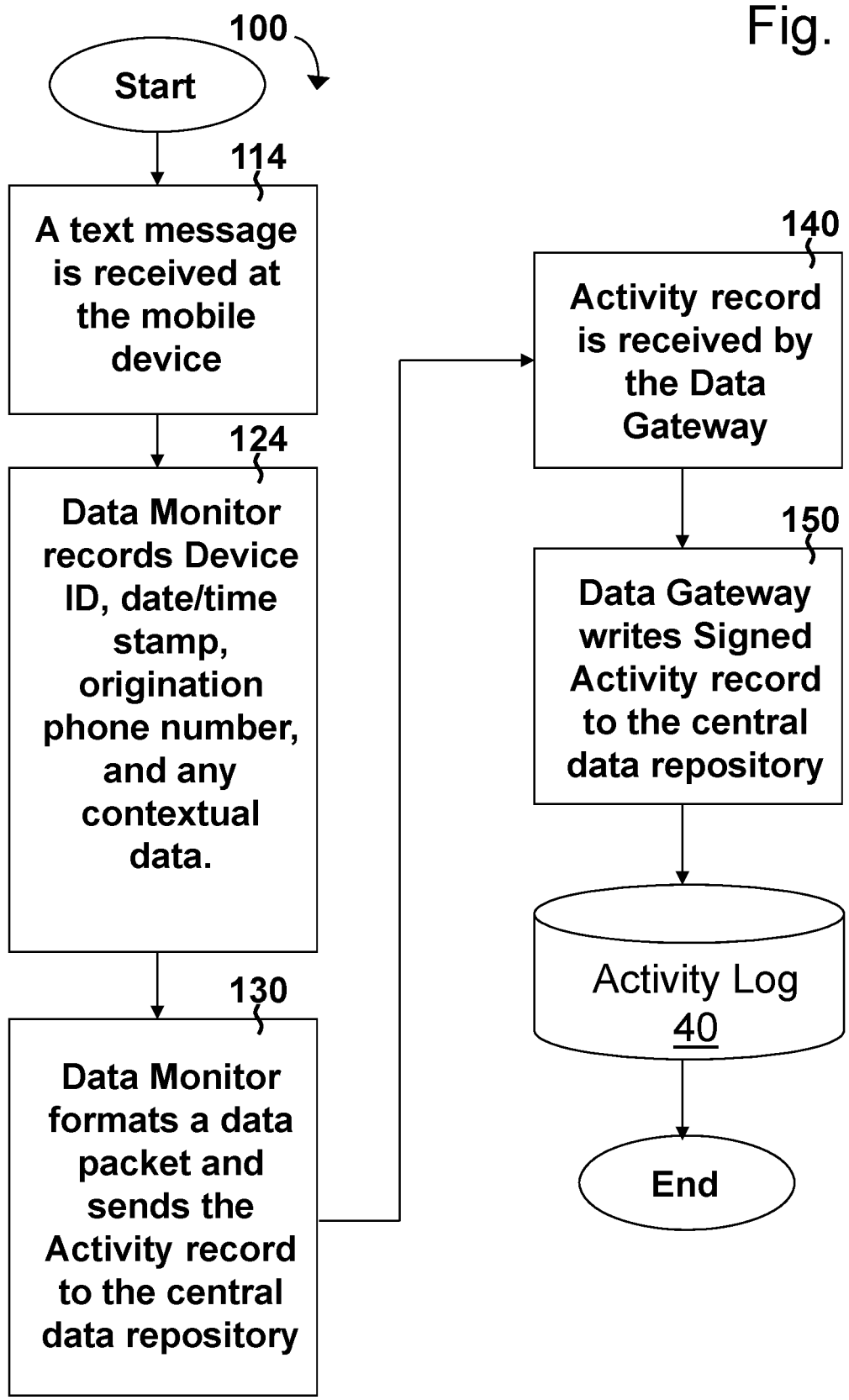

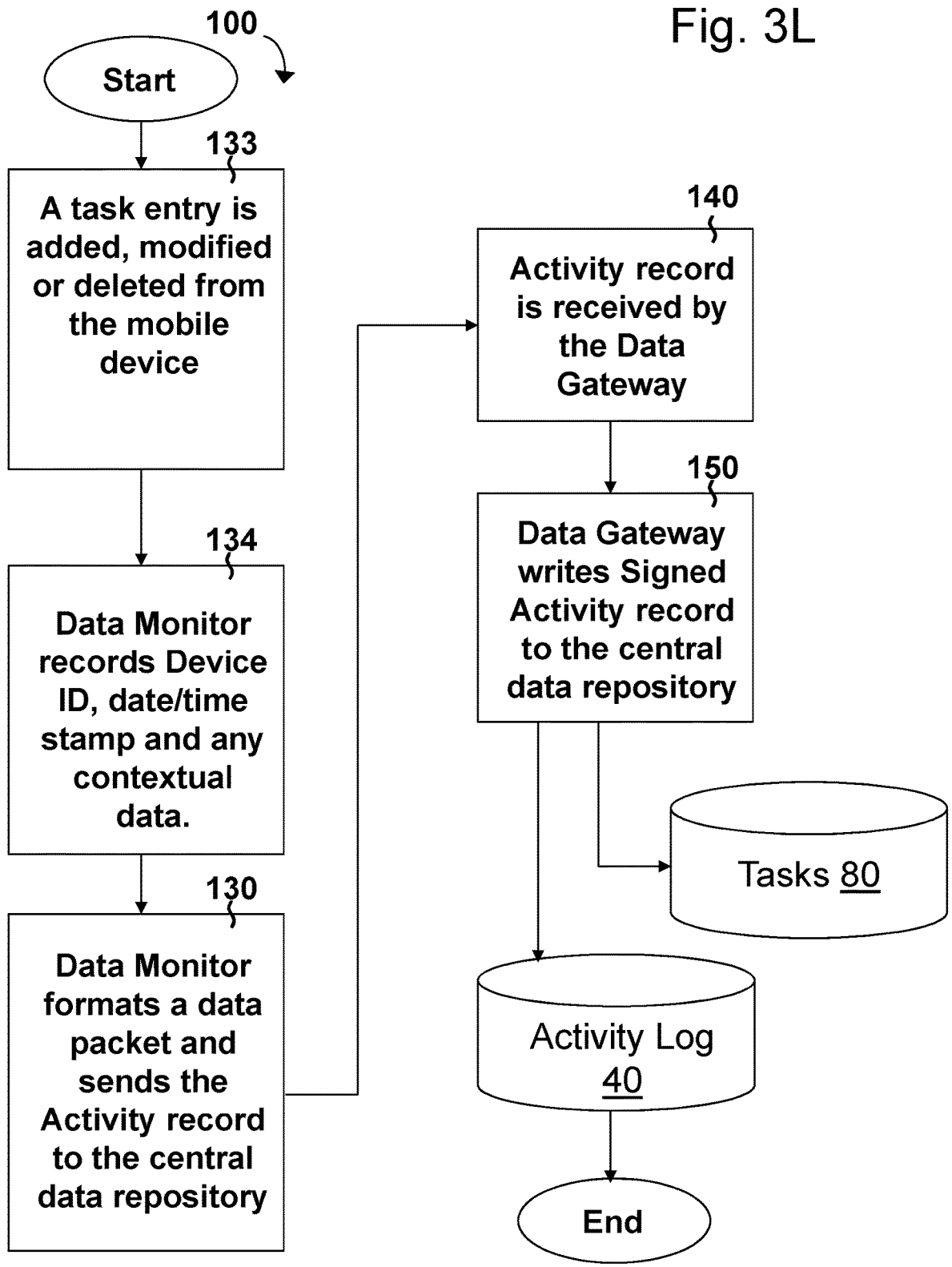

Fig. 4A

Activity Log 40

| Record ID | Account ID | Message Type | In/Out | Start Time | End Time | CallerID | Log |
|---|---|---|---|---|---|---|---|
| 100 | 200 | Wallet | In | 23:51:01 1/1/2007 | | John Doe | $28.50 – Debit Card 1 |
| 101 | 200 | Phone | Out | 22:42:01 1/1/2007 | 22:45:56 1/1/2007 | 213-555-1212 | |
| 102 | 201 | SMS | In | 22:35:26 1/1/2007 | | 909-123-1234 | Meet me at 4… |
| 103 | 200 | Email | Out | 18:15:21 1/1/2007 | | john@acme.com | Want a better… |
| 104 | 202 | IM | Out | 16:12:09 1/1/2007 | | mypal12 | Hey John… |
| 105 | 202 | Phone | In | 14:20:12 1/1/2007 | 14:36:41 1/1/2007 | 605-852-9797 | |
| 106 | 203 | Email | In | 10:51:32 1/1/2007 | | alice@mx.com | Thanks for calling… |
| 107 | 210 | Game | | 10:51:32 1/1/2018 | 13:10:14 1/1/2018 | | |

Fig. 4B

Activity Log 40

| Record ID | Long | Lat | CRC | Auth | Auth ID | Carrier Log Auth |
|---|---|---|---|---|---|---|
| 100 | 33.6235 | 117.8644 | 132132 | Bio | 1101 | N/A |
| 101 | 58.1254 | 111.2154 | 321354 | Password | 1110 | ATT 1235468 |
| 102 | 14.2135 | 25.6448 | 31654 | N/A | N/A | Verizon 123546 |
| 103 | 94.6548 | 96.3215 | 65465496 | Password | 1101 | Rogers 2165468 |
| 104 | 15.1245 | 11.2154 | 2135468 | Bio | 1221 | N/A |
| 105 | 13.2154 | 52.3164 | 3213546 | Bio | 1385 | Sprint 54687978 |
| 106 | 23.1524 | 94.2546 | 032165 | Bio | 2546 | AllTel 24657685 |

Fig. 5A

Permissions 50

| Permission ID | Account ID | Data Service | Allow | Constraint | Alert Type | Alert Number |
|---|---|---|---|---|---|---|
| 100 | 200 | Email | True | | Email | alice@acme.com |
| 101 | 200 | Phone | True | | SMS | 909-123-1234 |
| 102 | 200 | SMS | False | | Email | alice@acme.com |
| 103 | 200 | Email | True | Block asmith@gmail.com | Email | joe@abc.com; alice@acme.com |
| 104 | 201 | Email | True | | SMS | 605-852-9797 |
| 105 | 201 | IM | False | | Log | 605-852-9797 |
| 106 | 201 | SMS | True | | Email | john@mx.com |
| 107 | 202 | Wallet | True | | SMS | 987-123-1234 |
| 108 | 200 | Game | True | 10 hrs/Wk | Log | |

Fig. 5B

Permissions 50

| Scenario ID | Account ID | Name |
|---|---|---|
| 300 | 200 | Sally's Rules |
| 301 | 201 | John Restriction |
| 302 | 202 | Billy Bedtime |
| 303 | 203 | Alice |
| 304 | 203 | Susie |
| 305 | 203 | Alex |
| 306 | 204 | Mallory |

Fig. 5C

Permissions 50

| Record ID | Scenario ID | Account ID | Permission ID | Desc |
|---|---|---|---|---|
| 1000 | 300 | 200 | 102 | Block SMS |
| 1001 | 300 | 200 | 103 | Block aamil@aaaaa.com |
| 1002 | 300 | 200 | 108 | Limit Gaming 10/hrs |
| 1003 | 301 | 201 | 104 | Allow Email |
| 1004 | 301 | 201 | 105 | Block IM |
| 1005 | 301 | 201 | 106 | Allow SMS |
| 1006 | 302 | 202 | 107 | Allow Wallet |
| 1007 | 302 | 202 | 123 | Limit Facebook® 5/hrs |

Fig. 5D

Permissions 50

| Record ID | Scenario ID | Results | Interval | Data Service | Action | Value |
|---|---|---|---|---|---|---|
| 100 | 300 | Pass | Weekly | eWallet | Pay | 10 |
| 101 | 301 | Fail | Daily | eWallet | Deduct | -10 |
| 102 | 301 | Fail | Daily | Games | Block | 3d |
| 103 | 301 | Fail | Daily | Facebook | Block | 1w |
| 104 | 302 | Pass | On Demand | Games | Allow | 1w |

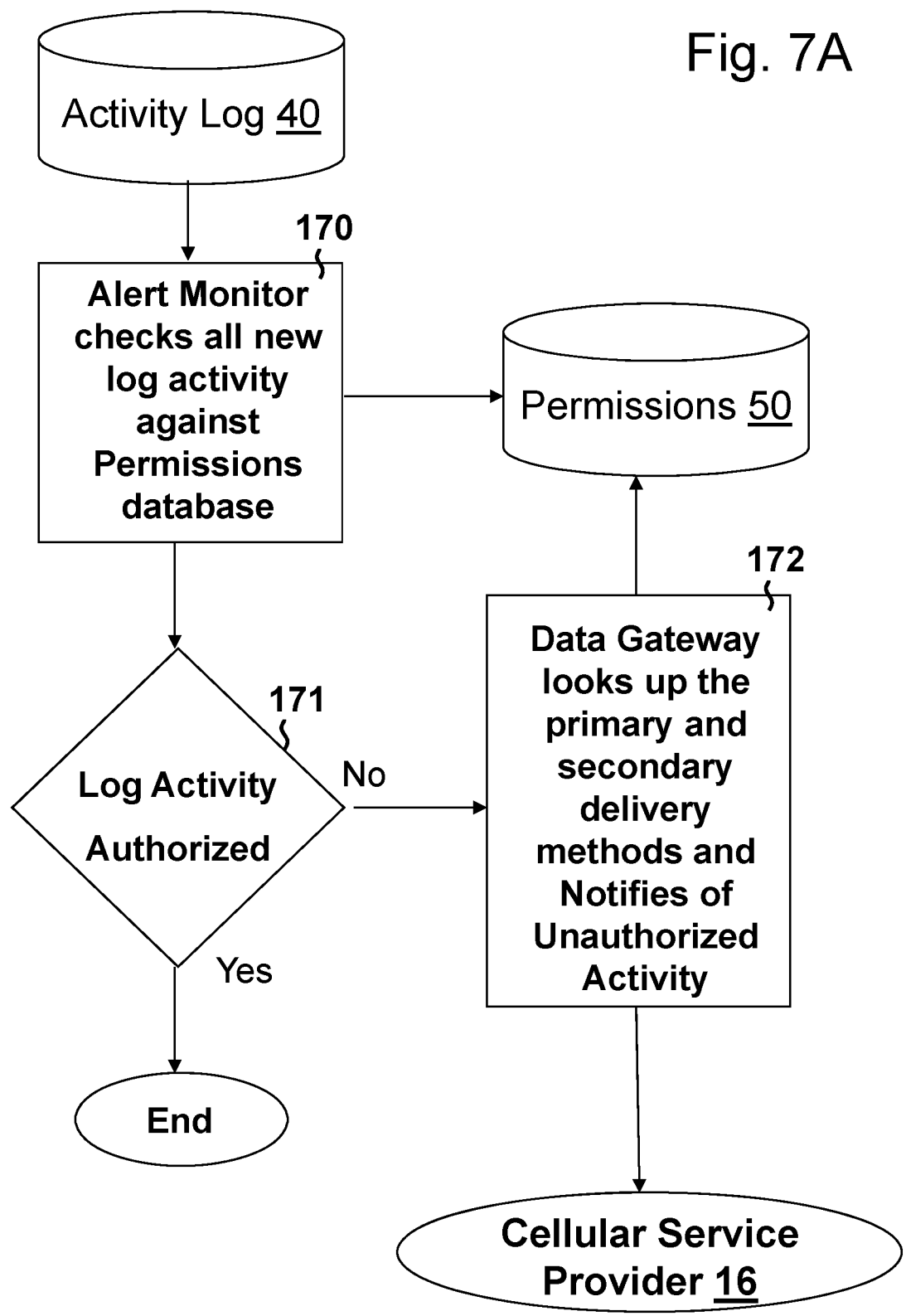

MOBILE COMMUNICATION DEVICE MONITORING SYSTEMS AND METHODS

CROSS-REFERENCE TO RELATED APPLICATIONS

This patent application is a Continuation patent application claiming priority to and the benefit of U.S. patent application Ser. No. 16/056,460 filed Aug. 6, 2018, which will issue as U.S. Pat. No. 10,547,687, which is a Continuation-In-Part patent application claiming priority to and the benefit of U.S. patent application Ser. No. 15/138,174 filed Apr. 25, 2016, now U.S. Pat. No. 10,045,327 issued Aug. 7, 2018, which is a Continuation-In-Part patent application claiming priority to and the benefit of U.S. patent application Ser. No. 14/228,040 filed Mar. 27, 2014, now U.S. Pat. No. 9,324,074 issued Apr. 26, 2016, which is a Continuation-In-Part patent application claiming priority to and the benefit of U.S. patent application Ser. No. 13/405,907 filed Feb. 27, 2012, now U.S. Pat. No. 8,712,396 issued Apr. 29, 2014, which is a Continuation-In-Part patent application claiming priority to and the benefit of U.S. patent application Ser. No. 12/014,494 filed Jan. 15, 2008, now U.S. Pat. No. 8,126,456 issued Feb. 28, 2012, which is a Continuation-In-Part patent application claiming priority to and the benefit of U.S. patent application Ser. No. 11/695,500 filed Apr. 2, 2007, now U.S. Pat. No. 7,996,005 issued Aug. 9, 2011, both of U.S. patent application Ser. No. 12/014,494 and U.S. patent application Ser. No. 11/695,500 claiming priority to and the benefit of U.S. Provisional Patent Application No. 60/885,384 filed Jan. 17, 2007, which are all incorporated herein by reference in their entirety.

TECHNICAL FIELD

The present invention relates generally to communication systems and, more particularly, to mobile communication devices and systems and methods for monitoring the communication devices.

BACKGROUND

Blockchains may be used to record data or records in a linked and secure manner. Blockchain records are secured through the use of a distributed computing system where each record is written to the blockchain and then duplicated and distributed among many computers. The individual computers that make up the blockchain network each individually record the data and reconcile the data. Moreover, each record block may include data for the previous block, thereby preventing manipulation of individual blocks without altering subsequent blocks. Thus, no single record or database exists to be corrupted by a hacker or other malicious party. For example, a record that is altered on one computer would not compare with other blockchain records and the retroactive altering of a record would further alter all subsequent blocks within the blockchain. This creates a digital ledger of records, which may include transactions or other data. Additionally, blockchain records allow individual users to view verified blockchain records and enforce transactions written to the record.

Currently, mobile communication devices allow a wide range of activities to be performed by users. This can range from activities used to transact business and/or access educational materials to more leisurely activities, such as social networking, messaging with friends or family, and/or gaming and other entertainment applications. Thus, in some situations, these technologies may allow undesirable access to a device, people, and content or undesirable use of the device by a user such as a child. Conventional systems provide only limited control of these types of undesirable activities and communication.

For example, conventional systems may be used to lock mobile device access to a certain type of use and/or application installation. In another example, some applications may control the content presented to an end user through the use of age classifications such as Teen, Mature, PG13, etc. However, this approach can be impractical for many reasons. For example, it is common for teens to state that they are older than they are to gain access to adult features on social networks and devices can be passed down from parent to child. More generally, the age of the end user is personally identifiable protected information that is heavily regulated by most governments. Moreover, parents or administrators of another device may wish to provide limited use to these applications as a reward or benefit for completion of specific goals, but may not want overuse. Thus, a blanket restriction on device usage may be impractical and unwanted.

Due to these limitations, the "agreements" between employer and employee or parent and child are for the most part verbal. Even though digital or smart contracts exist which can be recorded on a blockchain for autonomous execution of these agreements, there is currently no monitoring technology that stores, executes, verifies execution and/or imposes restrictions in accordance with the terms of these agreements associated with the use of mobile device.

There is thus a need in the art for improved systems and methods for monitoring device communications, application use, functionality, and presence in accordance with the terms of a smart contract.

SUMMARY

Systems, methods, and program products are disclosed, in accordance with one or more embodiments of the present invention, which are directed to monitoring device usage and communications in order to enforce smart contracts that are verified with a distributed computing architecture through a blockchain. The smart contracts may include permission rules linked together to form a permission scenario that provides particular actions or output based on whether device activity is allowed or restricted by the permission scenario. This allows an administrator device or remote server to monitor smart contract compliance (e.g., fulfillment or violation of smart contract performance), as well as each computing device within a network for the blockchain to similarly do so. The devices within the network may then append a smart contract based on compliance, and issue an alert, reward, and/or penalty.

In some embodiments, an administrator may be provided with the ability to monitor and restrict access to particular device usage by establishing rules for data service uses on the device, which are based on device activity. This may limit a user from specific activity on a mobile phone. An administrator may be a parent, a work supervisor, a security service administrator, or a network administrator (as examples).

In accordance with an embodiment, a parent or other administrator may be provided with the ability to monitor mobile access and use of data service uses by the mobile communication device. The parent or administrator may authorize or otherwise approve the use of particular device uses and, if desired, set rules as to which type of applications and data services may be accessed and used. The application and/or one or more associated and/or unassociated calls, text messages or Internet accesses can each be an IDENTITY that is being blocked, monitored or alerted by the system using rules to restrict access to content based on a classification.

In accordance with an embodiment, the administrator may establish smart contracts for use of the mobile communication device by another user, which may include one or more permission rules and a processing action (e.g., an alert, a penalty imposed on application usage, and/or a benefit provided for application usage). The permissions rules define the application usage metrics that are evaluated, and the permissions may be stored remotely or on a mobile device for monitoring. The permissions may make up one or more of the smart contracts stored locally to the device as well as confirmed using a blockchain or other proprietary contract verification process. A blockchain may confirm a smart contract by recording the smart contract to a record block and distributing the blockchain publicly or privately. Once the smart contract is generated, applications on the mobile communication device may be monitored to determine whether the data service uses and other usage metrics of the applications comply or violate terms of the smart contracts.

In this embodiment, the application being monitored and the online data or remote device (e.g., a third party) is the IDENTITY whose access is being monitored by the system. Additional rules can be applied to alert and/or restrict or block access to the application based on a geographical location (sometimes referred to as a geo location or geo stamp), a time of day, single application usage thresholds (e.g., time or amount of application usage), weekly application usage thresholds, content based on classification, alerts generated when the application usage goes above or below a certain threshold, and/or other suitable rules for monitoring, blocking, or restricting content.

In this embodiment, the mobile communication device or a remote server may utilize the blockchain verified smart contracts to determine compliance with contract terms (e.g., the permission rules). If the mobile communication device has been used to fulfill the contract terms (e.g., if the data service uses and/or application usage metrics are within acceptable thresholds under the permission rules), a corresponding alert and/or reward may be provided. If the mobile communication device's usage has failed to comply with and/or is restricted based on the smart contracts, another alert may be sent and a penalty on device usage may be applied. The monitored application usage may be time period or interval based to determine compliance with a smart contract. For example, a time on application usage may be implemented daily, weekly, or for a period of employment or device use by another. Thus, the smart contract may be repeating and not resolved based on data service use monitoring for a single period of time. Rewards, penalties, and other processing actions taken based on a smart contract may limit application access, application usage, data transfer bandwidth or allowance, communications with other devices, or other effects on use of the mobile communication device.

In accordance with another embodiment, security protocols may be provided to the end user in the event of a lost or stolen phone including the ability for the user or an administrator to remotely wipe the device, log and alert the geo location whenever the application is used, or obtain any combination of services and events (e.g., time, threshold, communication, etc.) being monitored by the system. This type of real-time monitoring of a user's (e.g., a child's or an employee's) application usage may provide real-time monitoring and security to parents and administrators without requiring broad based, simultaneous access to inaccessible banking, credit card, and carrier location based systems (LBS).

Data services may include all forms of communications between the device and a third party including, for example, cellular voice calls, short message service (SMS) text messages, email, instant messaging sessions, and/or the applications used by the data services including, for example, an application, a digital wallet, address book, calendar, and/or tasks maintained on the wireless device. In accordance with some embodiments, monitoring may be performed for a multitude of communication protocols for sending or receiving data including, for example, protocols associated with cellular networks, specific application communication protocols, Wi-Fi standards, Bluetooth standards, Personal Area Networks, Near Field Communication, Local Area Networks, and/or Public Networks.

According to some embodiments of the present invention, a user may specify the permissions for each data service associated with a wireless device. The user may specify whether use of the service is allowed or denied for any identity that is not currently in the permissions address book for the device. In addition to the forensic information collected and stored regarding the communication transaction, an embodiment of the present invention collects, stores, and analyzes the contextual information contained within the data including financial transactions, text, files, pictures, audio, and/or all other manner of digital and analog content transmitted between a mobile communications device and a third party.

In accordance with some embodiments of the present invention, systems, methods, and program products are disclosed that alerts the user whenever an unauthorized activity is detected. For example, the user may specify one or more methods of notification including email, SMS text message, voice call, and/or any other publicly accepted machine-to-machine communications protocol to alert the user whenever an unauthorized activity is detected. In general in accordance with some embodiments, the type of unauthorized activity being monitored may include any form of information transmission and/or reception (e.g., of audio, photo, video, textual data, or multimedia information), any type of change to the wireless data device, and/or any form of application data usage, transmission, and/or reception (e.g., with a recipient, a time of day, a geo location, an amount or type of data use, a length of application use, or other aspect of an application usage). Similarly in accordance with some embodiments, the user notification of unauthorized activity may be provided in any form of communication, including for example audio, photo, video, textual data, and/or multimedia information.

More specifically in accordance with one or more embodiments of the present invention, a client application installed on a mobile communications device, such as for example a cell phone, PDA, or tablet transmits detailed device usage information using a wireless data connection from the device to a central repository accessible from a network (e.g., the Internet). For example, monitoring of device usage may include such things as inbound or outbound phone calls, inbound or outbound SMS Text Messages, inbound or outbound Instant Messages, application usage and changes, Web Browser Access, Address Book changes (e.g., Adds, Modifications, and/or Deletions), Calendar Appointment changes (e.g., Adds, Modifications, and/or Deletions), Tasks changes (e.g., Adds, Modifications, and/or Deletions), changes to the installed applications on the device (e.g., Adds, Modifications, and/or Deletions), and/or inbound or outbound multimedia files.

In addition to the client application in accordance with one or more embodiments of the present invention, a web-based monitoring application, which is controlled by an administrative user such as for example a parent or manager, monitors the contents of the central repository. For example, based on rules selected by the administrative user, the device usage is allowed, denied, and/or an alert is sent to the administrative user notifying them of an unauthorized event. In accordance with some embodiments of the present invention, existing location services (e.g., GPS, cell-based location applications, or network-based location applications) may be employed to include the monitoring and alerting of the physical location of the device. Furthermore in accordance with some embodiments, the information stored in the central repository may be signed and/or encrypted to provide secure storage and authentication, such as for chain of custody or other evidentiary reasons.

In accordance with one embodiment of the present invention, an administrator device comprises a memory configured to store applications, permission rules, and smart contracts associated with the permission rules, wherein the permission rules comprise data service uses allowed using a mobile communication device based on activities of the mobile communication device, wherein each of the smart contracts comprise at least one of the permission rules and a processing action performed based on whether the data service uses violate the at least one of the permission rules, and wherein the permission rules are set by an administrator of the mobile communication device, a processor, coupled to the memory and configured to execute the applications stored in the memory, and a network communication component configured to communicate with the mobile communication device. The applications comprise a device data monitor program configured to receive device activity by the mobile communication device, wherein the device activity comprises at least one data service use for the mobile communication device based on at least one activity performed by the mobile communication device, and wherein the at least one activity comprises identification of the at least one data service use, access the smart contracts for the mobile communication device, determine whether the at least one data service use violates one or more of the smart contracts based at least in part on whether the identification of the at least one data service use is found in the permission rules for the one or more smart contracts, and execute the processing action based on whether the at least one data service use meets, exceeds, or fails to meet the rules associated with the one or more of the smart contracts.

In accordance with another embodiment of the present invention, a method comprises receiving smart contracts for a mobile communication device from an administrator associated with the mobile communication device, wherein the smart contracts are associated with permission rules for data service uses allowed using the mobile communication device based on activities of the mobile communication device, wherein each of the smart contracts comprise at least one of the permission rules and an alert transmitted based on whether the data service uses meet, exceed, or fail to meet the at least one of the permission rules, and wherein the permission rules are set by an administrator of the mobile communication device, receiving device activity by the mobile communication device, wherein the device activity comprises at least one data service use for the mobile communication device based on at least one activity performed by the mobile communication device, and wherein the at least one activity comprises identification of the at least one data service use, and determining whether the at least one data service use is allowed from the smart contracts based at least in part on whether the identification of the at least one data service use is found in the permission rules for the smart contracts.

In accordance with another embodiment of the present invention, another method comprises receiving input from an administrator for a mobile communication device, wherein the input comprises rules data for use of a mobile communication device and a permission settings for the use of the mobile communication device based on the rules data, and wherein the input is received from the administrator of the mobile communication device prior to the use of the mobile communication device, establishing smart contracts for the mobile communication device based on the input, wherein the smart digital contract comprise permission rules for data service uses allowed using the mobile communication device based on activities of the mobile communication device, and wherein the smart contracts further comprise the permission settings processed with the mobile communication device based on whether activities of the mobile communication device meets, exceeds, or fails to meet the permission rules, connecting to the mobile communication device, and configuring the mobile communication device with the smart contracts, wherein the mobile communication device allows or restricts at least one data service use of the mobile communication device or executes a monetary transaction based at least in part on whether an identification of the at least one data service use from at least one activity performed by the mobile communication device is allowed in the smart contracts based on the activities of the mobile communication device.

In accordance with another embodiment of the present invention, a mobile communication device comprises a memory configured to store mobile programs, program data associated with the mobile programs, and smart contracts associated with permission rules for the mobile communication device, wherein the permission rules comprise data service uses allowed for the mobile communication device based on activities of the mobile communication device, wherein each of the smart contracts comprise at least one of the permission rules and a processing action performed based on whether the data service uses meets, exceeds, or fails to meet the at least one of the permission rules, and wherein the permission rules are set by an administrator of the mobile communication device, a processor, coupled to the memory and configured to execute the mobile programs stored in the memory, and a communications port configured to communicate with a device administration server. The mobile programs comprise a monitoring program configured to receive the smart contracts from the device administration server, configure the mobile communication device using the smart contracts, monitor device activity of the mobile communication device, wherein the device activity comprises at least one data service use for the mobile communication device based on at least one activity performed by the mobile communication device, and wherein the at least one activity comprises identification of the at least one data service use, and determine whether the at least one data service use meets, exceeds, or fails to meet one or more of the smart contracts based at least in part on whether the identification.

In accordance with another embodiment of the present invention, another method comprises storing smart contracts associated with permission rules for a mobile communication device, wherein the permission rules comprise data service uses allowed for the mobile communication device based on activities of the mobile communication device, wherein each of the smart contracts comprise at least one of the permission rules and a processing action performed based on whether the data service uses meets, exceeds, or fails to meet the at least one of the permission rules, and wherein the permission rules are set by an administrator of the mobile communication device, monitoring device activity of the mobile communication device, wherein the device activity comprises at least one data service use for the mobile communication device based on at least one activity performed by the mobile communication device, and wherein the at least one activity comprises identification of the at least one data service use, and determining whether the at least one data service use violates one or more of the smart contracts based at least in part on whether the identification of the at least one data service use is found in the permission rules for the one or more of the smart contracts.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 4A-4B illustrate exemplary table representations of the Activity Log database of FIG. 1 in accordance with an embodiment of the present invention.

FIGS. 5A-D illustrate exemplary table representations of the Permissions database of FIG. 1 in accordance with an embodiment of the present invention.

FIGS. 7A-7B illustrate exemplary flowcharts of the Alert Monitor tool of FIG. 1 in accordance with an embodiment of the present invention.

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
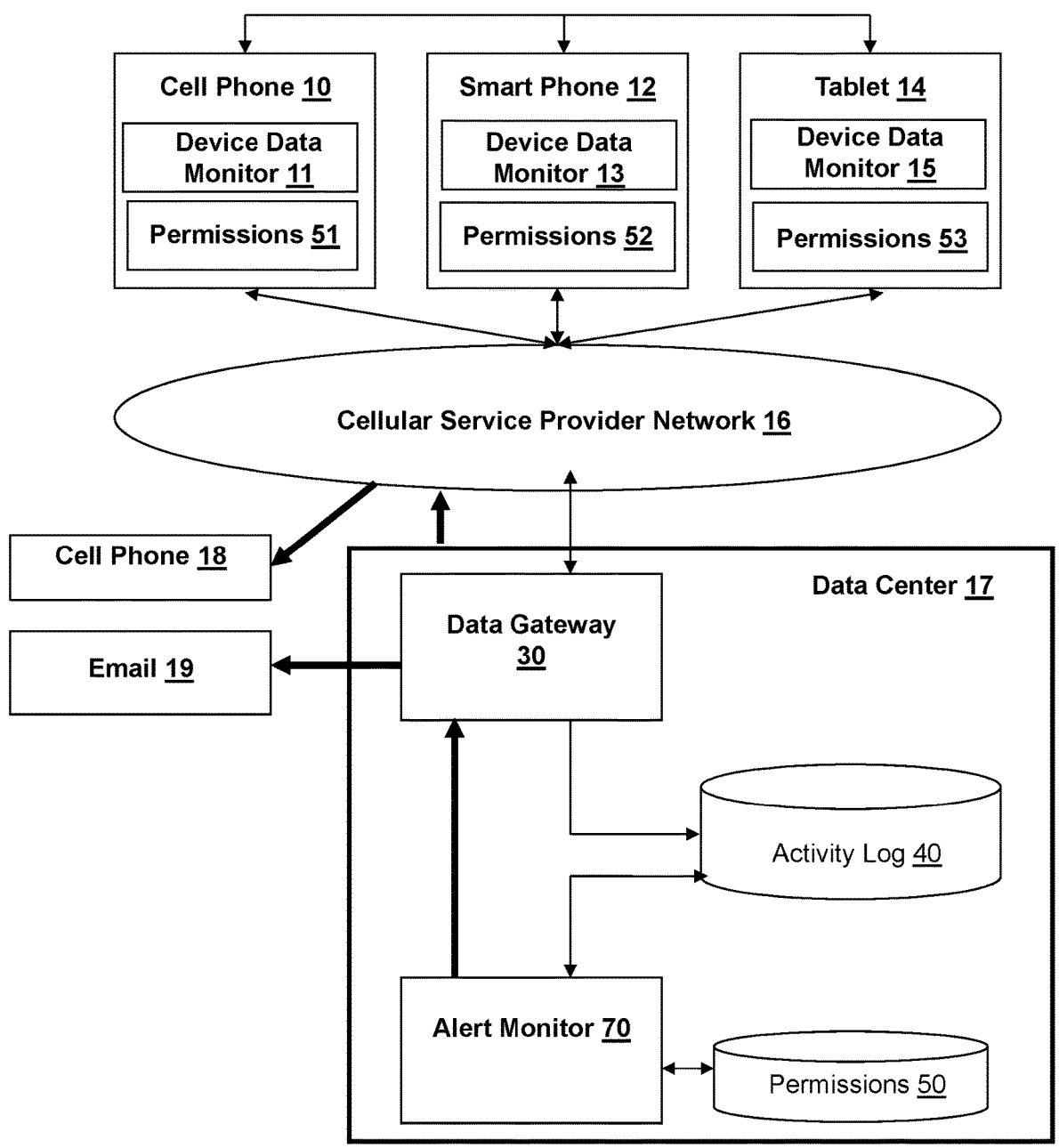
FIG. 1 is a block diagram of a system including a Data Monitor tool to monitor the activities on a wireless device via the device or from the carrier network, a Data Gateway for collecting the activity on a wireless device, and an Alert Monitor in accordance with an embodiment of the present invention.

FIG. 1 illustrates a Data Gateway program tool 30 and wireless devices 10, 12, and 14 represent users whose activities are monitored according to an embodiment of the present invention. Each of the devices 10, 12, and 14 may include a respective Device Data Monitoring program tool 11, 13, and 15 which communicates with the Data Gateway 30. For example, wireless devices 10, 12, and 14 include memory and a processor configured to run various programs (e.g., software applications) stored in the memory, including respective Data Monitoring program tools 11, 13, and 15.

Data services such as application usage and data service uses by the wireless devices 10, 12, and 14 are monitored for activity by their respective Data Monitoring program tool 11, 13, and 15 or the Cellular Network Data Monitor located within the Cellular Service Provider Network 16 which communicates (e.g., via a communication port such as through a wireless communication gateway having an antenna) to the Data Gateway 30 via a wireless data connection such as provided by a cellular service provider 16. Alternatively, the devices 10, 12, and 14 may send their activity information through any available communications network (e.g., any standards or protocols) including for example PIN-to-PIN, Wi-Fi, Bluetooth, Personal Area Networks, Near Field Communication, Local Area Networks, and/or Public Networks (e.g., cellular networks, satellite networks, and/or the Internet).

As described in more detail below, the Data Gateway 30 maintains an Activity Log 40 database in a Data Center 17. Activity Log 40 contains an entry for each use of a data service on wireless devices 10, 12, and 14. As described in more detail below, Data Center 17 also contains a Permissions 50 database that lists the wireless devices to be monitored (e.g., wireless devices 10, 12, and 14) and the rules to apply to allow, deny, and/or alert of data service activity occurring on the wireless devices being monitored. All or a specific portion of Permissions 50 database may also be pushed to wireless devices 10, 12, and 14, which may include the specific permissions for wireless devices 10, 12, and 14, or a copy of permissions, smart contracts, and/or blockchain records for the smart contracts for all of wireless devices 10, 12, and 14. Thus, a Permissions 51 database, a Permissions 52 database, and a Permissions 53 database may reside on each of wireless devices 10, 12, and 14, respectively. Permissions 51, 52, and 53 databases may include the same or similar information to Permissions 50 database.

An Alert Monitor 70 program waits for new entries to be made into Activity Log 40. Each new entry is checked against the Permissions 50 database. Whenever unauthorized activity is detected, Alert Monitor 70 sends an alert to one or more users via Data Gateway 30, such as for example to a cell phone 18 using SMS Text Messaging or an Email 19 account. The preferred method of notification may be maintained in the Permissions 50 database which can support many forms of data communications including voice messages, SMS Text Messages, email, and/or any other publicly accepted machine-to-machine communications protocol.

Data Gateway 30 and Alert Monitor 70, in accordance with one or more embodiments of the present invention, may represent one or more computers (e.g., servers or other processor-based systems) for performing the operations described herein (e.g., by executing software and communicating through a gateway or other communication interface), including communicating with Activity Log 40 and Permissions 50 databases (e.g., memory such as server-based storage). Data Monitoring program tools 11, 13, and 15 may represent, for example, software run by corresponding processors of wireless devices 10, 12, and 14 or may represent hardware-based systems (e.g., separate processors) for performing the desired operations described herein.

Furthermore, the various programs or system elements may be combined or be discreet, as desired for the specific application. For example, Data Gateway 30 and Alert Monitor 70 may represent one computer or software program or separate computers and software programs for performing the various functions disclosed herein. Similarly for example, Activity Log 40 and Permissions 50 databases may represent one memory or discrete memory for storing the information disclosed herein. Additionally, the various programs may be stored on a computer-readable medium that may be programmed or loaded into a particular device. For example, data monitor 11 may be a software program stored on a computer-readable medium or otherwise provided to and programmed into wireless device 10 to perform the desired functions as described herein.

Figure 2:
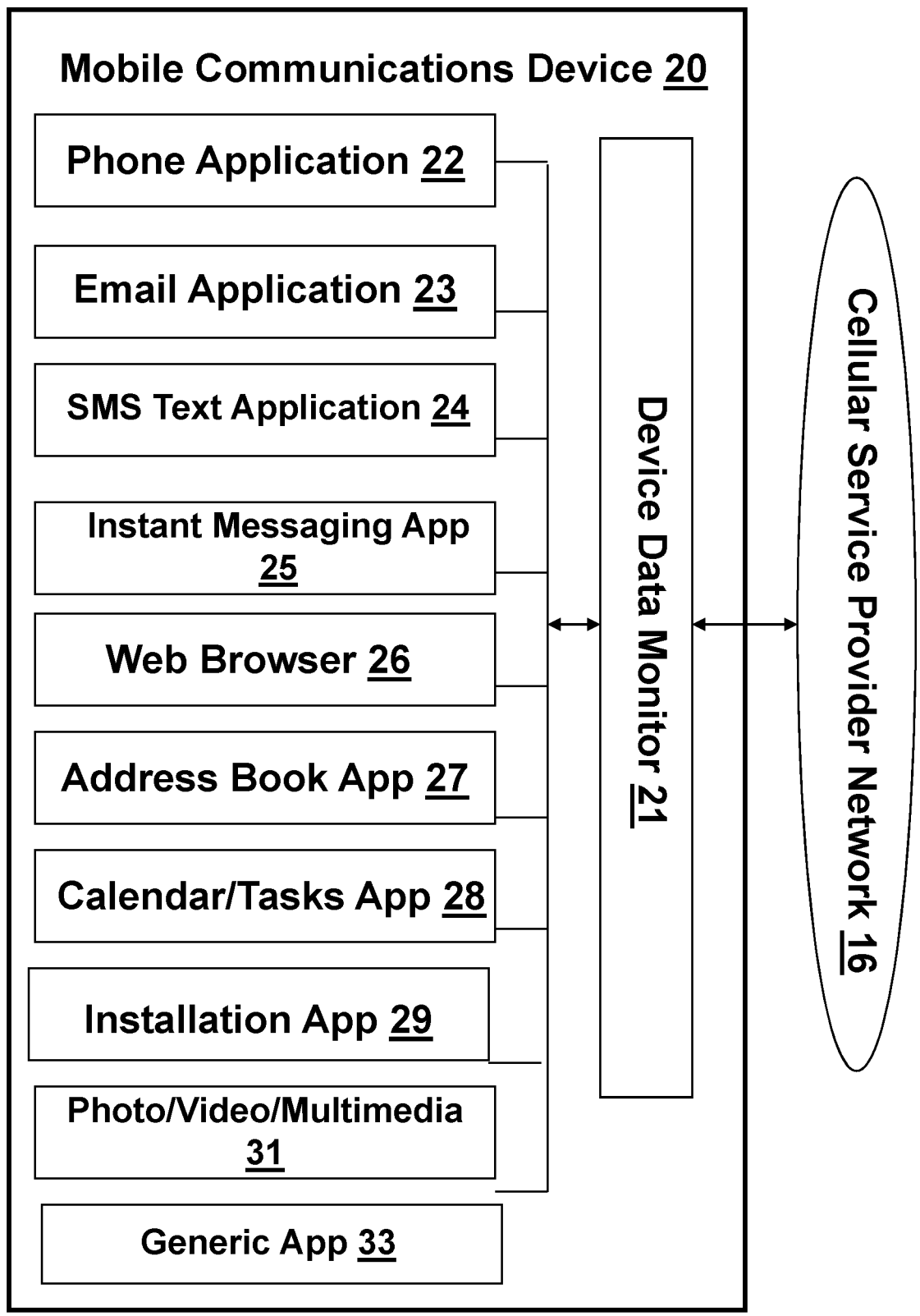
FIG. 2 is a block diagram of a system including a monitoring tool associated with a mobile communications device in accordance with an embodiment of the present invention.

FIG. 2 illustrates in more detail a Device Data Monitor 21 program tool which captures the data service activity on a Mobile Communications Device 20 in accordance with an embodiment of the present invention. For example, device data monitor 21 program tool may be an exemplary representation of data monitor 11, 13, or 15 and similarly mobile communications device 20 may be an exemplary representation of device 10, 12, or 14. Each Mobile Communications Device 20 contains one or more applications that may use a communication protocol (e.g., a conventional communication protocol) to send or receive information (e.g., digital data packets or other forms of communications) or provide supporting applications to facilitate the communications process (e.g., an Address Book which contains an email address used to send an email communication and/or a generic device application that may be utilized to perform data processing, transfer, and/or other application and data service uses).

In accordance with an embodiment of the present invention, these communication applications and their supporting applications may be referred to as a data service. These data services may include one or more of a Phone Application 22 for sending or receiving voice communications, an Email Application 23 for sending or receiving email communications, a SMS Text Application 24 for sending or receiving SMS text messages, an Instant Messaging Application 25 for sending or receiving instant messages, a Web Browser Application 26 for sending or receiving HTTP requests and responses, an Address Book Application 27 for storing contact information, a Calendar/Task Application 28 for storing appointment information, an Installation Application (sometimes referred to herein as an App) 29 for storing information regarding the installed applications on the device, a Photo/Video/Multimedia Application 31 for sending or receiving multimedia files and/or a Generic Application 33 for executing one or more processes on Mobile Communication Device 20 (e.g., a utility, game, or service application including a word processing, video game, social networking, financial transaction processing, shopping, or other type of generic application that includes application usage metrics, such as time, length, type, or other use measurement).

As described in more detail below, Device Data Monitor 21 program tool monitors the inbound and outbound activity for each of these data services and sends a detailed log of these activities to a central repository using Cellular Service Provider 16. Alternatively, Data Monitor 21 program tool may send the activity information through any available communications network, such as for example the Internet, a company network, and/or a public cellular network.

As would be understood by one skilled in the art, embodiments of the present invention provide certain advantages over conventional approaches. For example, a conventional approach may simply provide parental controls which monitor and block Internet and email access from a desktop and which primarily prevent access to unwanted content or block the transmission of personally identifiable information or monitor and block the display of inappropriate application store content based upon the end user's age. Blocking usually results in the child finding an unmonitored computer or changing the age associated with the account's profile to access the blocked content. For example, most gaming consoles today are enabled with Internet access and do not inherently include parental controls and most social networks limit access to the profiles of younger account holders but have no way of verifying the child's age once the date of birth has been updated in the user's profile. Parental control applications generally do not log the blocked content or monitor application usage initiated from a mobile device and none pro-actively notify the parent or administrative user of the event. Additionally, none are capable of monitoring a cell phone or other mobile communications device which today have comparable communication capabilities as a desktop computer.

As another example of a conventional approach, child and employee monitoring of application usage and geographic location may be provided from a cell phone, but this approach typically requires an active search by the parent or manager to locate the device or reviewing device data usage and processing days or weeks after completion. Perimeter boundaries or virtual fencing could be deployed using existing location technology, but again all of these location approaches are after-the-fact of direct contact with a predator or after a potentially life threatening event is in progress.

In contrast in accordance with one or more embodiments of the present invention, systems and methods are disclosed for example to detect the potentially life threatening event before physical contact is made with the user of a monitored wireless device, and/or to use perimeter boundaries (virtual fencing) along with time of day restrictions to detect and/or block unauthorized use of the child's digital wallet. As an example, Mobile Communications Device 20 may include a GPS-based or other type of location-determination application (e.g., as part of phone application 22 or Device Data Monitor 21) that periodically or continuously determines the location of Mobile Communications Device 20, with this location information provided to Data Center 17 (e.g., stored in Activity Log 40) via Data Monitor 21 with an optional alert provided to an administrator (e.g., parent) based on location parameter settings (e.g., virtual fence). For example, the GPS information may be provided by Device Data Monitor 21 to Data Center 17, where it is stored in activity log 40, and an alert provided to the administrator if the Mobile Communications Device 20 enters a restricted area or proceeds outside of a defined geographic region or utilize an application in a restricted area or within a time of day restriction. In general, Data Monitor 21 provides various information to Data Center 17 to permit an administrator (e.g., parent or manager) to monitor the activities (e.g., location, communications with a third party, and/or changes to applications or other data within Mobile Communications Device 20) of a user of Mobile Communications Device 20, with an optional alert provided to the administrator if an unauthorized activity occurs.

Figure 3A:
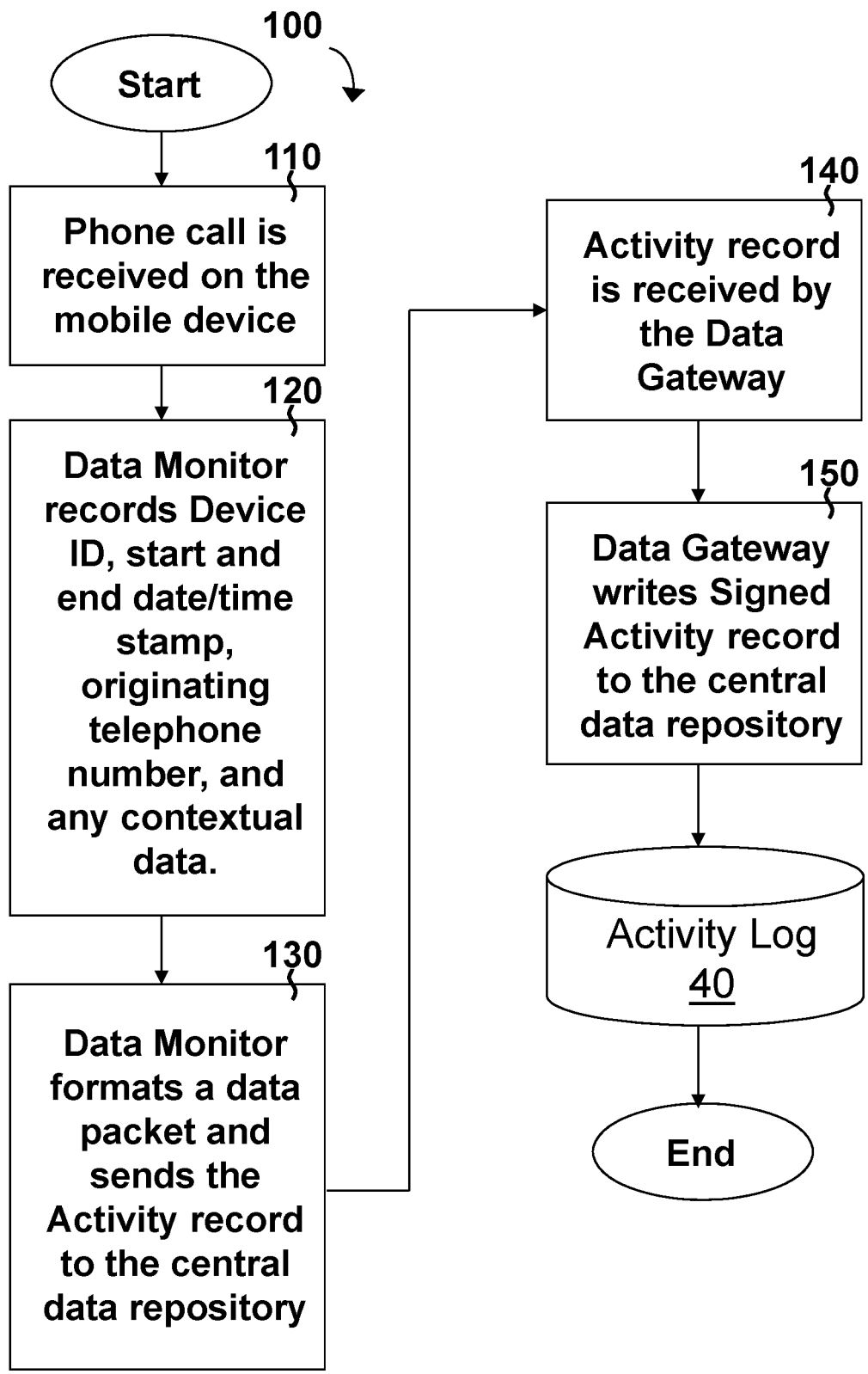
FIGS. 3A-3Q illustrate exemplary flowcharts of the monitoring and collecting (logging) of event activity in FIG. 1 for each of the data services of FIG. 2 in accordance with one or more embodiments of the present invention.

For example, FIG. 3A illustrates a data flowchart for the capturing of an inbound voice call using Phone Application 22 on Mobile Communications Device 20 in accordance with an embodiment of the present invention. Initially, in step 110, a phone call is received on Mobile Communications Device 20. In step 120, Data Monitor 21 located on the Mobile Communications Device 20 or within the Cellular Service Provider Network 16 (as examples) recognizes that Phone Application 22 data service has been initiated and begins to capture information regarding the use of the data service including, for example, the unique Device ID of the Mobile Communications Device 20, the start and end date/time stamp of the call, the originating phone number, and/or any contextual data. Once the call has been terminated (step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 to Activity Log 40, a central repository for all data collected from Mobile Communications Device 20.

Data gateway 30 may optionally write the data packet (s) in step 150 in a signed (e.g., digitally signed) fashion to activity log 40, in accordance with an embodiment of the present invention. For example, the activity record may be signed to identify (e.g., authenticate) the information and provide a chain of custody and authenticity for the stored information (e.g., for custody of evidence or other documentation requirements), as would be understood by one skilled in the art. Furthermore as a specific example, Data Gateway 30 may optionally provide encryption and decryption processing for information related to the activity record and/or additional information, such as through the use of any one of several private or public key encryption or signature algorithms including the RSA algorithm (by RSA Security of Bedford, Mass.), the Digital Encryption Standard (DES), the Advanced Encryption Standard (AES), and broad families of signature or hash algorithms such as the Secure Hash Algorithm (SHA) and the Message Digest (MD) algorithm.

In general depending upon the level of security desired and the specific requirements or applications, the activity record may not have to be encrypted. For example, by not encrypting the activity record, considerable savings may be achieved in terms of processing, power savings, time, and/or memory. Thus, the activity record may be securely recorded and validated by generating an associated signature that can be verified. Consequently, the activity record is viewable and useable in a conventional fashion, but is also verifiable through the signature (e.g., for chain of custody or other evidentiary purposes), as would be understood by one skilled in the art.

Figure 3B:
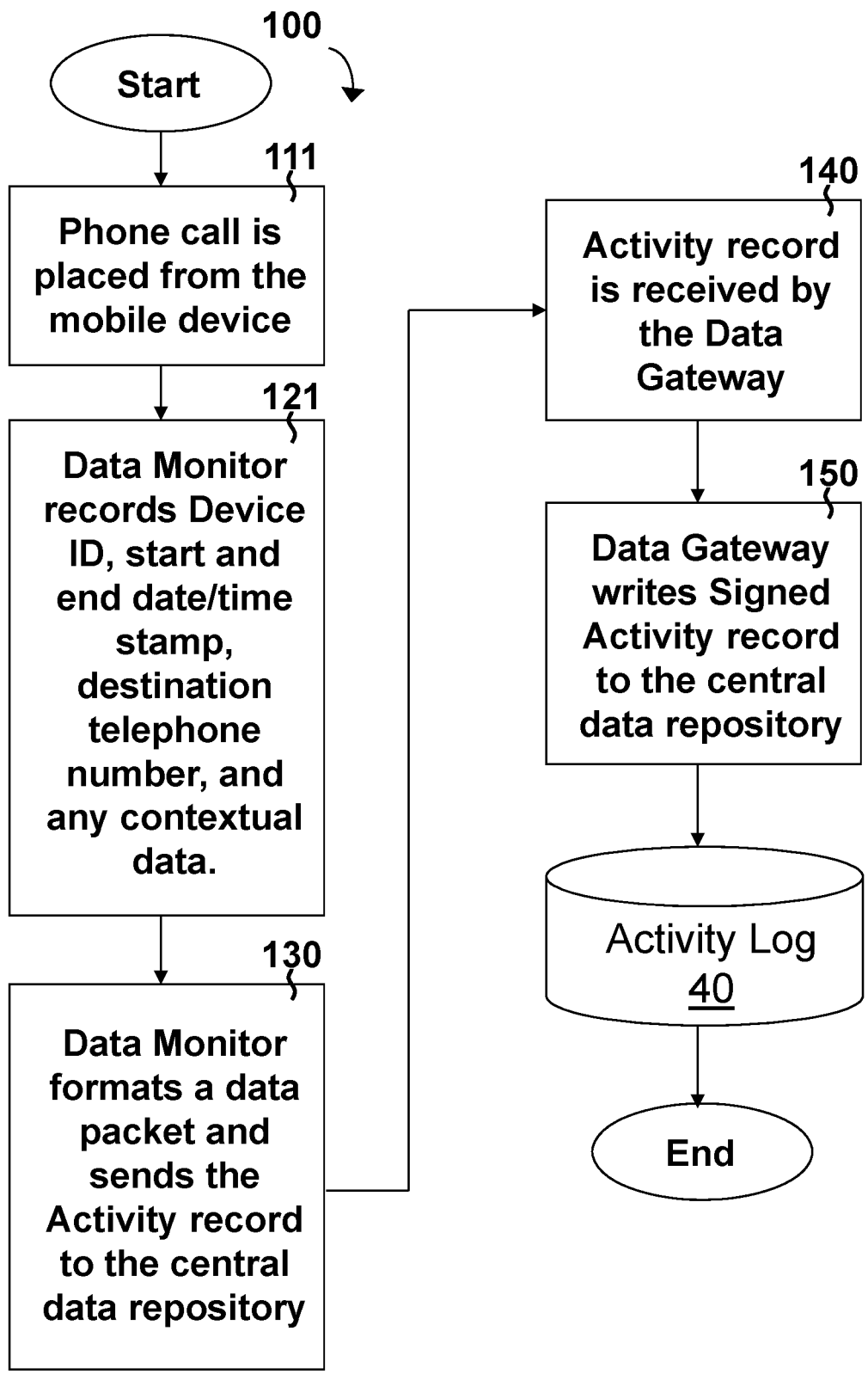

FIG. 3B illustrates a data flowchart for the capturing of an outbound voice call using Phone Application 22 on Mobile Communications Device 20 in accordance with an embodiment of the present invention. Initially, in step 111, a phone call is placed from Mobile Communications Device 20. In step 121, Data Monitor 21 located on the Mobile Communications Device 20 or within the Cellular Service Provider Network 16 (as examples) recognizes that Phone Application 22 data service has been initiated and begins to capture information regarding the use of the data service including, for example, the unique Device ID of Mobile Communications Device 20, the start and end date/time stamp of the call, the destination phone number, and/or any contextual data. Once the call has been terminated (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3A) to Activity Log 40, a central repository for all data collected from Mobile Communications Device 20.

Figure 3C:
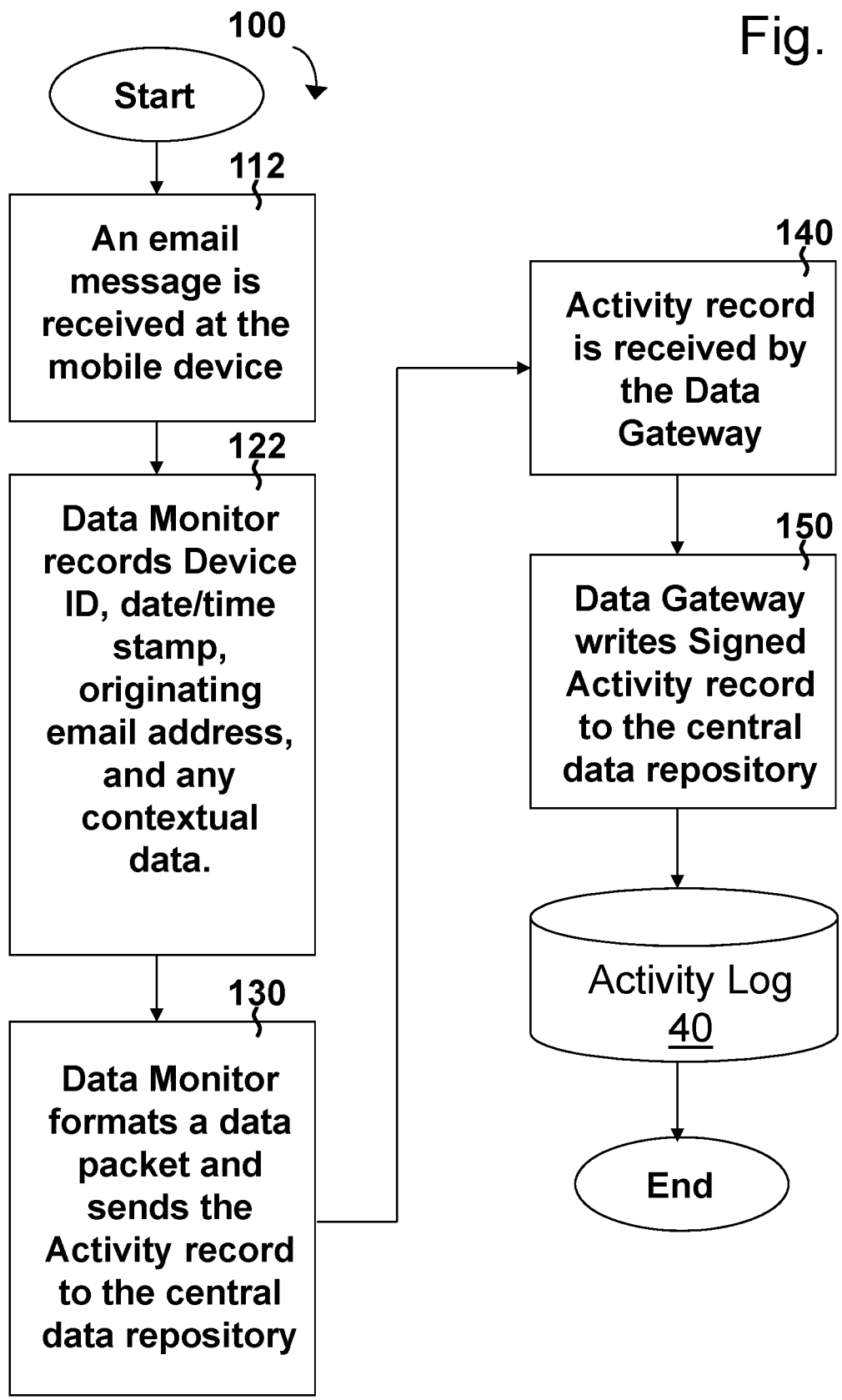

FIG. 3C illustrates a data flowchart for the capturing of an inbound email message using Email Application 23 on Mobile Communications Device 20 in accordance with an embodiment of the present invention. Initially, in step 112, an email message is received on Mobile Communications Device 20. In step 122, Data Monitor 21 located on the Mobile Communications Device 20 or within the Cellular Service Provider Network 16 (as examples) recognizes that Email Application 23 data service has been initiated and begins to capture information regarding the use of the data service including, for example, the unique Device ID of Mobile Communications Device 20, the date/time stamp of the message, the originating email address, and/or any contextual data. Once the message has been received (Step 130), Data Monitor 21 formats a data packet which includes the collected information (Activity Record) and sends one or more data packets to the central repository located in Data Center 17. In step 140, Data Gateway 30 located in the Data Center 17 receives the data packet(s) and then writes the data packet(s) in step 150 (e.g., optionally in a signed and/or encrypted fashion as discussed in reference to FIG. 3A) to Activity Log 40, a central repository for all data collected from Mobile Communications Device 20.

Figure 3D:
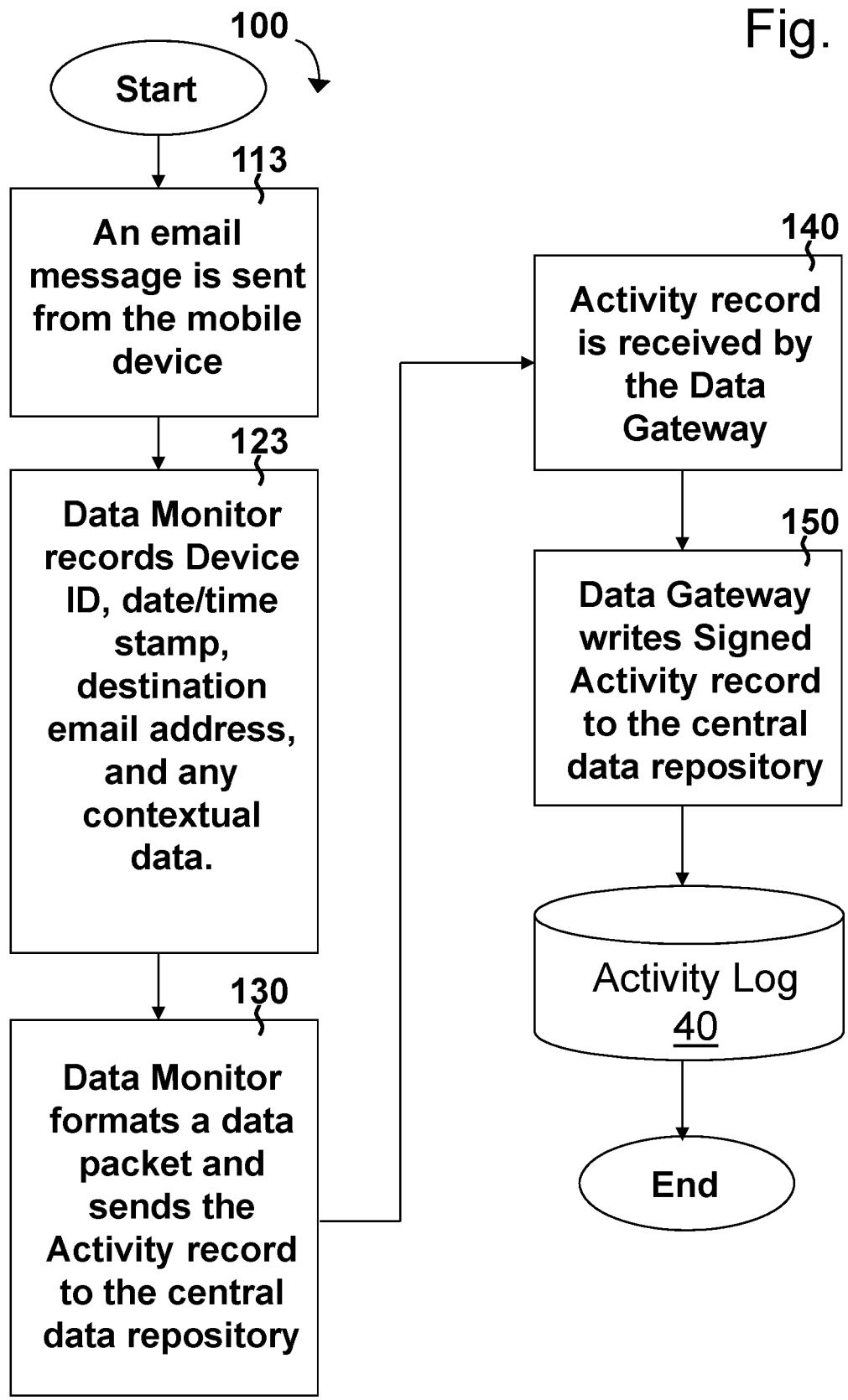

FIG. 3D illustrates a data flowchart for the capturing of an outbound email message using Email Application 23 on Mobile Communications Device 20 in accordance with an embodiment of the present invention. Initially, in step 113, an email message is sent from Mobile Communications Device 20. In step 123, Data Monitor 21 located on the Mobile Communications Device 20 or within the Cellular Service Provider Network 16 (as examples) recognizes that Email Application 23 data service has been initiated and begins to capture information regarding the use of the data service including, for example, the unique Device ID of Mobile Communications Device 20, the date/time stamp of the message, the destination email address, and/or any contextual data. Once the message has been sent (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3A) to Activity Log 40, a central repository for all data collected from Mobile Communications Device 20.

FIG. 3E illustrates a data flowchart for the capturing of an inbound text message using SMS Text Application 24 on Mobile Communications Device 20 in accordance with an embodiment of the present invention. Initially, in step 114, a text message is received on Mobile Communications Device 20. In step 124, Data Monitor 21 located on the Mobile Communications Device 20 or within the Cellular Service Provider Network 16 (as examples) recognizes that SMS Text Application 24 data service has been initiated and begins to capture information regarding the use of the data service including, for example, the unique Device ID of Mobile Communications Device 20, the date/time stamp of the message, the originating phone number, and/or any contextual data. Once the message has been received (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3A) to Activity Log 40, a central repository for all data collected from Mobile Communications Device 20.

Figure 3F:
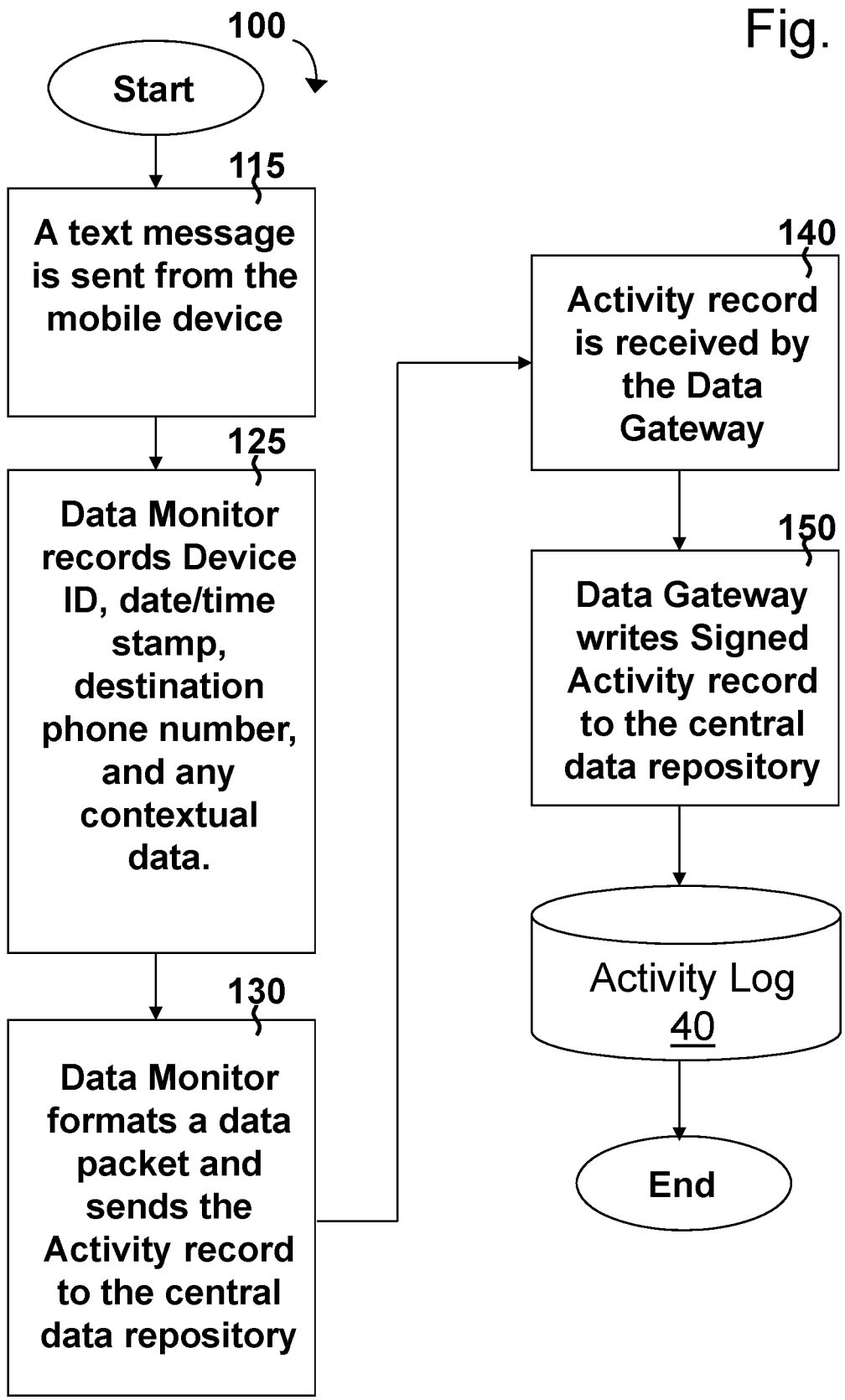

FIG. 3F illustrates a data flowchart for the capturing of an outbound text message using SMS Text Application 24 on Mobile Communications Device 20 in accordance with an embodiment of the present invention. Initially, in step 115, a text message is sent from Mobile Communications Device 20. In step 125, Data Monitor 21 located on the Mobile Communications Device 20 or within the Cellular Service Provider Network 16 (as examples) recognizes that SMS Text Application 24 data service has been initiated and begins to capture information regarding the use of the data service including, for example, the unique Device ID of Mobile Communications Device 20, the date/time stamp of the message, the destination phone number, and/or any contextual data. Once the message has been sent (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3A) to Activity Log 40, a central repository for all data collected from Mobile Communications Device 20.

Figure 3G:
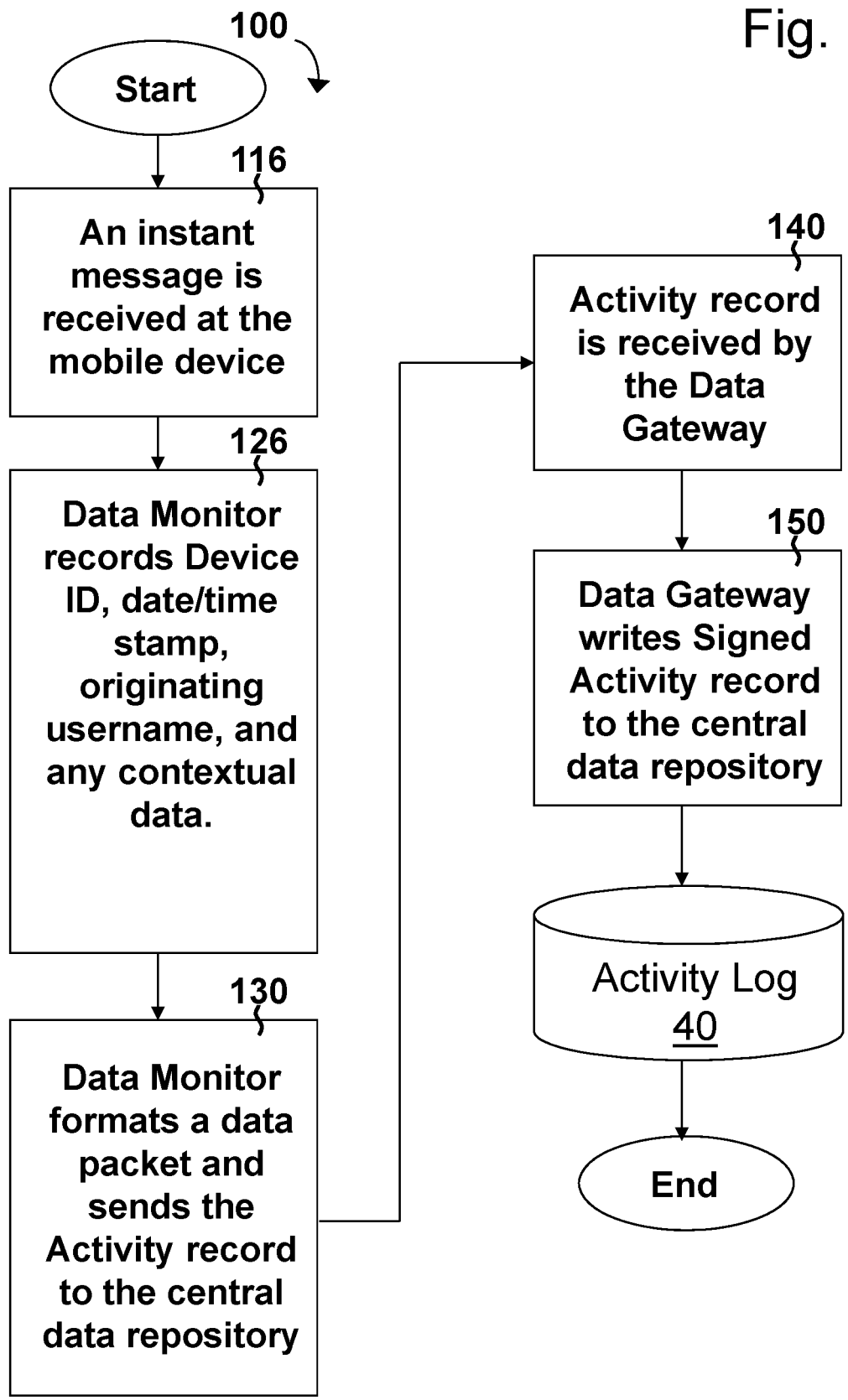

FIG. 3G illustrates a data flowchart for the capturing of an inbound instant message using Instant Messaging Application 25 on Mobile Communications Device 20 in accordance with an embodiment of the present invention. Initially, in step 116, an instant message is received on Mobile Communications Device 20. In step 126, Data Monitor 21 located on the Mobile Communications Device 20 or within the Cellular Service Provider Network 16 (as examples) recognizes that Instant Messaging Application 25 data service has been initiated and begins to capture information regarding the use of the data service including, for example, the unique Device ID of Mobile Communications Device 20, the date/time stamp of the message, the originating username, and/or any contextual data. Once the message has been received (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3A) to Activity Log 40, a central repository for all data collected from Mobile Communications Device 20.

Figure 3H:
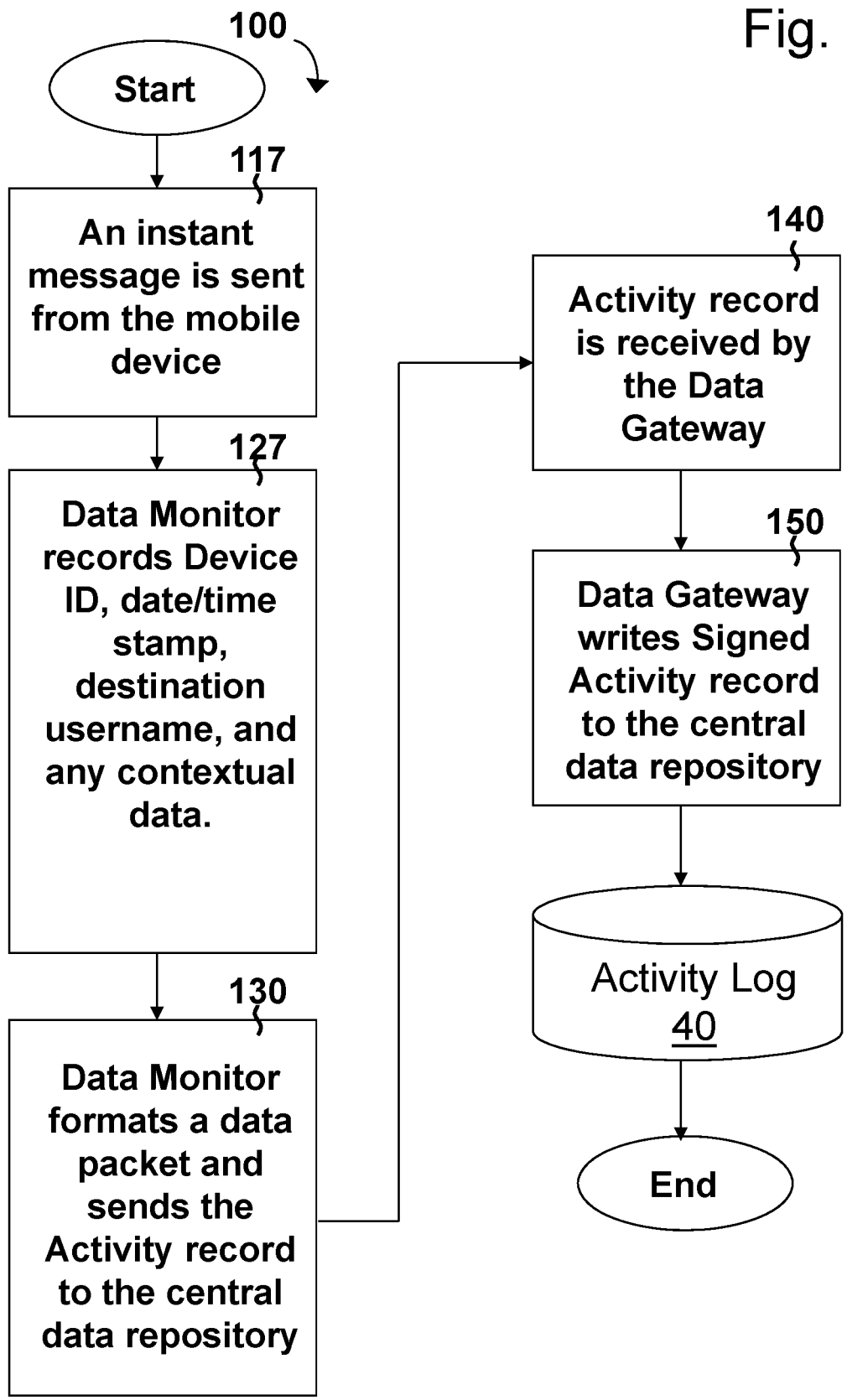

FIG. 3H illustrates a data flowchart for the capturing of an outbound instant message using Instant Messaging Application 25 on Mobile Communications Device 20 in accordance with an embodiment of the present invention. Initially, in step 117, an instant message is sent from Mobile Communications Device 20. In step 127, Data Monitor 21 located on the Mobile Communications Device 20 or within the Cellular Service Provider Network 16 (as examples) recognizes that Instant Messaging Application 25 data service has been initiated and begins to capture information regarding the use of the data service including, for example, the unique Device ID of Mobile Communications Device 20, the date/time stamp of the message, the destination username, and/or any contextual data. Once the message has been sent (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3A) to Activity Log 40, a central repository for all data collected from Mobile Communications Device 20.

Figure 3I:
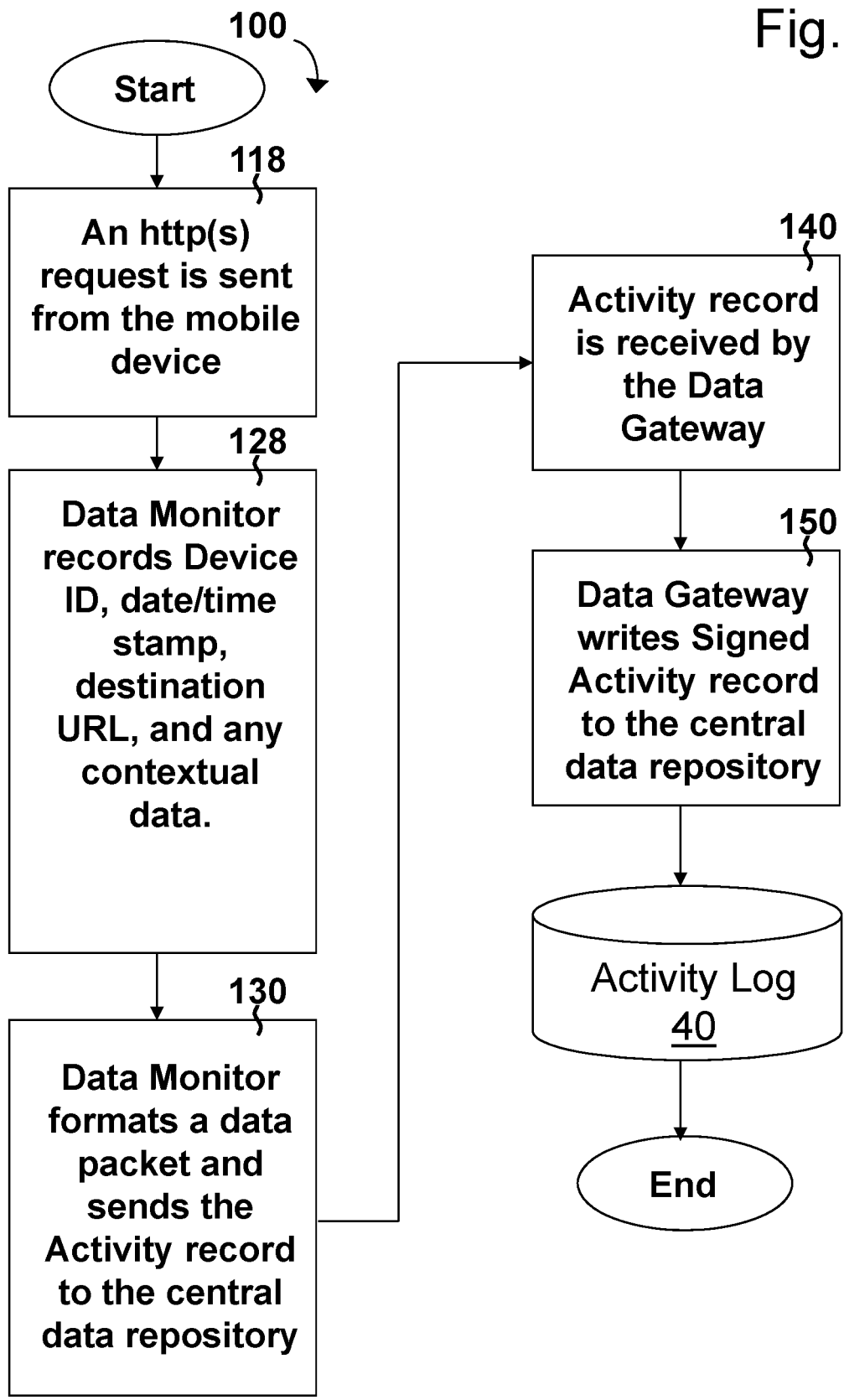

FIG. 3I illustrates a data flowchart for the capturing of an HTTP (Internet) request using Web Browser Application 26 on Mobile Communications Device 20 in accordance with an embodiment of the present invention. Initially, in step 118, an HTTP request is sent from Mobile Communications Device 20. In step 128, Data Monitor 21 located on the Mobile Communications Device 20 or within the Cellular Service Provider Network 16 (as examples) recognizes that Web Browser Application 26 data service has been initiated and begins to capture information regarding the use of the data service including, for example, the unique Device ID of Mobile Communications Device 20, the date/time stamp of the request, the destination URL, and/or any contextual data. Once the request has been completed (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3A) to Activity Log 40, a central repository for all data collected from Mobile Communications Device 20.

Figure 3J:
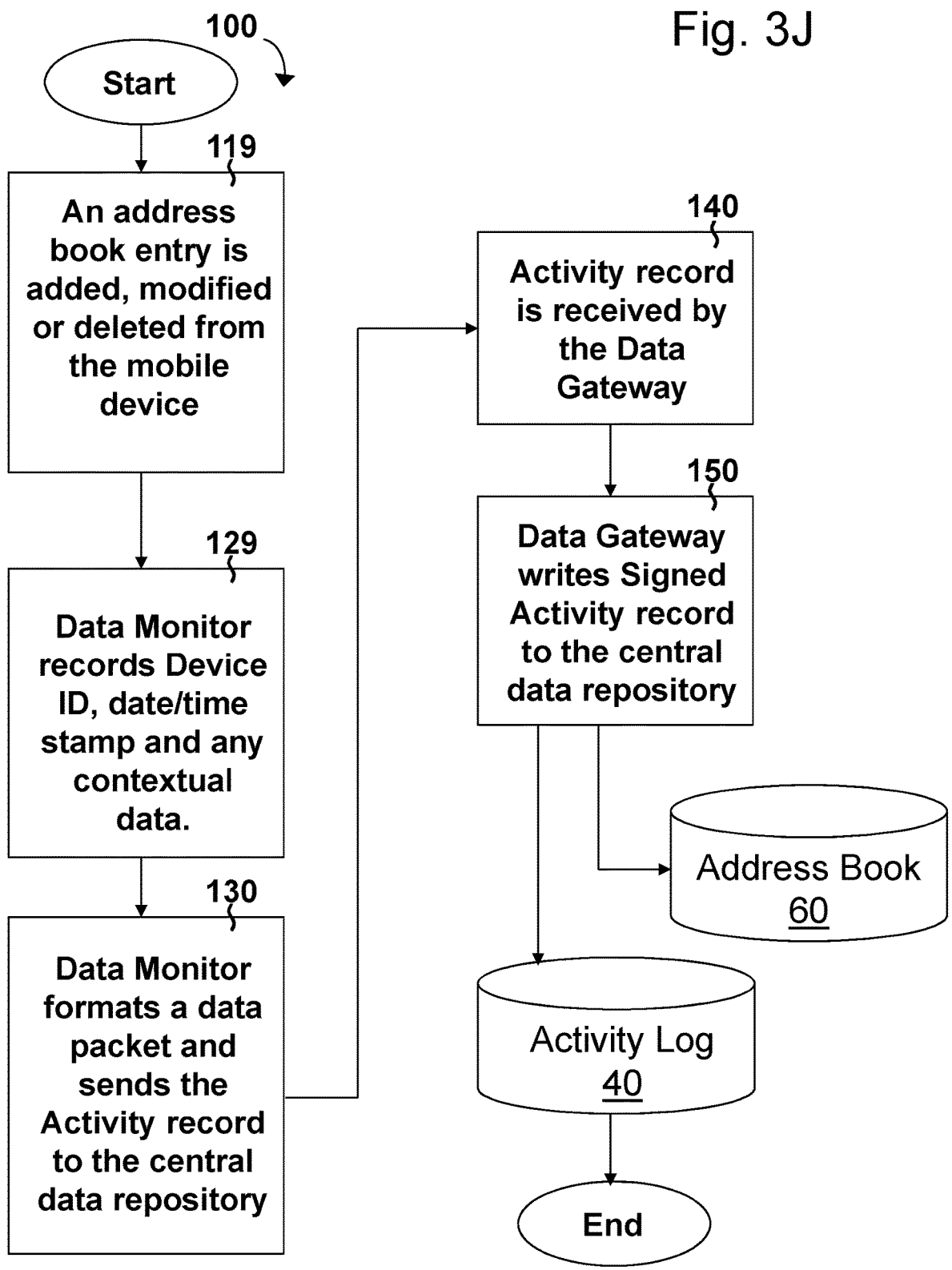

FIG. 3J illustrates a data flowchart for the capturing of a change to the address book using Address Book Application 27 on Mobile Communications Device 20 in accordance with an embodiment of the present invention. Initially, in step 119, an add, modify, or delete address book transaction is initiated on Mobile Communications Device 20. In step 129, Data Monitor 21 recognizes that Address Book Application 27 data service has been initiated and begins to capture information regarding the use of the data service including, for example, the unique Device ID of Mobile Communications Device 20, the date/time stamp of the change, and/or any contextual information such as the phone number or name that was changed. Once the transaction has been completed (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3a) to Activity Log 40, a central repository for all data collected from Mobile Communications Device 20, and to Address Book 60, a central repository backup for all address book records residing on Mobile Communications Device 20.

Figure 3K:
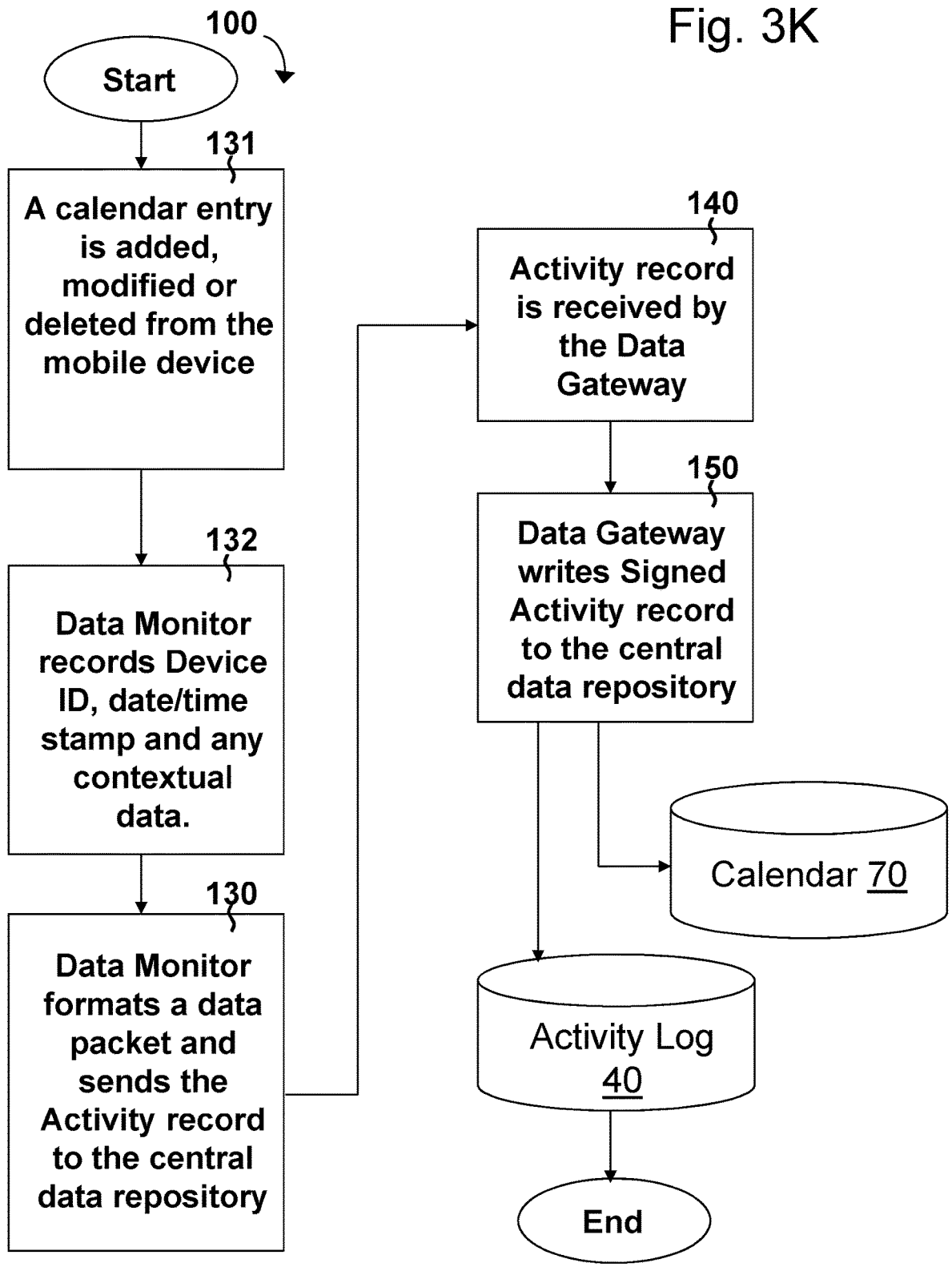

FIG. 3K illustrates a data flowchart for the capturing of a change to the calendar using Calendar/Task Application 28 on Mobile Communications Device 20 in accordance with an embodiment of the present invention. Initially, in step 131, an add, modify, or delete calendar transaction is initiated on Mobile Communications Device 20. In step 132, Data Monitor 21 recognizes that Calendar/Task Application 28 data service has been initiated and begins to capture information regarding the use of the data service including, for example, the unique Device ID of Mobile Communications Device 20, the date/time stamp of the change, and/or any contextual information such as the date or meeting location that was changed. Once the transaction has been completed (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3A) to Activity Log 40, a central repository for all data collected from Mobile Communications Device 20, and optionally to Calendar 70, a central repository backup for all calendar records residing on Mobile Communications Device 20.

FIG. 3L illustrates a data flowchart for the capturing of a change to the task list using Calendar/Task Application 28 on Mobile Communications Device 20 in accordance with an embodiment of the present invention. Initially, in step 133, an add, modify, or delete task transaction is initiated on Mobile Communications Device 20. In step 134, Data Monitor 21 recognizes that Calendar/Task Application 28 data service has been initiated and begins to capture information regarding the use of the data service including, for example, the unique Device ID of Mobile Communications Device 20, the date/time stamp of the change, and/or any contextual information such as the date or task details that were changed. Once the transaction has been completed (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3A) to Activity Log 40, a central repository for all data collected from Mobile Communications Device 20, and optionally to Tasks 80, a central repository backup for all task records residing on Mobile Communications Device 20.

Figure 3M:
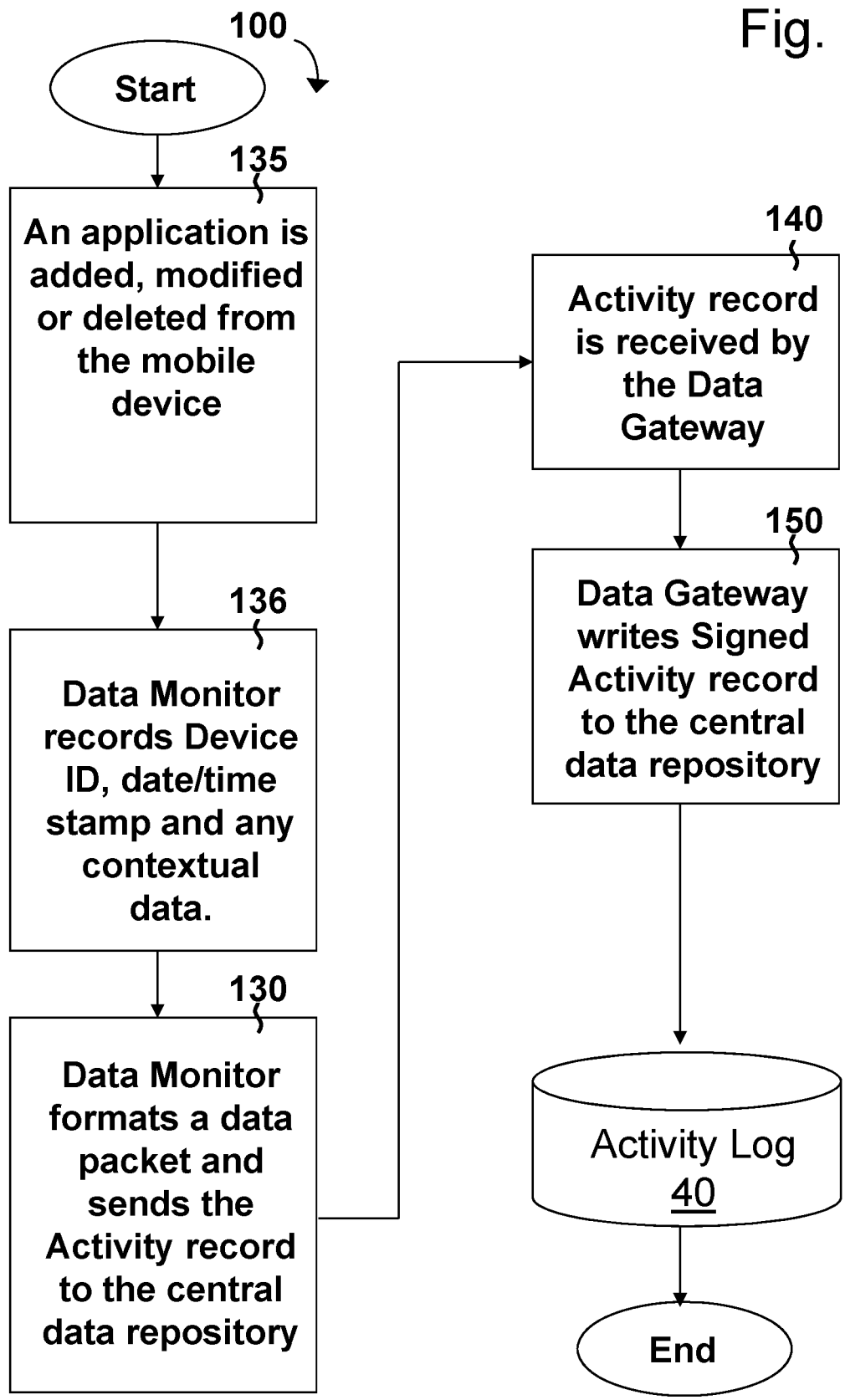

FIG. 3M illustrates a data flowchart for the capturing of a change to the list of installed applications on Mobile Communications Device 20 using Installation Application 29 on Mobile Communications Device 20 in accordance with an embodiment of the present invention. Initially, in step 135, an add, modify, or delete of an application is initiated on Mobile Communications Device 20. In step 136, Data Monitor 21 recognizes that Installation Application 29 data service has been initiated and begins to capture information regarding the use of the data service including the unique Device ID of Mobile Communications Device 20, the date/time stamp of the change, and/or any contextual information such as the name of the application(s) that were changed. Once the transaction has been completed (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3A) to Activity Log 40, a central repository for all data collected from Mobile Communications Device 20.

Figure 3N:
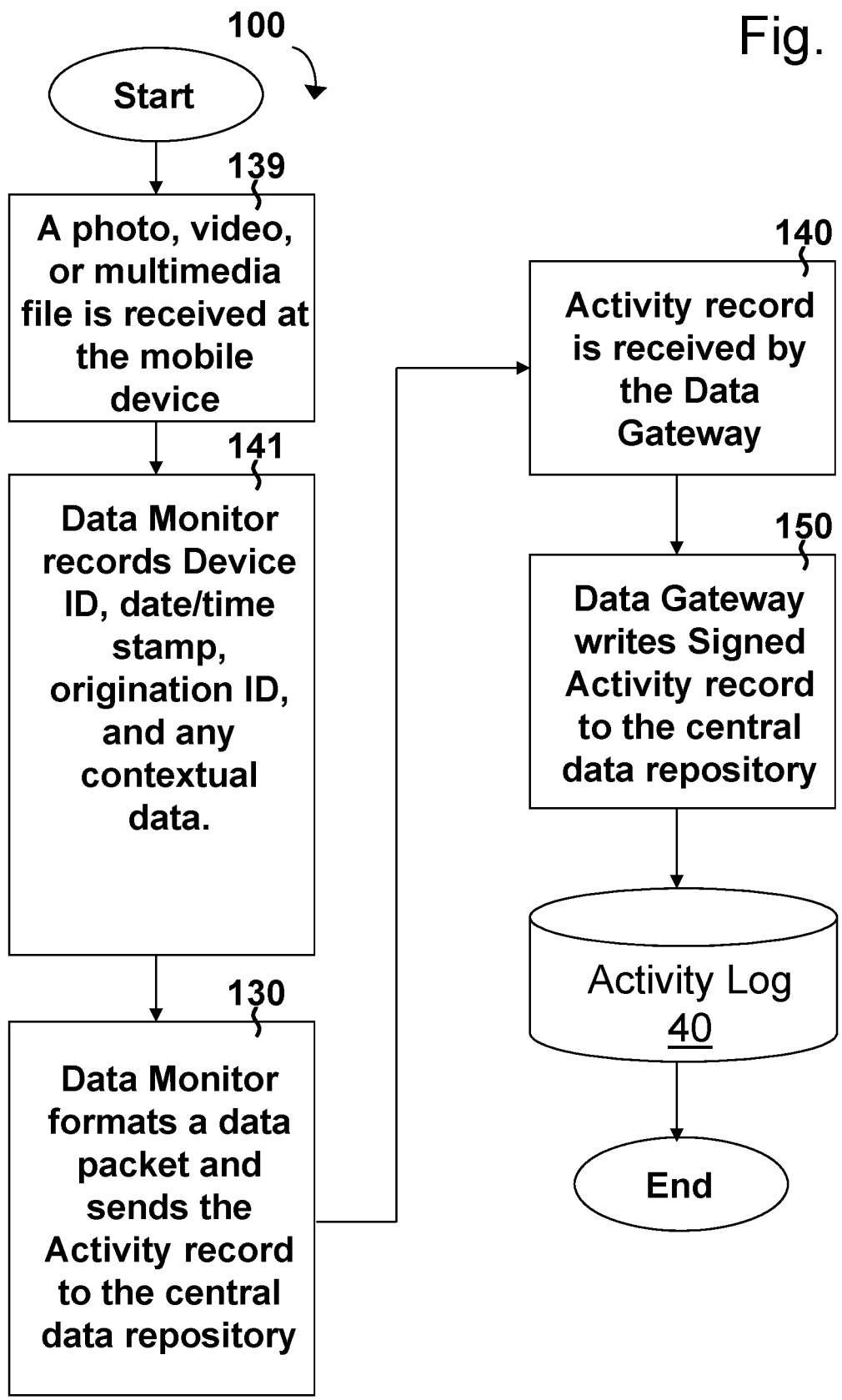

FIG. 3N illustrates a data flowchart for the capturing of an inbound photo, video, or other multimedia file using Photo/Video/Multimedia Application 31 on Mobile Communications Device 20 in accordance with an embodiment of the present invention. Initially, in step 139, a multimedia file is received on Mobile Communications Device 20. In step 141, Data Monitor 21 recognizes that the Photo/Video/Multimedia Application 31 data service has been initiated and begins to capture information regarding the use of the data service including, for example, the unique Device ID of Mobile Communications Device 20, the date/time stamp of the file transfer, an origination ID such as the originating phone number, username or link, and/or any contextual information contained in the file. Once the message has been received (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3A) to Activity Log 40, a central repository for all data collected from Mobile Communications Device 20.

Figure 3O:
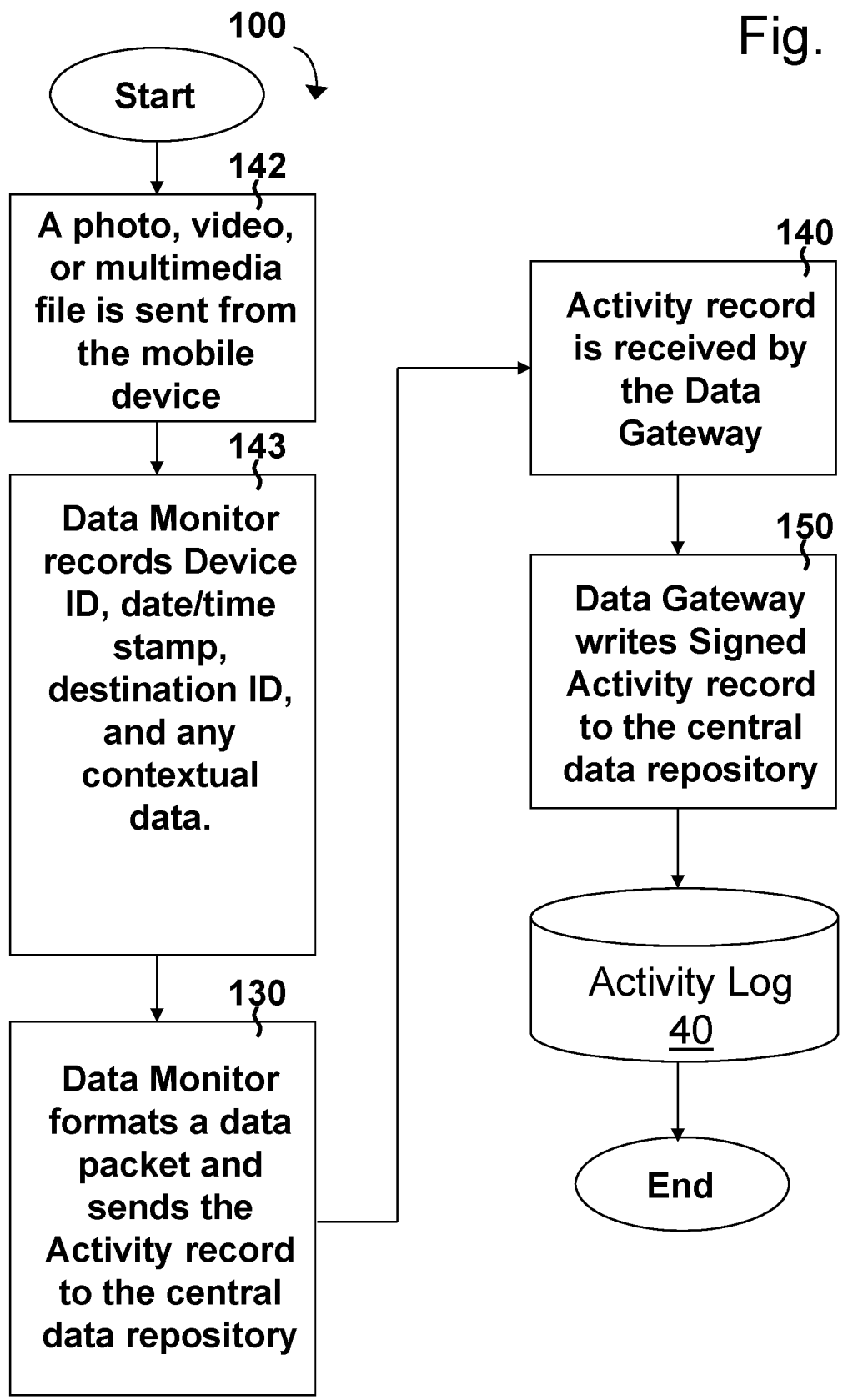

FIG. 3O illustrates a data flowchart for the capturing of an outbound photo, video, or other multimedia file using Photo/Video/Multimedia Application 31 on Mobile Communications Device 20 in accordance with an embodiment of the present invention. Initially, in step 142, a multimedia file is sent from Mobile Communications Device 20. In step 143, Data Monitor 21 recognizes that Photo/Video/Multimedia Application 31 data service has been initiated and begins to capture information regarding the use of the data service including, for example, the unique Device ID of Mobile Communications Device 20, the date/time stamp of the file transfer, a destination ID such as the destination phone number, username or link, and/or any contextual information contained in the file. Once the message has been sent (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3A) to Activity Log 40, a central repository for all data collected from Mobile Communications Device 20.

Figure 3P:
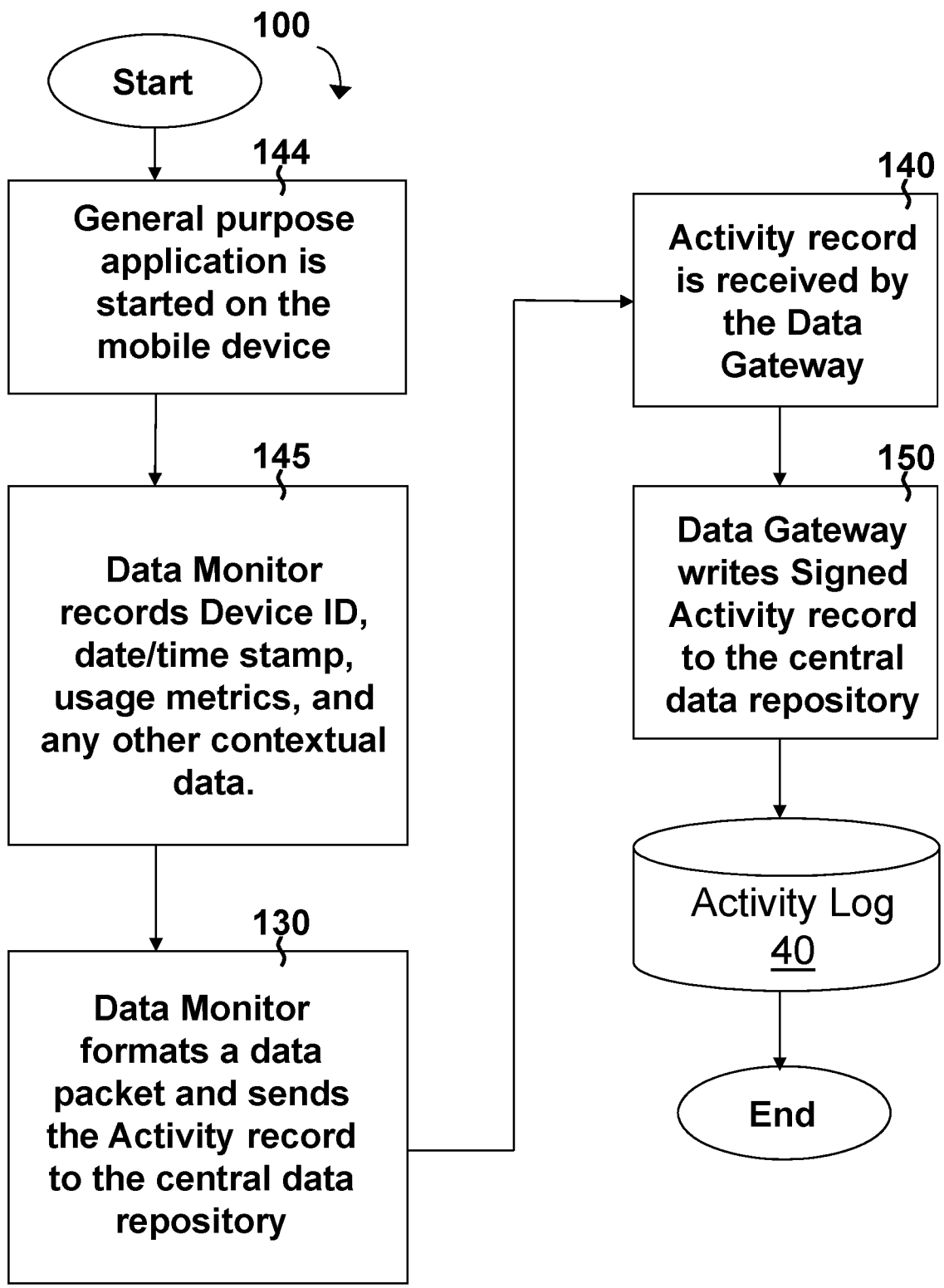

FIG. 3P illustrates a data flowchart for detecting application initiation and usage using Generic Application 33 on Mobile Communications Device 20 in accordance with an embodiment of the present invention. Initially, in step 144, a general purpose application, such as Generic Application 33, is started on Mobile Communications Device 20, for example, by opening and initiating the application. The general purpose application may further be used to execute processes, provide input/output, and generally perform other application tasks, which may include application usage metrics or measurement (e.g., computing power required, data services use, time/length of use, type of use, in-application communications, or other application use). In step 145, Data Monitor 21 located either on the Mobile Communications Device 20 or within the Cellular Service Provider Network 16 (e.g. Network Data Monitor 200 as discussed in reference to FIG. 11) recognizes that Generic Application 33 data service has been initiated and begins to capture information regarding the use of the data service including, for example, the unique Device ID of the Mobile Communications Device 20, the date/time stamp of the application usage, the application usage metrics (e.g., time/length of use, type of use, communications with alternate parties, computational and/or network resources consumed, etc.), an application identity (ID), and/or any contextual data associated with the application usage. Once the use of data services of Mobile Communication Device 20 is captured, (step 130), Data Monitor 21 formats a data packet which includes the collected information (e.g., in an Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3A) to Activity Log 40, a central repository for all data collected from Mobile Communications Device 20.

Figure 3Q:
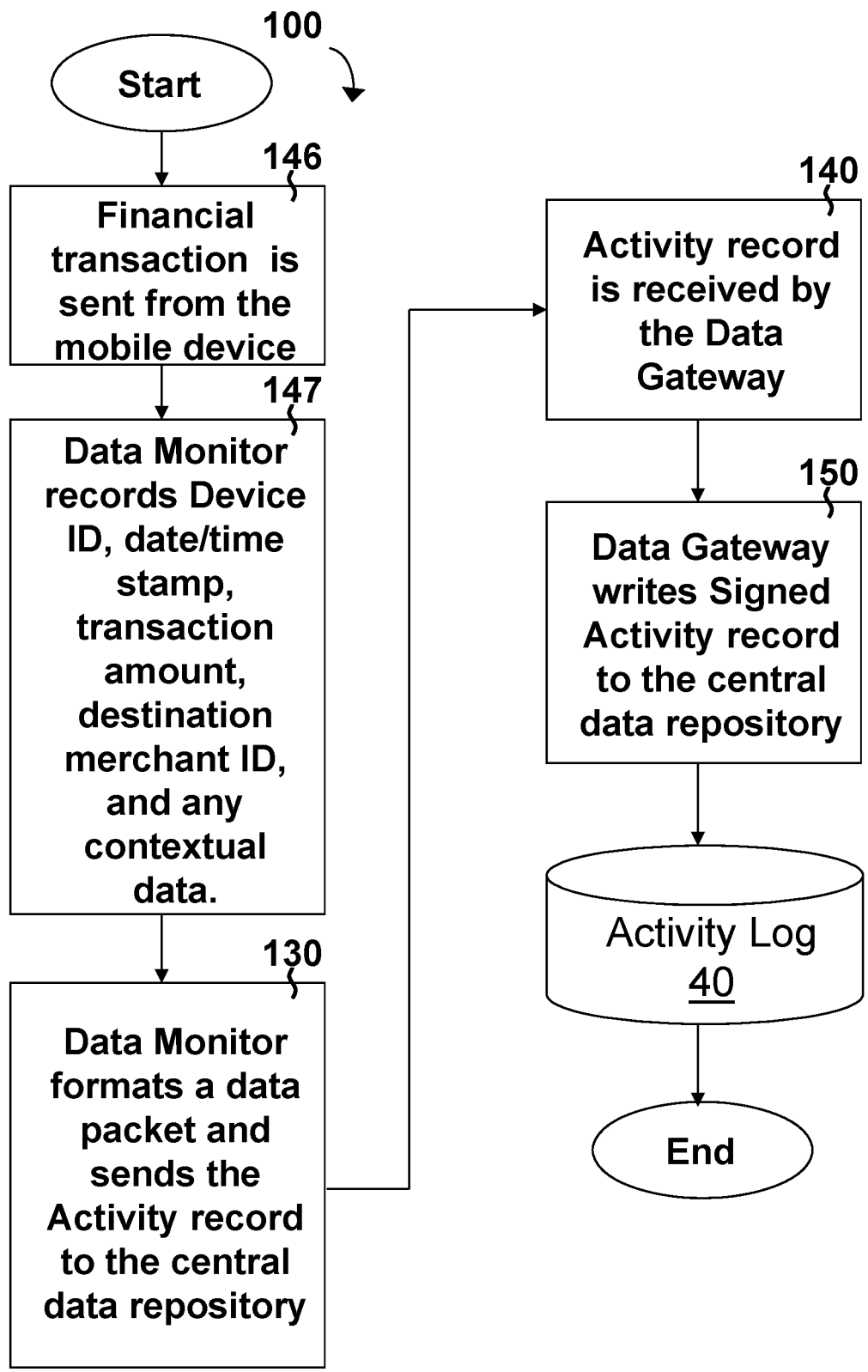

FIG. 3Q illustrates a data flowchart for the capturing of an outbound financial transaction using Generic Application 33 on Mobile Communications Device 20 in accordance with an embodiment of the present invention. Initially, in step 146, a financial transaction is sent from Mobile Communications Device 20. In step 147, Data Monitor 21 located either on the Mobile Communications Device 20 or within the Cellular Service Provider Network 16 (e.g. Network Data Monitor 200 as discussed in reference to FIG. 11) recognizes that Generic Application 33 data service has been initiated and begins to capture information regarding the use of the data service including, for example, the unique Device ID of the Mobile Communications Device 20, the date/time stamp of the application usage, the application usage metrics, the application ID, and/or any contextual data associated with the application's data service use. Once the application usage has been completed (step 130), Data Monitor 21 formats a data packet which includes the collected information (e.g., in an Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3A) to Activity Log 40, a central repository for all data collected from Mobile Communications Device 20.

One aspect of the monitoring capabilities in accordance with one or more embodiments of the present invention is the ability for the application to successfully log the activity that is occurring on Mobile Communications Device 20 into a centrally located Activity Log 40. An exemplary structure for Activity Log 40 database is shown in tabular form in FIGS. 4A and 4B in accordance with an embodiment of the present invention.

The first column identifies a unique key (referred to in FIG. 4A as Record ID) that is automatically assigned to each row of the database. This is followed by a unique Account ID which identifies the account associated with the log record, the data service that was invoked (referred to in FIG. 4A a Message Type), and whether the communication was inbound (in) or outbound (out) from the Mobile Communications Device 20. In certain embodiments, the message type and the in/out field may correspond to different data, such as an application type, or may be omitted where the application and data service use is on-device. The Start Time is a date/time stamp identifying the start of a data service use, completion of a data service or financial transaction, or starting usage of a particular application. The End Time is a date/time stamp identifying the completion of a call, data service, and/or application usage.

The Caller ID field shows the originating phone number, email address, merchant ID or username for inbound communications or data service uses and the destination phone number, email address, merchant ID or username for outbound communications or data service uses, as necessary. The Log field collects contextual information regarding the transaction which can include the contents of an email message, instant message, text message, debit or credit card transaction details (e.g., an amount or a card name or other card identifier), or any other form of information in accordance with some embodiments, including audio, photo, video, textual data, and/or multimedia information. This may also include specific application usage metrics and/or application ID or type.

The remaining fields found in FIG. 4B are supplemental data elements associated with a data transaction with a mobile device such as Mobile Communications Device 20 in accordance with one or more embodiments of the present invention. These data elements are optional and may be implemented and may be used, for example, for legal proceedings and other supplemental applications. The Long field shows the Longitude of the phone at the time of the transaction. The Lat field shows the Latitude of the phone at the time of the transaction (e.g., information provided by GPS, cell-based location applications, or network-based location applications as discussed previously herein). The CRC (cyclic redundancy code) field is the digital signature information of the database record to ensure its authenticity (e.g., as discussed in reference to FIG. 3A), which may be used to provide the CRC checksum or other types of error-detecting code information desired. The Auth field is the method of authentication used such as Biometric, password, no authentication (N/A), none, etc. The Auth ID field (e.g., authorization identification) is the identity of the person that authorized the transaction. The Carrier Log Auth field (e.g., authorization field) is the record number of the carrier's accounting system which relates to the transaction (e.g., cell phone carrier, financial transaction entity, or other data communication provider information as discussed in reference to, for example FIG. 1, depending on the type of data communication and/or financial transaction).

The rules that govern the access to data services on Mobile Communications Device 20 are maintained, for example, in Permissions 50 database. In accordance with an embodiment of the invention, this database would be accessible by the owner of the account using an HTML web interface. Exemplary structures for Permissions 50 database are shown in tabular form in FIGS. 5A-D in accordance with an embodiment of the present invention. Permission 50 database may include structures shown in each of FIGS. 5A-D and is not limited to a single embodiment of Permission 50 database in FIGS. 5A-D.

FIG. 5A demonstrates particular permission rules, which individually or in groups may be used to generate a permission scenario that is monitored using a mobile device for enforcement of a smart contract (e.g., completion of contract terms, violation of contract terms, or otherwise perform the required duties under the smart contract). The first column, Permission ID, identifies a unique key that is automatically assigned to each row of the database. This is followed by an Account ID which identifies the account associated with the permission record. The next field lists the Data Service for which the rules are to be applied, followed by the specific rules as to allow or deny access to that data service on the Mobile Communications Device 20.

As an example, a value of true in the Allow column would allow the use of that data service on the Mobile Communications Device 20, while a value of false in the Allow column would deny the use of that data service for the Mobile Communications Device 20. As another example, in accordance with an alternate embodiment of the present invention, would be to allow or deny use of the data service based on the application usage and constraints on application usage. The Constraint column may block a specific user or use of a data service. In FIG. 5A, row 103 shows Constraint as blocking a specific user. Row 108 shows a data service use as a game application usage, where Constraint column shows a limit of 10 hours per week. Thus, the permission for row 108 may limit application usage of the game application to 10 hours per week, and track the data service use of the game application.

Additionally, Permission IDs for particular permission rules and/or permission scenarios may be established for other types of smart contract monitoring. For example, a smart contract may be established for the shipment of goods, where the contract between parties is established as code that monitors the completion of shipment for the goods through data captured by a device. Thus, a device may capture data through device activity, which could include using a photograph with a date/time stamp and geo location at the receipt point as proof of delivery. Thus, the permission ID does not monitor the specific use of the mobile device as a term of the contract but instead uses the mobile device's monitoring capability to confirm a term of the smart contract for the shipment of goods. Other types of mobile device's monitoring capabilities may also be used to verify a smart contract that does not allow/restrict specific device data service uses based on device activity. For example, the mobile device's microphone, camera, touch screen, keyboard, or other input mechanism may be used to capture data for a smart contract and enforce the terms of the smart contract. The mobile device may also be used to capture time stamps, geo-locations, and other metadata associated with captured data.

The Alert Type and Alert Number fields identify the corresponding preferred method of alert notification and related contact information (e.g., email address, phone number, etc. to use to provide the alert). Alert type may further include an executable process or other action that may be taken based on whether the data service use is allowed or restricted. For row 105 and 108, the data service use is logged, and may be used to determine a penalty or reward based on completing or failing the corresponding constraint for the data service use. Multiple entries in the Alert Number field would be used to alert multiple users of an unauthorized event as exemplified in Record ID rows 103 of FIG. 5A in accordance with an embodiment of the present invention.

As shown in FIG. 5A, Permissions 50 database may include rules associated with financial transactions as exemplified in Permission ID row 107 of FIG. 5A associated with a "Wallet" data service (e.g., a wallet application such as a digital or mobile wallet application that executes some or all of a financial transaction associated with, for example, a mobile communications device). As shown in FIG. 5A, Permissions 50 database may also include rules associated with application usage as exemplified in Permission ID row 108 of FIG. 5A associated with a Game data service (e.g., the Generic Application 33 that may be used to perform computing actions, such as a video game, on Mobile Communication Device 20). Thus, row 108 identifies a permission rule for a video game application that monitors in-game time by Mobile Communication Device 20.

FIG. 5B illustrates an exemplary structure for Permissions 50 database shown in tabular form, where the structure in Permissions 50 database may define the name for a permission scenario (one or more rules from FIG. 5A that must be true for the scenario to pass). Thus, the exemplary data structure for a permission scenario may include one or more permission IDs for permission rules defined for particular smart contract, such as permission rules for an agreed contract between two or more parties.

The first column of FIG. 5B includes Scenario IDs for each individual permission scenario, which identifies a unique key that is automatically assigned to each row of the database. This is followed by an Account ID which identifies the account associated with the permission scenario ID. Finally, the last column contains a descriptive name for the permission scenario. A scenario in FIG. 5B may define restricted, allowed, and/or monitored device usage of a mobile communication device for a smart contract that provides a penalty or reward based on completing or violating terms of the smart contract (e.g., performing allowed/restricted device activities based on permission rule(s) for a permission scenario of the smart contract). A scenario may also correspond to contractual actions or terms between two or more parties that are required to be performed for a smart contract, where the terms (e.g., one or more rules) may be monitored using a mobile communication device having monitoring capabilities (e.g., for recording data to determine whether the contractual terms are completed or violated). Thus, a scenario may in Permission 50 database in FIG. 5B may include code for the permission ID(s) that constitute the particular terms or requirements under a smart contract.

FIG. 5C illustrates an exemplary structure for Permissions 50 database shown in tabular form, where the structure in Permissions 50 database may correspond to smart contracts generated using a permission scenario named in FIG. 5B. The permission scenarios govern the set of permissions that may be required to be monitored to determine whether the smart contract is fulfilled.

Permission 50 database in FIG. 5C may be used to define the rules in FIG. 5A that are to be associated with a permission scenario named in FIG. 5B to generate the terms of a smart contract, which may be enforced on Mobile Communication Device 20 through the use of a blockchain record and Data Monitor 21 for Mobile Communication Device 20.

The first column of FIG. 5C includes Record IDs which identifies a unique key that is automatically assigned to each row of the database. Record IDs may therefore be utilized to identify and perform lookup of a smart contract based on monitored activity, either on-device or by a device's monitoring capability of other data captured by the device. This is followed by a Scenario ID which identifies the scenario or smart contract from FIG. 5B. The next field lists the Account ID which identifies the account associated with the scenario or smart contract. The fourth column is the Permission ID for a particular rule to be included in this scenario or smart contract from FIG. 5A.

For example, Record ID 1000 has a scenario ID 300 that is used by account ID 200 which has an applied permission ID 102 to block the SMS data service. The Record ID of 1007 is associated with a request to monitor Facebook® usage for account ID 202. Other types of permissions may include different data monitoring requests and/or limits on data service uses. For example, game time, texting, and/or phone calls may be monitored. In other embodiments, data service and application usage may be enabled or disabled for particular device applications and/or device data service uses or enabled or disabled during certain times of the day.

The smart contracts in FIG. 5C may be generated using the permission scenarios with particular processing actions to be executed in response to the device activity that is monitored and the permission scenarios for allowed/restricted usage. Thus, a record ID for a particular smart contract may further include a triggering condition that implements a penalty or reward for the corresponding user ID and/or resource ID. A penalty may limit application or device data service use, or may deduct value from a digital wallet (including virtual values, cryptocurrency, and/or fiat). For example, Mobile Communication Device 20 may be required to provide compensation if a smart contract is violated, or may have restricted access and/or use of an application or data service. Conversely, a benefit may provide increased or relaxed device/application data service use, or may provide a value to Mobile Communication Device 20's digital wallet.

Smart contracts shown in Permission 50 database for FIG. 5D may be recorded in a trusted manner using a blockchain. The administrator may generate a smart contract using Permission 50 database by designating permission rules and generating a permission scenario shown in the Scenario ID column. The monitoring may therefore determine compliance or violation of the scenario ID.

Once the smart contract corresponding to Record ID 100 in FIG. 5D is created for example, the administrator device or server may write the smart contract to a selected blockchain, which may be publicly or privately administered. In other embodiments, other types of contract validation and verification may be performed. The blockchain record of the smart contract(s) may provide a distributed manner to verify the smart contracts and prevent changes to the smart contract. This allows the administrator device, Mobile Communication Device 20, or other entity to confirm the smart contract and determine whether data service uses are allowed or restricted under the permission scenario for the smart contract.

The permission scenario for each smart contract for Mobile Communication Device 20 may be pushed to Mobile Communication Device 20. The permission scenarios may also be stored in a remote server for monitoring of data usage and determination of fulfillment of the smart contract on the blockchain. Thus, Data Monitor 21 on Mobile Communication Device 20 may monitor data service use and other application usage and process the data service use with the smart contracts to determine fulfillment or violation of the smart contracts. In further embodiments, other data monitors, such as another device's data monitor, Cellular Network Data Monitor 200 and/or Alert Monitor 70 may perform the monitoring and processing of data service uses with the smart contracts to determine whether data service uses are allowed or restricted.

A permission scenario may be utilized with penalties and rewards as shown in FIG. 5D to enforce a smart contract. FIG. 5D illustrates an exemplary structure for Permissions 50 database shown in tabular form, where the structure in Permissions 50 database may correspond to penalties and rewards for the smart contract shown in FIG. 5C after monitoring device and application data service uses. Permission 50 database in FIG. 5D may be used with permission scenarios in FIG. 5B and the smart contracts in FIG. 5C to enforce smart contracts. For example, the rewards and penalties in FIG. 5D may be provided to a user and/or device based on comparing monitored data to a smart contract that is recorded by a blockchain record or other contract verification process. Thus, FIG. 5D shows the implementation of a reward or penalty based on monitored data and the successful completion or failure of contractual requirements for a smart contract.

The first column of FIG. 5D includes Record IDs for each individual smart contract, which identifies a unique key that is automatically assigned to each row of the database. The next field lists a Scenario ID representing an individual smart contract defined in FIG. 5B that uses the rules from FIG. 5A in an association that is defined in FIG. 5C. This is followed by a result of the smart contract, which corresponds to whether the data service uses of Mobile Communication Device 20 passed or failed the smart contract (e.g., whether those usages were allowed or restricted based on the permission scenario of the smart contract). The fourth column includes the interval that the smart contract is monitored. Finally, the last three columns contain the resulting processing actions that are to be taken, the data service effected (eWallet, Facebook, SMS), the action to be taken (Pay, Deduct, Allow, Deny), and the value (monetary penalty or reward) or duration (length of penalty or reward to be applied to a data service).

For example, a record ID 100 a passing rule for the Scenario ID 300 during a weekly monitoring interval. This indicates that in the event that the device's usage complied with Scenario ID 300 and did not perform data service uses that were restricted under scenario ID 300 (or performed allowed/required data service use for scenario ID 300). Thus, a reward of 10 tokens is applied to an eWallet of the corresponding device. Other rewards may include additional or relaxed device/application usage, as shown in record ID 104 that allows games on the corresponding device for a week. In other embodiments, data service use may fail a smart contract. For example, record ID 101 shows that a daily monitoring of scenario ID 301 imposed a 10 token deduction from the device's digital wallet. Other types of restricted device/application usage may also be applied as a penalty, such as blocking games for 3 days in the contractual failure under record ID 102, or blocking social networking for a week for record ID 103.

Figure 5E:
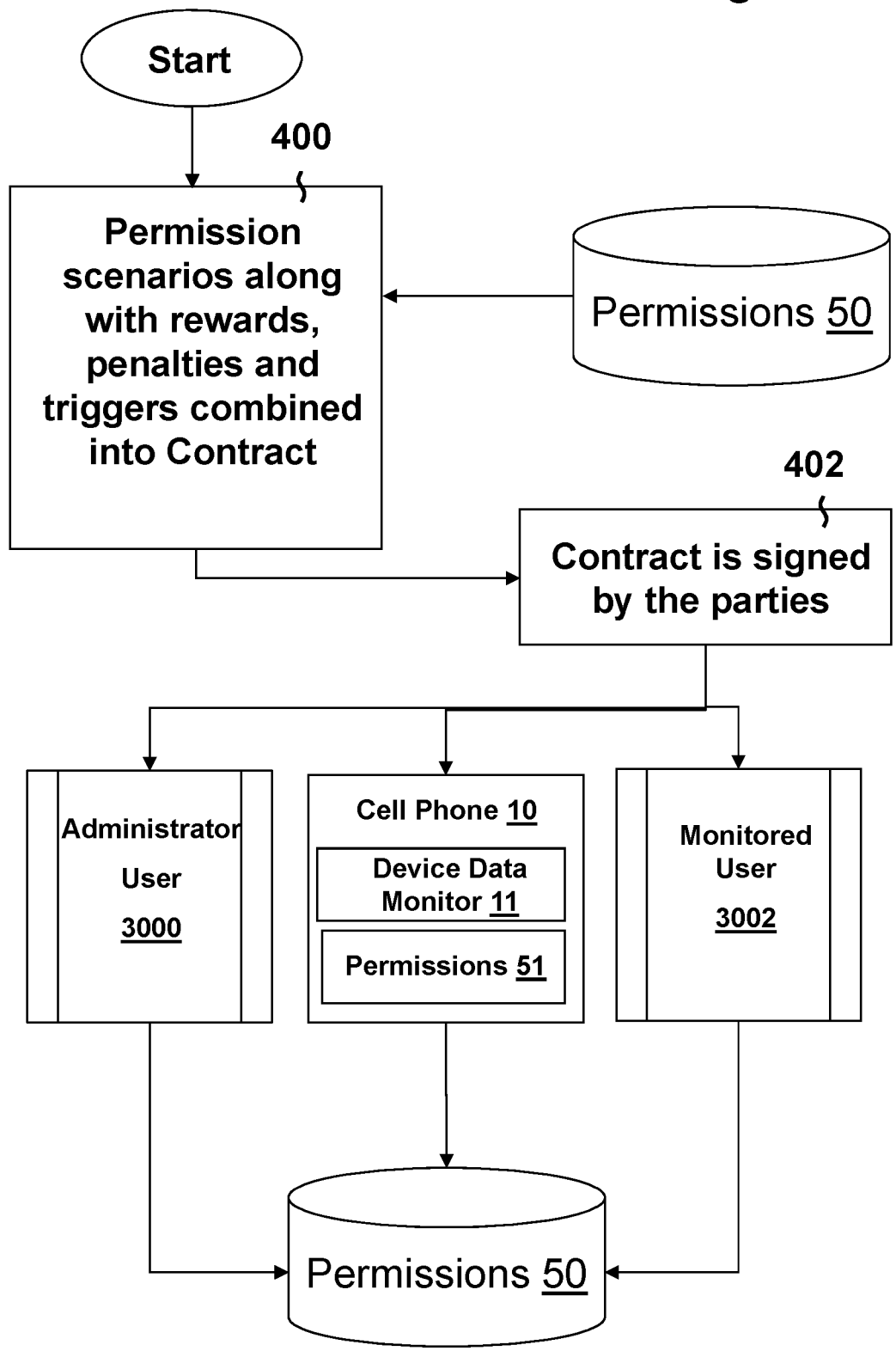
FIGS. 5E-F illustrate exemplary flowcharts of the establishment of permission scenarios for smart contracts and the definition of smart contract penalties and rewards based on mobile communication device monitoring in accordance with one or more embodiments of the present invention.
Figure 5F:
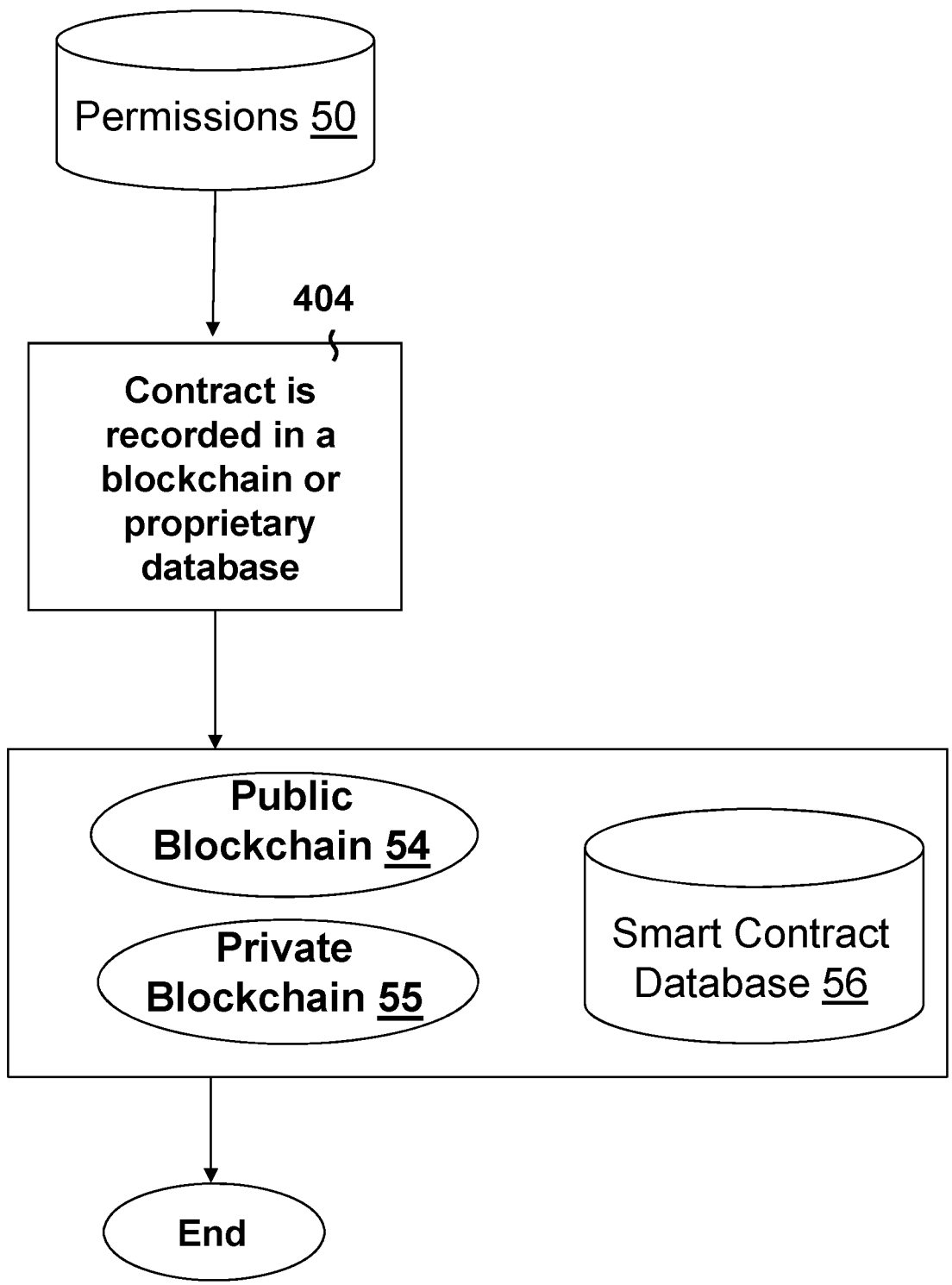

FIGS. 5E-F illustrate exemplary flowcharts of the establishment of permission scenarios for smart contracts and the definition of smart contract penalties and rewards based on mobile communication device monitoring in accordance with one or more embodiments of the present invention. FIG. 5E shows the generation and establishment of a smart contract between an Administrator User 3000 and a Monitored User 3002, such as a user using Mobile Communication Device 10. Administrator User 3000 may correspond to a parent, guardian, or employer, or other administrator of Monitored User 3002, such as a child, employee, or other user of the monitored device.

The flowchart of FIG. 5E starts at step 400, where permission scenarios along with rewards, penalties, and triggers are combined in a smart contract. The permission scenarios may correspond to a string or grouping of permission rules that serve to define a particular smart contract and the corresponding allowed/restricted data service uses (e.g., the triggering condition of a reward or penalty). Administrator User 3000 may generate the smart contract using Permission 50 database discussed in reference to FIGS. 5A-D. The smart contract may then be signed by the parties at step 402, which may be performed by verifying the smart contract and validating acceptance of the terms of the smart contract. This smart contract may be therefore be verified by both Administrator User 3000 and Monitored User 3002. Additionally, the smart contract may be validated for monitoring of Cellphone 10 or other Mobile Communication Device 20 using Device Data Monitor 11 and Permissions 51 database on Cellphone 10. The smart contract may also be stored with Permission 50 database for monitoring and enforcement by other devices.

FIG. 5E shows the generation and establishment of a smart contract between Administrator User 3000 and Monitored User 3002, such as user using Cellphone 10 or another Mobile Communication Device 20. Administrator User 3000 may correspond to a parent, guardian, or employer, or other administrator of Monitored User 3002, such as a child, employee, or other user of the monitored device. Once a smart contract is generated and signed, confirmation of the smart contract may be required to allow the independent parties (e.g., Administrator User 3000 and a Monitored User 3002) to confirm the contracts details, prevent changing of the digital smart contract, and enforce the smart contract through data service use monitoring.

The smart contract generated and stored by Permission 50 database may also be recorded in a blockchain or other proprietary database that provides digital contract verification, at step 404 of FIG. 5F. This may include writing the smart contract to a record block in a Public Blockchain 54, a Private Blockchain 55, or a proprietary Smart Contract Database 56. Public Blockchain 54, Private Blockchain 55, or proprietary Smart Contract Database 56 may provide durable recording of the smart contract that prevents tampering. Writing to Public Blockchain 54, Private Blockchain 55, or proprietary Smart Contract Database 56 may be performed by the administrator device and/or another device after both parties have consented to the contract and signed the contract. The blockchain, distributed among computers within the blockchain's distributed network, may receive a broadcast of the smart contract, and may record the smart contract to a record in the blockchain. Nodes within the blockchain's distributed network may also pass broadcasted smart contracts to other nodes for storage in a record.

Thus, the records for Public Blockchain 54, a Private Blockchain 55, or a proprietary Smart Contract Database 56 may be distributed among multiple devices, including devices for Administrator User 3000 and Monitored User 3002, which may allow independent device monitoring and collaboration to determine rewards or penalties for data service uses monitored for the smart contract. Once a smart contract is recorded to a record, the record may be verified, audited, and secured by the nodes within the blockchain's network. Blocks may also further be secured from tampering by having subsequent blocks add a cryptographic hash of the previous block. Blocks of one or more valid smart contracts may also be updated or appended based on monitored data service use, smart contract fulfillment/violation, and the implementation of the reward/penalty when the contract is fulfilled/completed or when the contact is violated/incomplete after the contract's expiration or monitoring interval.

Figure 6A:
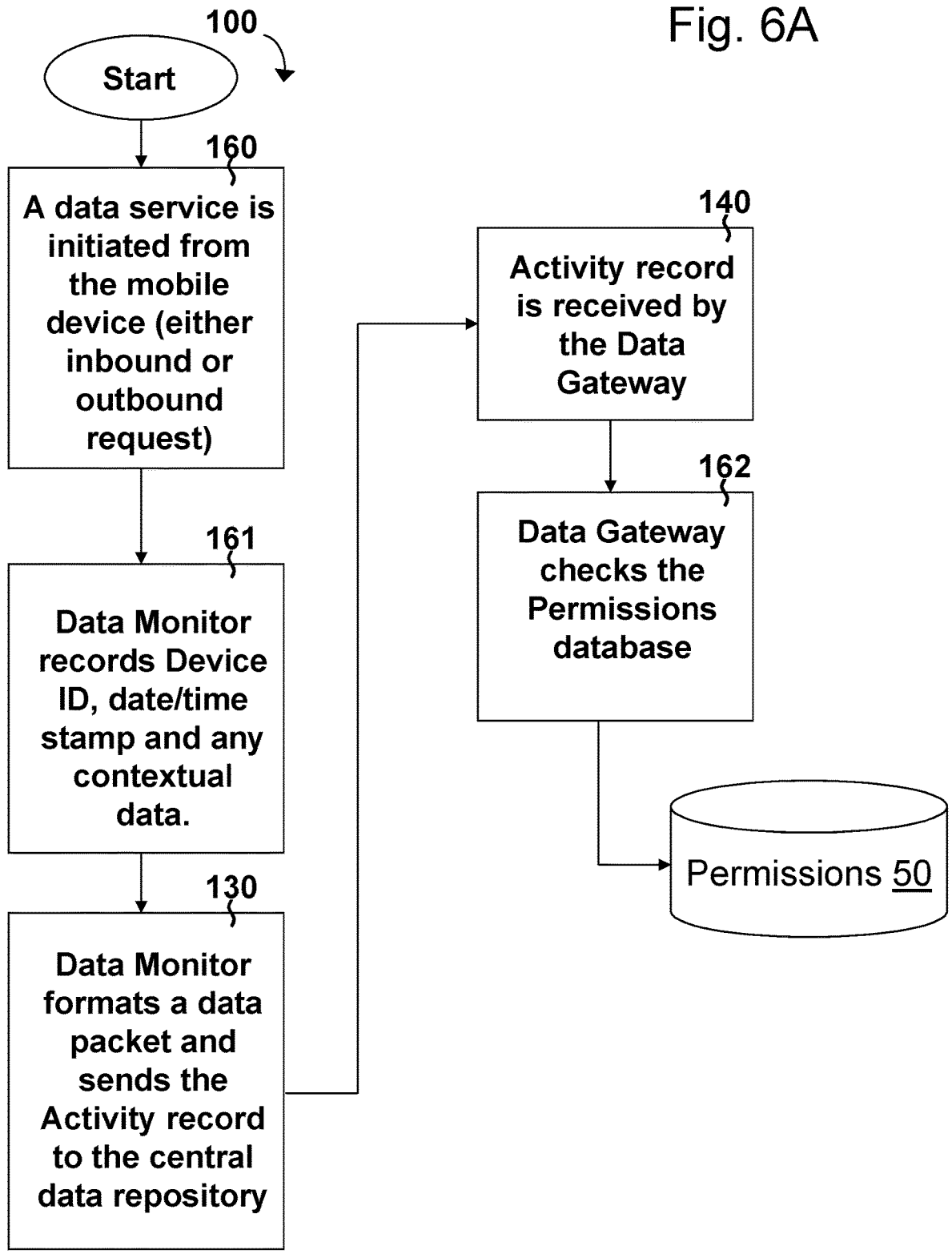
FIGS. 6A-6C illustrate exemplary flowcharts where the data service on a wireless device is processed or blocked based on the contextual information being passed through the data service in accordance with an embodiment of the present invention.
Figure 6B:
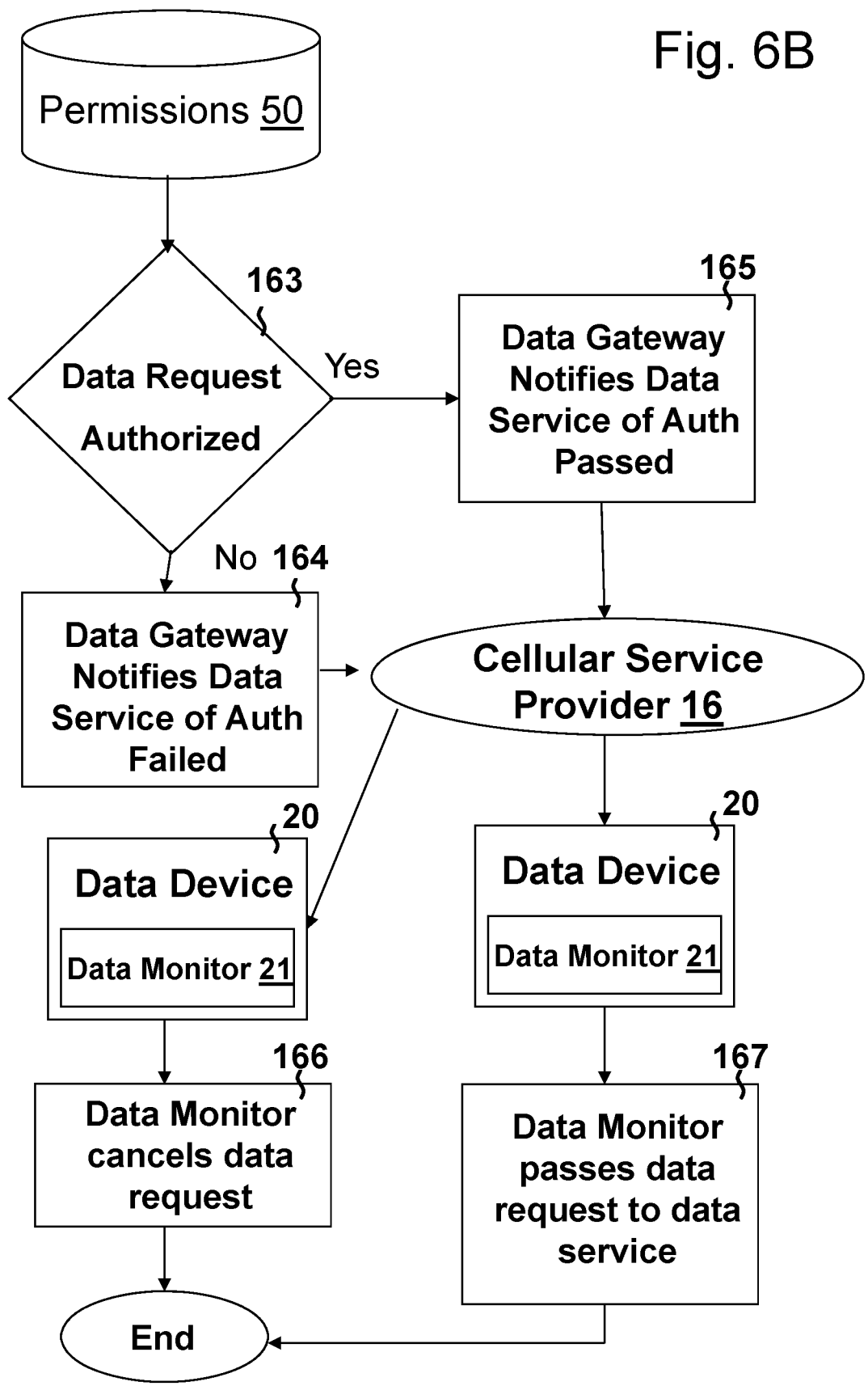

FIGS. 6A and 6B illustrate exemplary data flowcharts in accordance with an alternative embodiment of the invention where the contextual content of the communication is checked against Permissions 50 database prior to allowing Mobile Communications Device 20 access to the data services 22 through 29 and 31. Initially, in step 160, one or more data services 22 through 29 and 31 may be initiated on Mobile Communications Device 20. In step 161, Data Monitor 21 recognizes that a data service has been initiated and begins to capture information regarding the use of the data service including, for example, the unique Device ID of Mobile Communications Device 20, the date/time stamp, the originating or destination phone number, email address, or username, and/or the contextual content of the data packet.

Once the request for a data service has been received (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then checks the content of the data packet(s) in step 162 against Permissions 50 database located in Data Center 17. If the data request was not authorized (step 163), Data Gateway 30 notifies (step 164) Mobile Communications Device 20 by sending a message through Cellular Service Provider 16 to Data Monitor 21 on Mobile Communications Device 20. In Step 166, Data Monitor 21 cancels the data service request. If the data request was authorized (step 163), Data Gateway 30 notifies (step 165) Mobile Communications Device 20 by sending a message through Cellular Service Provider 16 to Data Monitor 21 on Mobile Communications Device 20. In Step 167, Data Monitor 21 completes the authorized data service request.

Figure 6C:
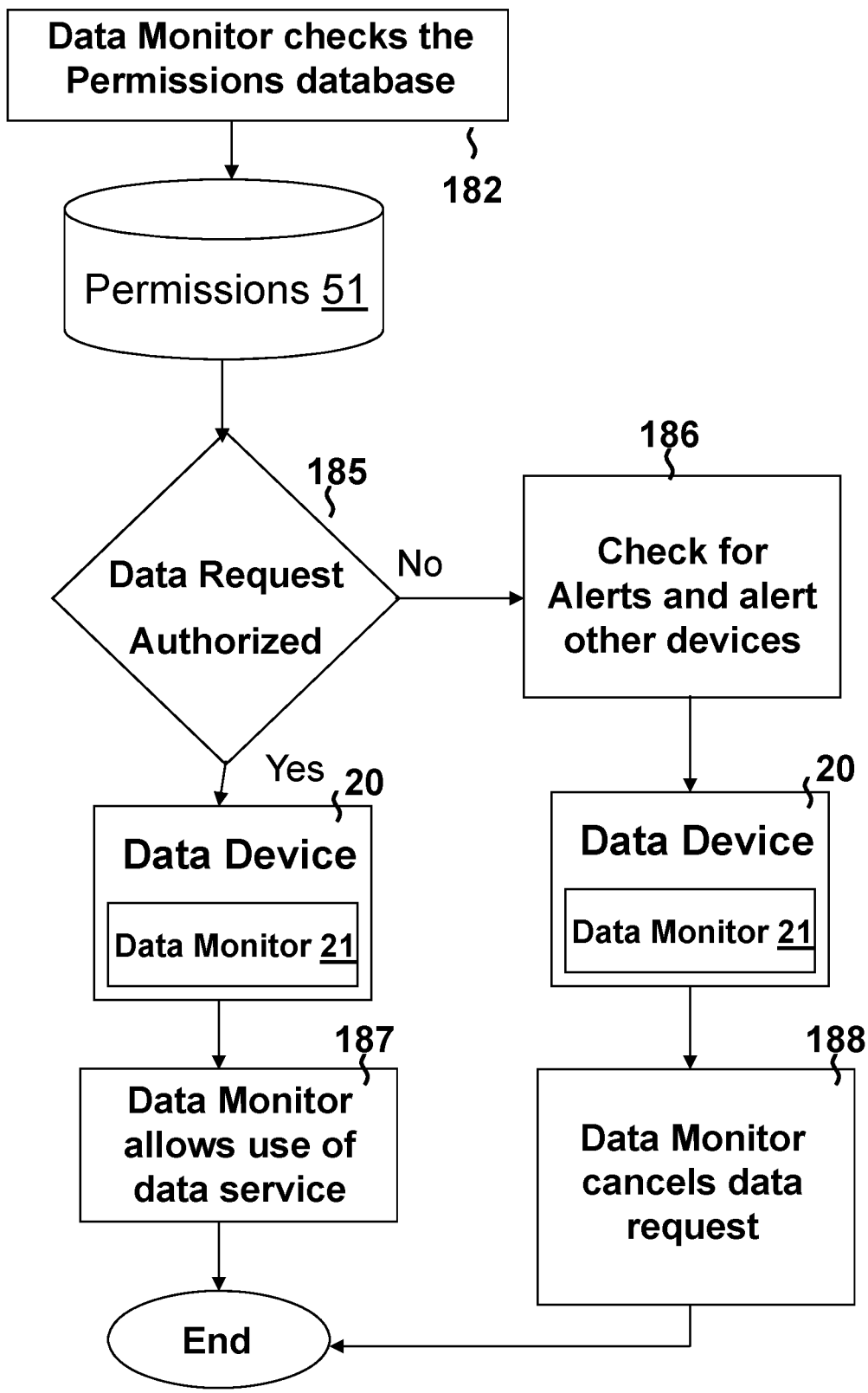

FIG. 6C shows an alternate embodiment whereby the Permissions 51 database resides locally on Mobile Communication Device 20. Once the request for a data service has been received (Step 130), Device Data Monitor 21 checks the content of the data packet(s) in step 182 against Permissions 51 database located on Mobile Communication Device 20. If the data request was not authorized (step 185), Device Data Monitor 21 on Mobile Communications Device 20 alerts other devices (step 186) and cancels the data service request in step 188. If the data request was authorized (step 185), Device Data Monitor 21 on Mobile Communications Device 20 completes the authorized data service request in Step 187.

Figure 7B:
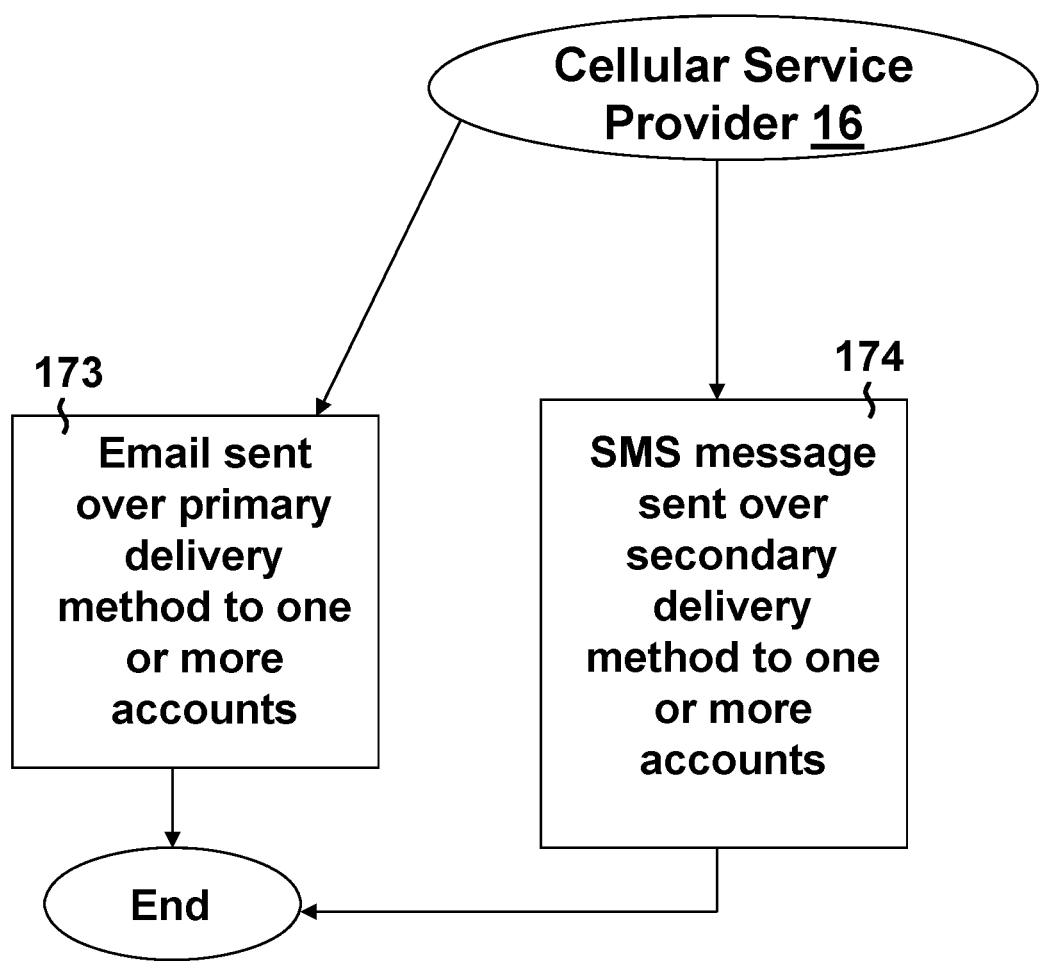

FIGS. 7A and 7B illustrate exemplary data flowcharts for the notification of unauthorized events on Mobile Communications Device 20 in accordance with an embodiment of the present invention. In Step 170, Alert Monitor 70 is monitoring the records being entered into Activity Log 40 database by Data Gateway 30. Each record is checked against Permissions 50 database. If the Log Activity is authorized (step 171), no further action is required.

If the Log Activity is not authorized (step 171), then Data Gateway 30 looks up the delivery notification method in Permissions 50 database (step 172) and sends an alert message via Cellular Service Provider 16 or alternately through any available communications network including for example PIN-to-PIN, Wi-Fi, Bluetooth, Personal Area Networks, Local Area Networks, and/or Public Networks (e.g., cellular networks, satellite networks, and/or the Internet) to one or more destinations. As an example, step 173 identifies an email message being sent to one of the users of the account while step 174 identifies an SMS text message being sent to an alternate user of the account. In accordance with one or more embodiments of the present invention, many forms of data communications may be supported, including for example voice messages, SMS Text Messages, email or any other publicly accepted machine-to-machine communications protocol.

Figure 8:
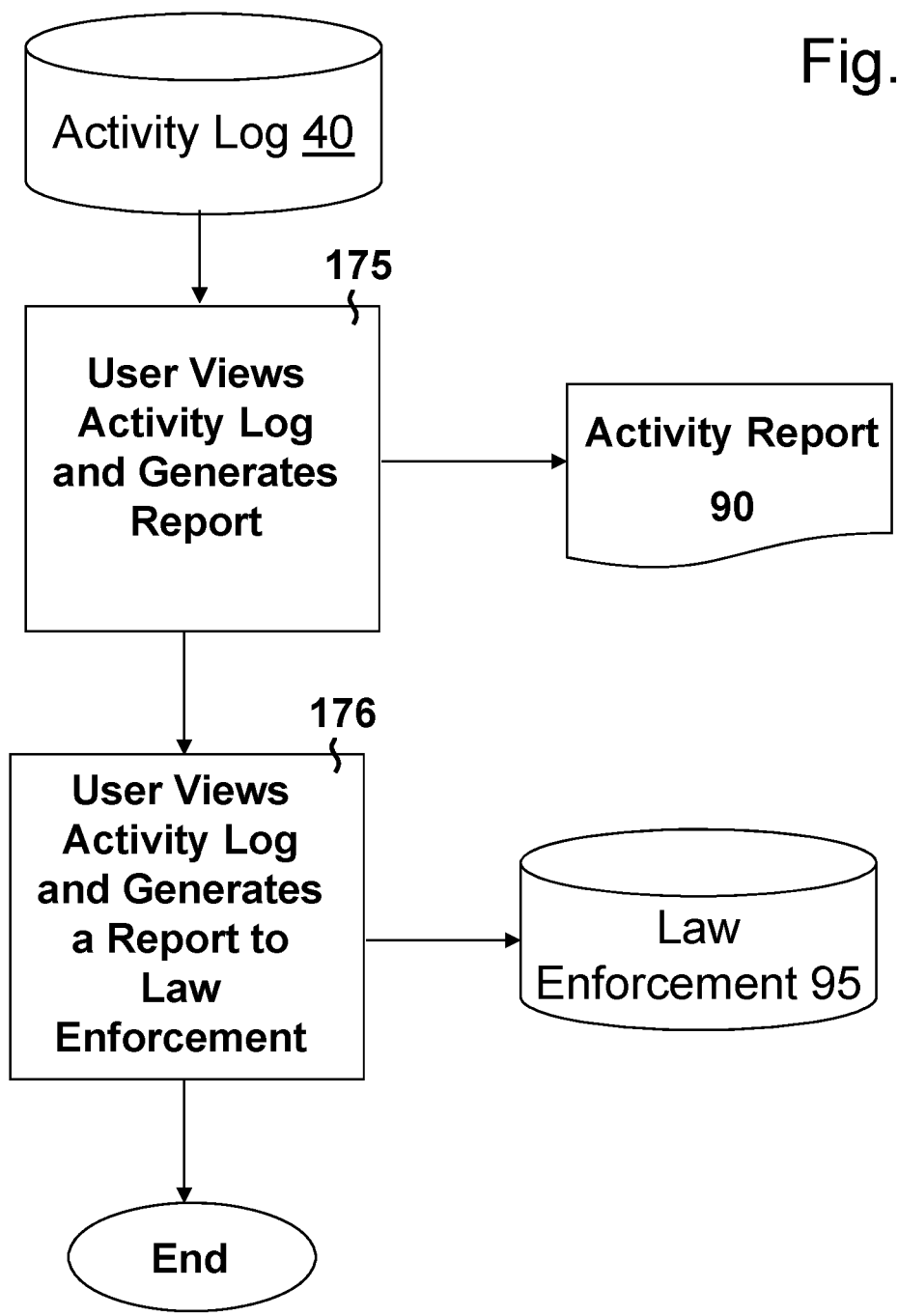
FIG. 8 illustrates an exemplary flowchart of a reporting process such as the Reporting tool in accordance with an embodiment of the present invention.

FIG. 8 illustrates an exemplary data flowchart for the reporting or exporting of information stored in the Activity Log 40 database in accordance with one or more embodiments. For example, an administrator (e.g., user) of the application or system (e.g., of Data Center 17) may view the contents of Activity Log 40 and request an Activity Report 90 from the system (step 175). Alternatively or in addition, the administrator may be requested or may identify a situation where the content of Activity Log 40 contains evidence of a criminal act and is reported (step 176) via an electronic transmission to a Law Enforcement agency 95.

For example, the administrator may discover a photograph of child pornography (or other illegal activity) captured in a Multimedia Messaging Service (MMS) message provided to the monitored mobile phone (e.g., Mobile Communications Device 20). This photograph along with the message headers, identifying source IDs and other evidentiary information may be filed, for example, electronically with the Center for Missing and Exploited Children or to the appropriate government agency. In general in accordance with one or more embodiments, Activity Report 90 and/or information provided to Law Enforcement agency 95 may satisfy chain of custody or other forms of custody of evidence requirements with respect to authenticity of the record or other information due to the signing (and possible encryption) of the information as discussed previously (e.g., in reference to FIGS. 3A-3Q). Thus as disclosed herein, a report containing authenticating data may be generated (e.g., from activity logs) between Mobile Communications Device 20 and a third party, which may be utilized for example by the party monitoring Mobile Communications Device 20 and/or by law enforcement authorities or other entities (e.g., agencies or organizations) lawfully provided with the report.

As disclosed herein, systems, methods, and program products are disclosed, in accordance with one or more embodiments of the present invention, which are directed to monitoring the communications to and from a wireless data device. For example in accordance with an embodiment, each of the data services on a wireless device, such as a cell phone, a Smartphone, a personal digital assistant (PDA), or a tablet, may be monitored against the permissions (e.g., rules) stored in a central repository. Data services may include all forms of communications between the device and a third party including, for example, cellular voice calls, short message service (SMS) text messages, email, instant messaging sessions, and/or the applications used by the data services including, for example, the address book, calendar, financial transactions, application usage, and tasks maintained on the wireless device.

For example in accordance with one or more embodiments, a client application such as an application installed on a mobile communications device, such as for example a cell phone, PDA, or tablet, transmits detailed device usage information such as application usage information using a wireless data connection from the device to a central repository. Alternatively or in combination with the client application installed on a mobile communications device, in accordance with one or more embodiments, a network data monitor may be installed on a communications network communicating with the mobile communications device to monitor and collect the detailed mobile communications device usage information to provide to the central repository. The communications network may represent a network of a cellular service provider or any other type of communications network (e.g., any standards or protocols) including for example PIN-to-PIN, Wi-Fi, Bluetooth, Personal Area Networks, Near Field Communication, Local Area Networks, and/or Public Networks (e.g., cellular networks, satellite networks, and/or the Internet). A generic application (such as a gaming, social networking, browsing, messaging, etc.,) may process or otherwise execute processes associated with the application's usage using a combination of hardware (e.g., a smart chip), software, and communications networks and protocols. Systems and methods disclosed herein may be used to manage access to and use of a device's applications based on any suitable combination of hardware, software, and/or communications protocols that are used to execute application processes.

Figure 9:
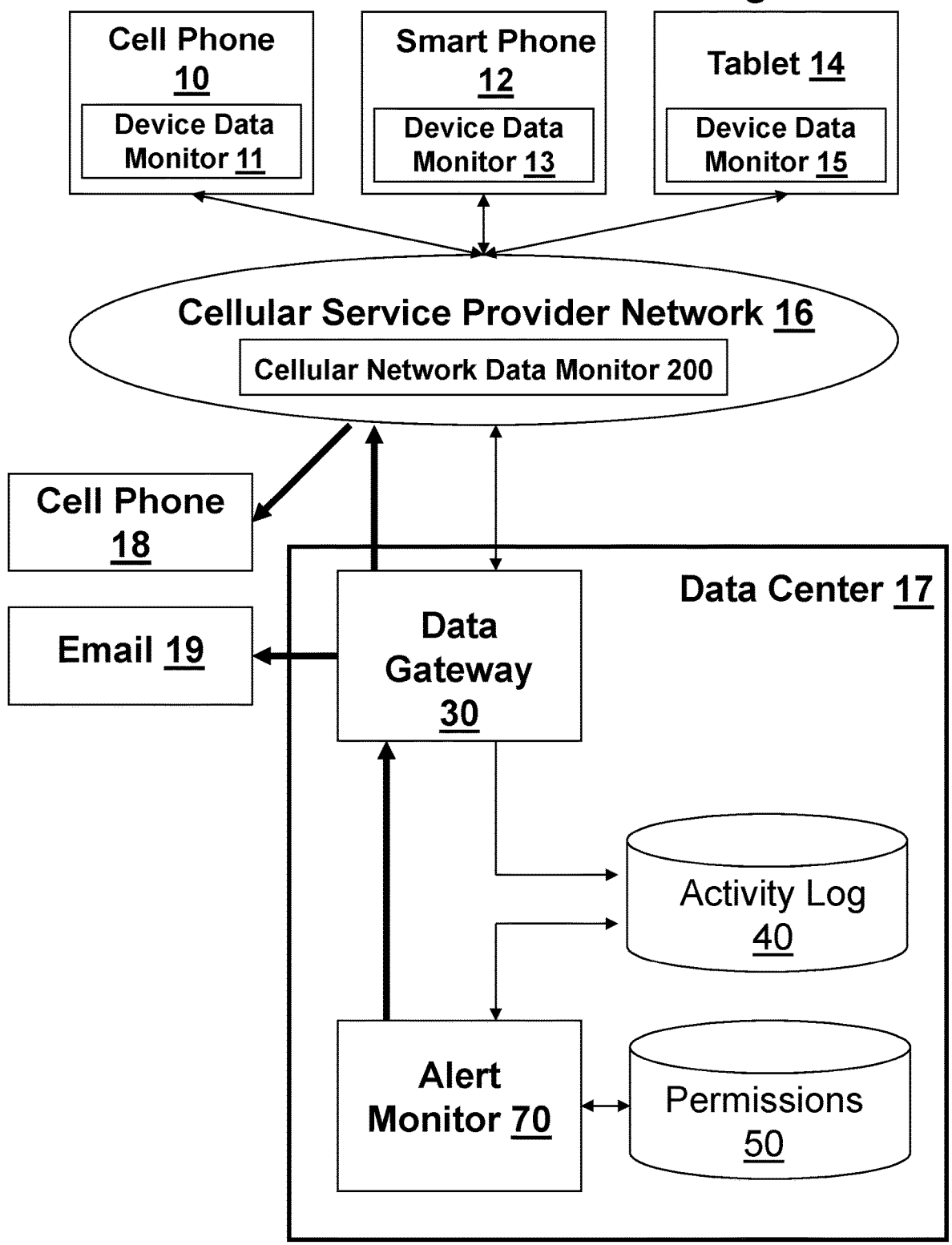
FIG. 9 is a block diagram of a system illustrating techniques to monitor the activities on a wireless device via data monitoring on the wireless device and/or on a carrier network in accordance with an embodiment of the present invention.

As an example, FIG. 9 is a block diagram of a system illustrating techniques to monitor the activities on a wireless device via data monitoring on the wireless device and/or on a communication network (e.g., carrier network) in accordance with an embodiment of the present invention. As can be seen, FIG. 9 is similar to FIG. 1, but further includes a Network Data Monitor 200 (e.g., a cellular-based network data monitoring program tool). Network Data Monitor 200 may be viewed as functioning and implemented in a similar fashion as described for Data Monitoring program tools 11, 13, or 15, but is located within the communications network (e.g., of Cellular Service Provider 16) rather than located within corresponding wireless device (e.g., mobile communications device) 10, 12, or 14. For example, Network Data Monitor 200 may represent software run by a logic device (e.g., a processor) of Cellular Service Provider 16 or a hardware-based logic device of Cellular Service Provider 16. Network Data Monitor 200 monitors the data services on wireless devices 10, 12, and 14 via communications between wireless devices 10, 12, and 14 and Cellular Service Provider 16 and provides the information collected on data services use to Data Gateway 30. Therefore, Network Data Monitor 200 may monitor and collect the various information on data services use for the various wireless devices (e.g., wireless devices 10, 12, and 14) communicating with Cellular Service Provider 16 and provide this information to Data Center 17 (e.g., via Data Gateway 30 or through any available communications network) such that this information can then be logged, processed, and analyzed in a similar fashion as described herein in reference to FIGS. 1-8.

In accordance with an embodiment, Network Data Monitor 200 may perform the data services use monitoring solely for a wireless device (e.g., wireless device 10) whether or not that wireless device has a Device Data Monitor programming tool (e.g., Device Data Monitor 11). Alternatively in accordance with an embodiment, Network Data Monitor 200 may perform the data services use monitoring solely for a wireless device (e.g., wireless device 10) only if that wireless device does not have a Device Data Monitor programming tool (e.g., Device Data Monitor 11). Alternatively, in accordance with an embodiment, Network Data Monitor 200 may perform the data services use monitoring for a wireless device (e.g., wireless device 10) in combination with the Device Data Monitor programming tool (e.g., Device Data Monitor 11) of the wireless device.

Figure 10:
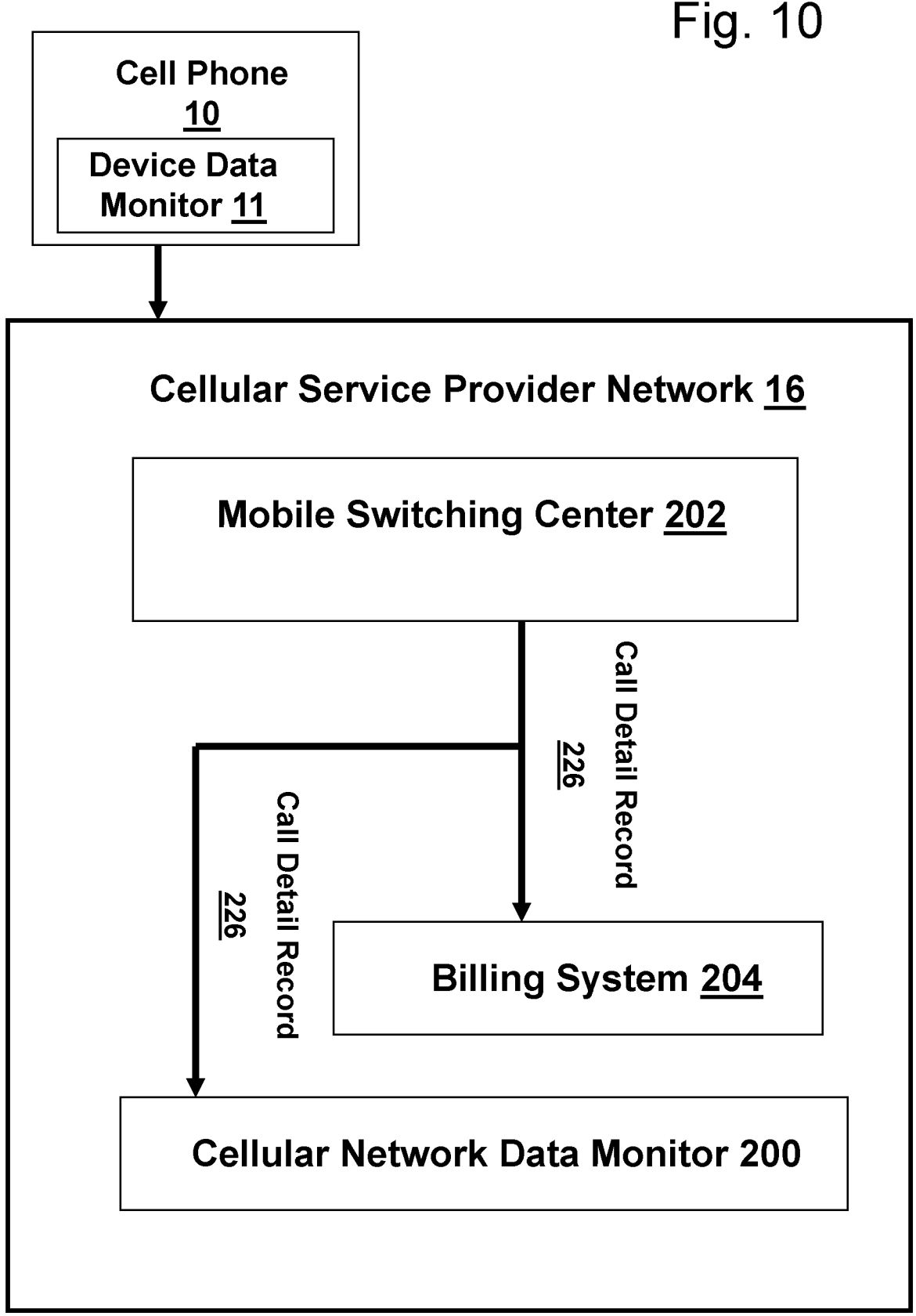
FIG. 10 is a block diagram as an example of a specific system illustrating a monitoring tool associated with a mobile communications device and/or the carrier network in accordance with an embodiment of the present invention.

FIG. 10 is a block diagram as an example of a specific system illustrating monitoring tools associated with a mobile communications device and/or the carrier network in accordance with an embodiment of the present invention. Specifically, FIG. 10 illustrates an example implementation of Network Data Monitor 200 within the network of Cellular Service Provider 16 to monitor data services use for one or more wireless devices (e.g., such as wireless device 10, which optionally may include Device Data Monitor 11).

Cellular Service Provider 16 includes a Mobile Switching Center 202, a Billing System 204, and Network Data Monitor 200. All telephone and SMS is routed through Mobile Switching Center 202 that generates a Call Detail Record (CDR) 226 associated with supporting the communication (e.g., switching or routing the telephone call or data packet (e.g., SMS message)) of wireless device 10. The Call Detail Record 226 (e.g., CDR packet) may then be provided to Billing System 204 of Cellular Service Provider 16 for billing purposes, as would be understood by one skilled in the art. The Call Detail Record 226 may also be provided to Network Data Monitor 200 (e.g., by providing a copy of the Call Detail Record 226 (e.g., CDR packet) via a switch splitter or port spanning (e.g., at the hardware layer)).

Network Data Monitor 200 may then use the Call Detail Record 226 to monitor the data services use of wireless devices (e.g., wireless device 10) using Cellular Service Provider 16 and to provide the information on the data services use to Data Center 17 to perform the various functions as discussed herein (e.g., in reference to FIGS. 1-8). Consequently, for one or more embodiments, the data services use monitoring techniques disclosed herein may be performed solely by Network Data Monitor 200, solely by Device Data Monitoring program tool 11 (if present), and/or by the combination of Network Data Monitor 200 and Device Data Monitoring program tool associated with the particular wireless device (e.g., wireless device 10 with Device Data Monitoring program tool 11) utilizing Cellular Service Provider 16.

Figure 11:
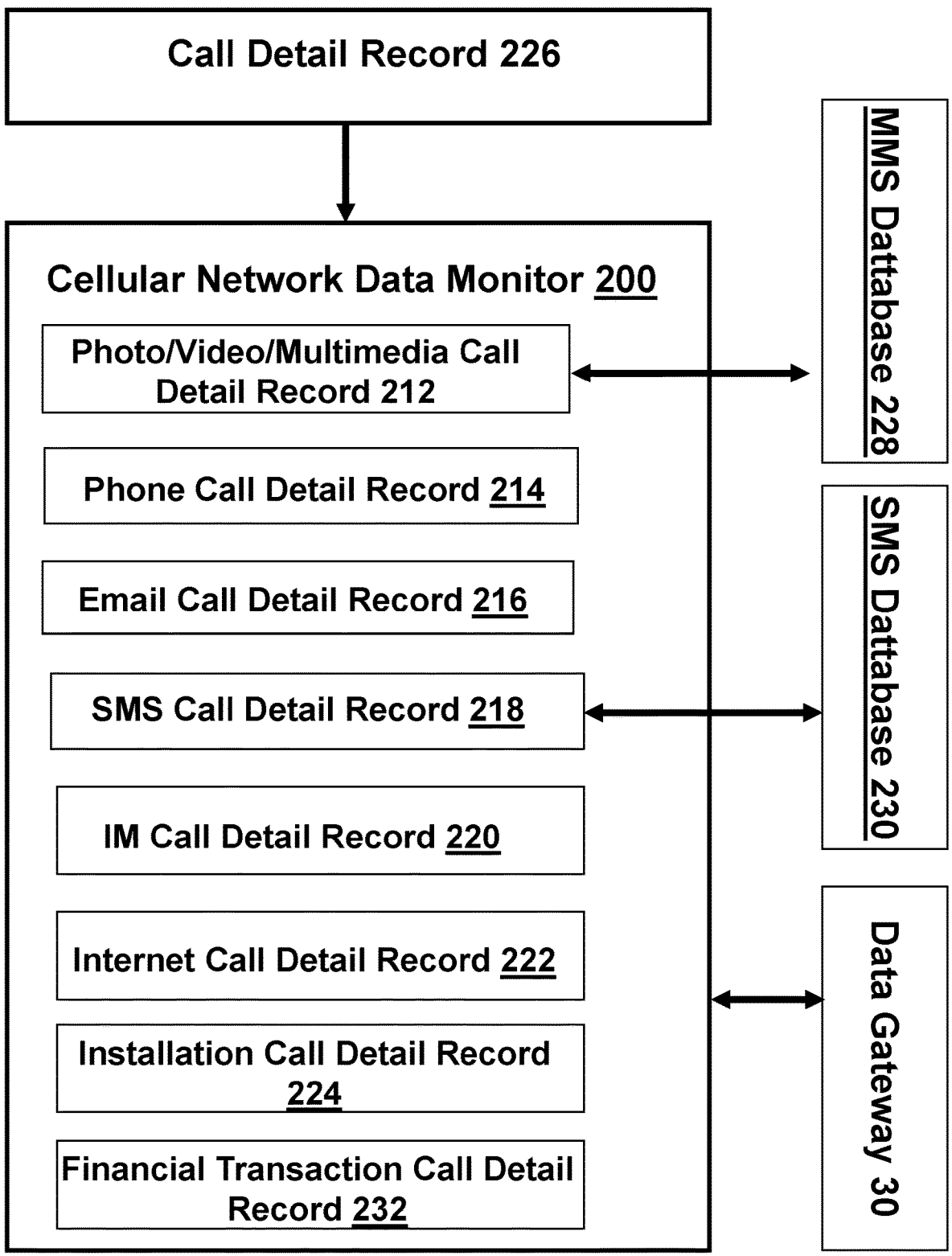
FIGS. 11 and 12 are block diagrams as examples of specific systems illustrating a monitoring tool associated with a mobile communications device and/or the carrier network in accordance with one or more embodiments of the present invention.
Figure 12:
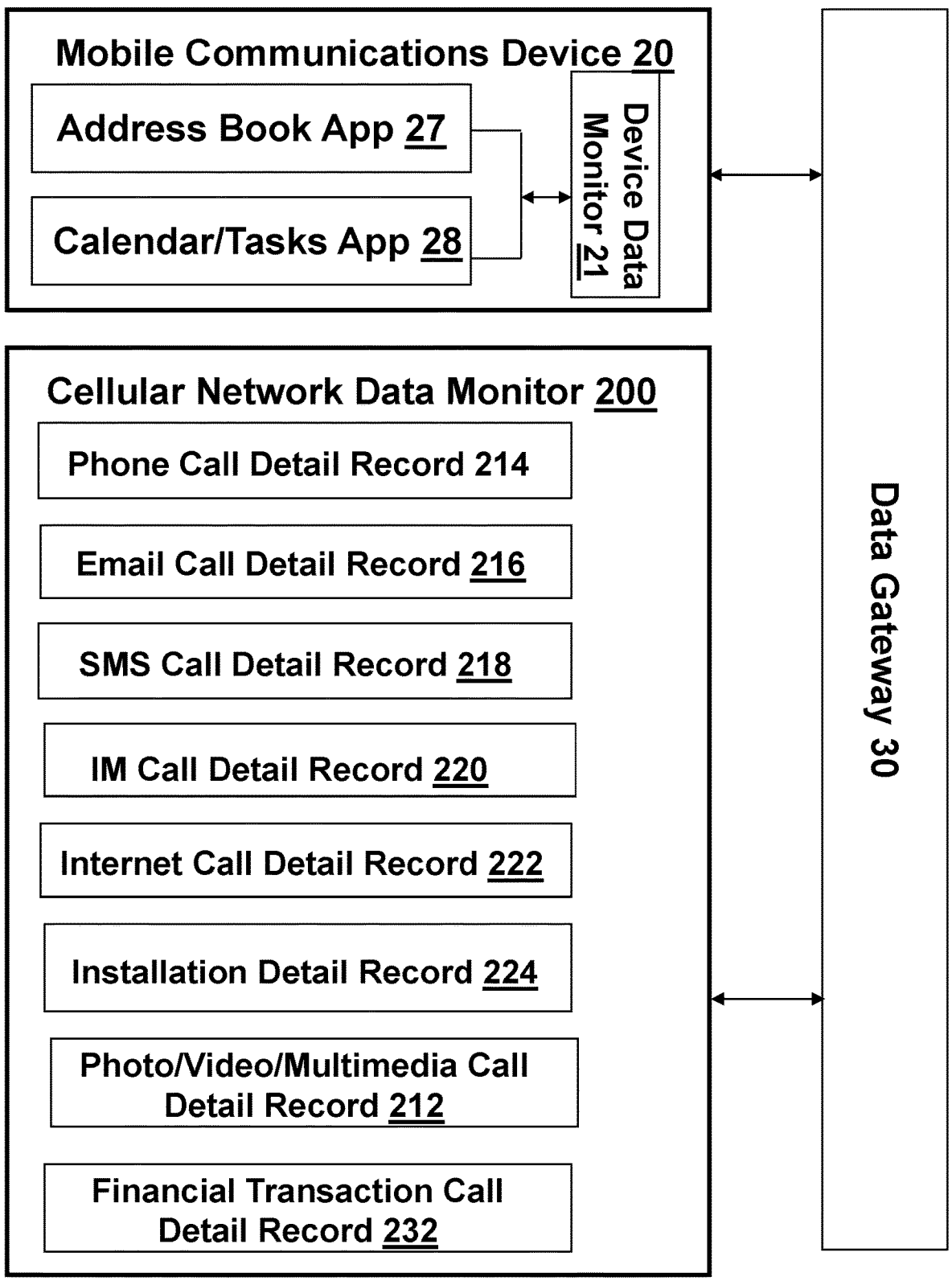

FIGS. 11 and 12 are block diagrams as examples of specific systems illustrating monitoring tools associated with a mobile communications device and/or the carrier network in accordance with one or more embodiments of the present invention. As a specific example for an embodiment, FIG. 11 illustrates Network Data Monitor 200 used to extract various data services use information from Call Detail Record 226.

As shown in FIG. 11, Network Data Monitor 200 may monitor and compile information on various data service uses, such as for example with respect to photos, videos, and multimedia (e.g., Photo/Video/Multimedia Call Detail Record 212), telephone calls (e.g., Phone Cal Detail Record 214), email (Email Call Detail Record 216), SMS communications (e.g., SMS Call Detail Record 218), IM communications (e.g., IM Call Detail Record 220), Internet use (e.g., Internet Call Detail Record 222), Application installations (e.g., modifications, deletions, additions, or Installation Call Detail Record 224), financial transactions (e.g., Financial Transaction Detail Record 232), and/or other types of application usage that may be monitored for metrics (e.g., time/length, amount, type, or other metrics of data service use). In general, Network Data Monitor 200 may monitor various data service uses to obtain the desired information for each wireless device in a similar fashion as described in reference to FIG. 2 for Data Monitor 21 (for the various examples of data service uses, such as Phone Application 22 through Photo/Video/Multimedia 31 and/or Generic Application 33).

Depending upon the desired application and specific implementation, prior to providing the data service use information to Data Center 17 (e.g., via Data Gateway 30), Network Data Monitor 200 may be able to extract all of the data service use information desired directly from Call Detail Record 226 or may utilize various databases as required to obtain the desired data service use information (e.g., such as when the source information is being received or transferred from within the carrier network rather than directly from the wireless device, as would be understood by one skilled in the art).

For example, for Photo/Video/Multimedia Call Detail Record 212, Network Data Monitor 200 may utilize an MMS Database 228 (e.g., of Cellular Service Provider 16) to obtain the desired data service use information associated with an MMS payload. As another example, for SMS Call Detail Record 218, Network Data Monitor 200 may utilize an SMS Database 230 (of Cellular Service Provider 16) to obtain the desired data service use information associated with an SMS payload. As another example, for address book, calendar, or task applications, the data services use may be monitored by Network Data Monitor 200 via Call Detail Record 226 if the associated wireless device synchronizes with the corresponding address book, calendar, or task database (e.g., as described in reference to FIGS. 3J-3L).

As another specific example for an embodiment, FIG. 12 illustrates Network Data Monitor 200 and Device Data Monitor 21 used in combination to extract various data services use information (e.g., associated with wireless device 20). As shown for example, Network Data Monitor 200 functions in a similar fashion as described in reference to FIG. 11 to obtain from Call Detail Record 226 (and various databases as needed, such as for MMS or SMS information) various data services use information to provide to Data Gateway 30. Additionally as an example, Device Data Monitor 21 within wireless device 20 functions in a similar fashion as described in reference to FIG. 2 to monitor wireless device 20 and provide various data services use information (e.g., Address Book Application 27 and Calendar/Task Application 28) to Data Gateway 30. The data services use information provided by Network Data Monitor 200 and Device Data Monitor 21 to Data Center 17 (e.g., via Data Gateway 30) may be utilized as described further herein (e.g., in reference to FIGS. 1-8).

In accordance with one or more embodiments of the present invention, the monitoring of the data services usage of a wireless device (e.g., a mobile communications device) may further provide certain benefits to a user (or owner) of the mobile device. For example, as discussed herein, the monitoring of various data services use may include monitoring access to information and/or applications associated with various data services. Therefore, a breach of a user's privacy may be prevented by monitoring attempts to access information associated with various data services if an attempt violates a rule (e.g., as set forth in Permissions 50 database and for example as described in reference to FIGS. 4-7B). As a specific example, if an application within the wireless device (e.g., wireless device 20) attempts to gain access to privileged user information and/or services without the user providing permission, the attempt to gain access may be blocked. For example, a particular application may attempt to access the user's telephone book, address book, email records, mobile wallet, or Internet use history without authorization, which may be blocked or the user notified by implementing the techniques disclosed herein. Specifically, the monitoring of this particular data service use (e.g., by Device Data monitor 21 and/or Network Data Monitor 200) may allow the unauthorized access attempt to privileged user information to be blocked using the techniques disclosed herein (e.g., as discussed in reference to FIGS. 5 and 6B) and/or to alert the user of the unauthorized activity (e.g., as discussed in reference to FIGS. 7A-7B).

As another specific example, if a user visits an application store from a wireless device (e.g., wireless device 20) and attempts to make a mobile application purchase using the mobile wallet (e.g., Generic Application 33), the attempt to complete the transaction or download the application may be blocked for violating one or more rules (e.g., as set forth in Permissions 50 database). For example, the administrator of the wireless device may have restricted the transfer of funds to or from a known IDENTITY (e.g., your child's friend Tom or a store such as Target®), block the purchase and/or download from a known IDENTITY (e.g., application store iTunes®), and/or block specific products from a known IDENTITY (e.g., iTunes Videos®). Specifically, the monitoring of this particular data service use (e.g., by Device Data monitor 21 and/or Network Data Monitor 200) may allow the unauthorized attempt to access funds in a mobile wallet to be blocked using the techniques disclosed herein (e.g., as discussed in reference to FIGS. 5 and 6B) and/or to alert the user of the unauthorized activity (e.g., as discussed in reference to FIGS. 7A-7B).

As discussed herein (e.g., in reference to FIG. 5), the particular rules within Permission 50 database that govern access and other data services use rights may be set by one or more entities (e.g., an administrator, such as the user, parent/guardian of the user, and/or owner/employer) as appropriate for the specific implementation associated with the wireless device. For example, the administrator may set various rules via the wireless device (e.g., by providing an appropriate password) and/or via a web user interface or by various conventional techniques, as would be understood by one skilled in the art. Furthermore, the rules may be applied to one or more wireless devices under an administrator's control (e.g., a family policy of rules or corporate rules applied to a number of wireless devices).

In general (e.g., in reference to FIG. 12), Device Data Monitor 21 may be used to capture the data service activity on a Mobile Communications Device 20 and Network Data Monitor 200 (e.g., Cellular Network Data Monitor) may be used to capture the data service activity originated or sent to a Mobile Communications Device 20 via the Cellular Service Provider 16 in accordance with an embodiment of the present invention. As discussed herein, alternatively or in combination with Device Data Monitor 21, Network Data Monitor 200 monitors the inbound and outbound activity for each of the data services captured at the Cellular Service Provider 16 and sends a detailed log of these activities to a central repository using Cellular Service Provider 16. Network Data Monitor 200 (e.g., Network Data Monitor 200 program tool) may send the activity information through any available communications network, such as for example the Internet, a company network, and/or a public cellular network.

Figure 13A:
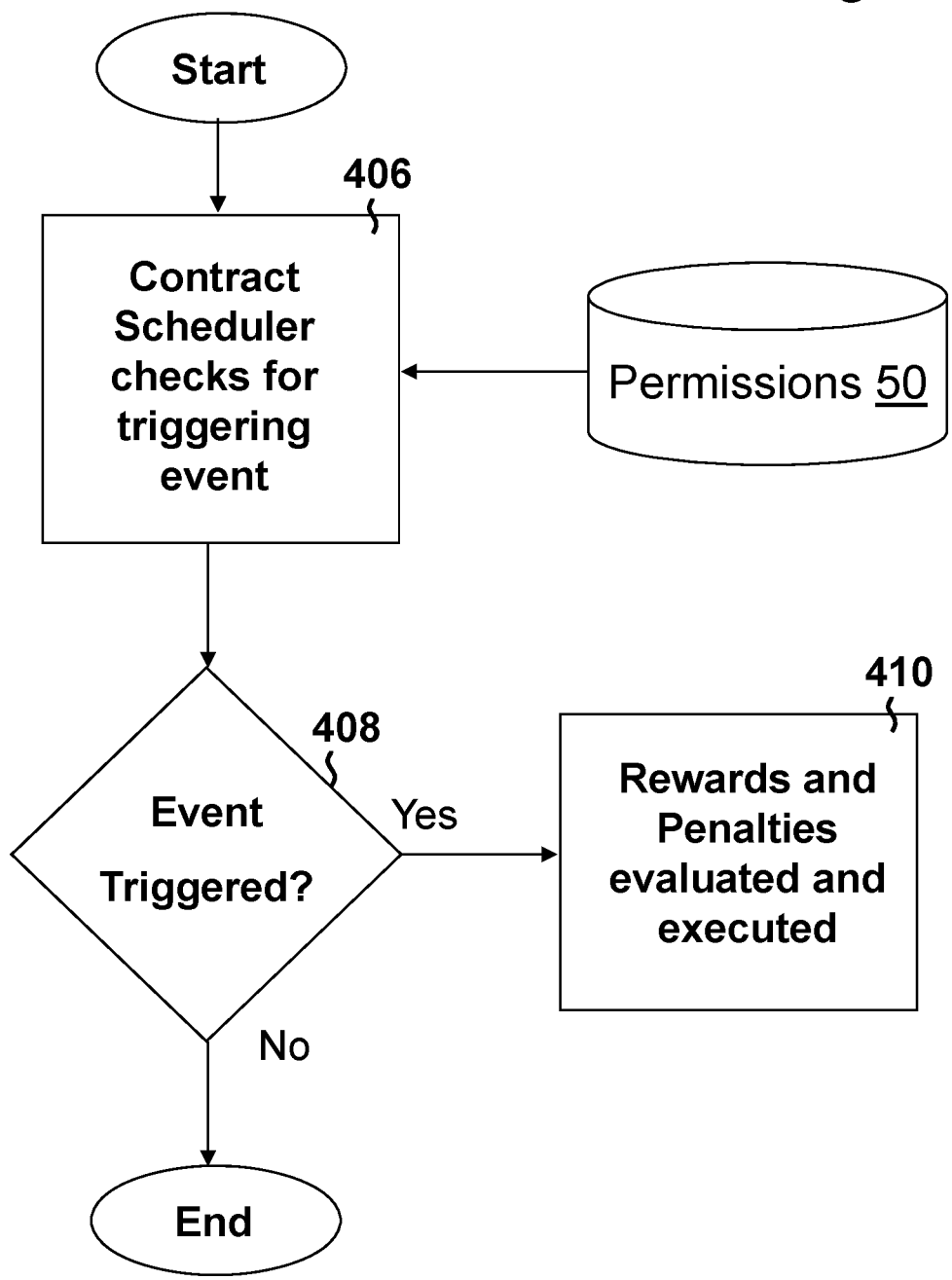
FIGS. 13A-B illustrates an exemplary flowchart for execution of a smart contract based on mobile communication device usage in accordance with one or more embodiments of the present invention.
Figure 13B:
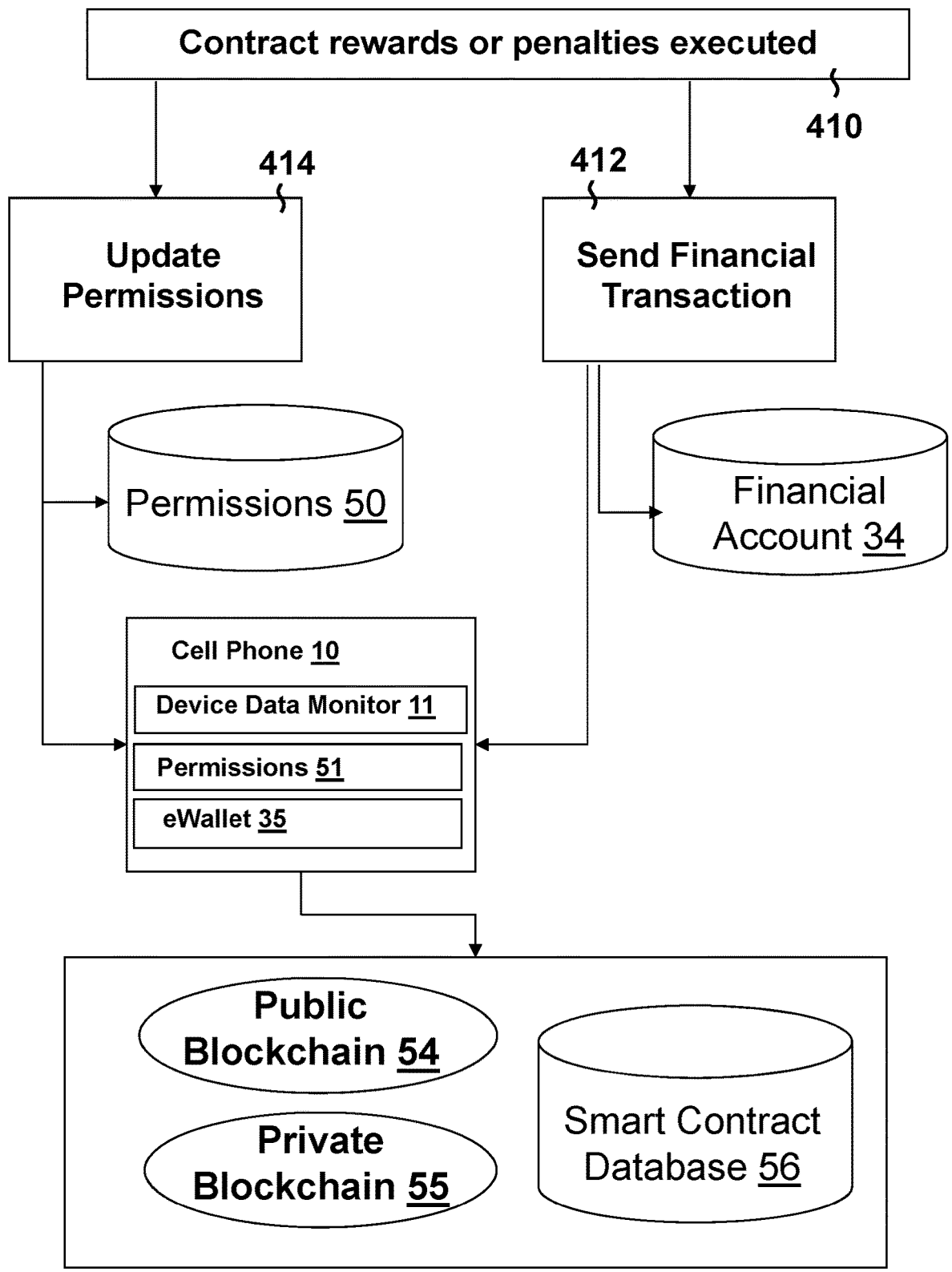

FIGS. 13A-B illustrates an exemplary flowchart for execution of a smart contract based on mobile communication device usage in accordance with one or more embodiments of the present invention. FIG. 13A illustrates an exemplary triggering process to determine whether a digital smart contract has been completed or if data service uses for the digital contract are violated or restricted. This allows a monitoring device to implement a penalty or reward for the unsuccessful/successful completion of the smart contract in a blockchain ledger or database.

The flowchart begins at step 406 by a monitoring device determining data service use and whether a digital smart contract's triggering event has been met, for example, by a contract scheduler device (e.g., Data Monitor 21, which may utilize additional component such as Alert Monitor 70). The triggering event may correspond to expiration of a time interval or time period that a device is monitored for, and may further include the data service use or other device application usage that triggers an event. For example, a triggering event may correspond to allowed or restricted application usage for a permission scenario. A particular triggering event may be an amount of hours of use of an application daily or weekly, or an amount of data service use by the application. Other triggering events may relate to specific application usage type, messaged individuals, transaction costs or items purchased, or other application usage.

At step 408, if the triggering event is not detected, the flowchart may end and device monitoring may cease for a limited time smart contract, or may continue/restart monitoring for the time interval of a repeating contract. However, if the triggering event is detected, at step 410, rewards and/or penalties may be assessed and executed. Flowchart 13B illustrates a process by which those processing actions may be determined and implemented.

Step 410 continues in FIG. 13B, where the contract rewards or penalties are executed based on the triggering condition previously determined in step 408. The contract reward or penalty may be assessed based on the permission scenario and the resulting processing action for data service uses that are allowed or restricted under the permission scenario. At step 412, a financial transaction is sent using a Financial Account 34 and the monitored Cellphone 10. The financial transaction may move value between Financial Account 34 and eWallet 35, which may be a deduction or deposit of value to eWallet 35 depending on the penalty or reward.

At step 414, permissions are updated based on the executed rewards or penalties. This may include appending Public Blockchain 54, Private Blockchain 55, or Smart Contract Database 56 based on the smart contract's performance by Cellphone 10. For example, the reward provided to or penalty imposed on Cellphone 10 based on performance under the smart contract, and the corresponding processing action, may be written to a record within Public Blockchain 54, Private Blockchain 55, or Smart Contract Database 56 by appending a previous smart contract record. This may be distributed over the corresponding blockchains and pushed to the individual devices, such as Cellphone 10.

As would be understood by one skilled in the art, embodiments of the present invention provide certain advantages over conventional approaches. For example, a conventional approach may simply provide parental controls, which monitor and block Internet and email access from a Smartphone (i.e., having similar capabilities to a desktop computer) and which primarily prevent access to unwanted content or block the transmission of personally identifiable information. However, a traditional cell phone (i.e., non-Smartphone) may not provide access to vital mobile communication device services such as phone and SMS logs or may contain other limitations inherent to the operating system of these older legacy-type of phones.

In contrast to these conventional approaches and limitations, in accordance with one or more embodiments, Network Data Monitor 200 would augment (or overcome) these limitations by capturing the data at the Cellular Service Provider 16. For example, most legacy cell phones allow the user to send and receive text messages, but the contextual information related to the text message transmission is stored in a Call Detail Record used by the Cellular Service Provider to route the message through its internal network for billing and eventual delivery to the intended recipient. Both the legacy phone as well as the internal carrier network can provide the SMS service, but do not inherently include parental or administrative controls.

As another example of a conventional approach, child and employee monitoring of geographic location may be provided from a cell phone, but this approach typically requires an active search by the administrator, parent or manager to locate the device. Perimeter boundaries or virtual fencing could be deployed using existing location technology, but in combination with other data services activity, a much more refined forensic alert system can be deployed.

For example, an employee being in the file room may be within the parameters of the virtual fence. Furthermore, taking a picture from a cell phone may be an acceptable activity in accordance with corporate acceptable use policies. However, taking a picture while located within the file room may be reason for concern, especially if followed by sending the picture to a non-corporate destination, which may require immediate attention by internal security personnel.

For example, the GPS information may be provided by Device Data Monitor 21 to Data Center 17, where it is stored in activity log 40, and an alert provided to the administrator if the Mobile Communications Device 20 enters a restricted area or proceeds outside of a defined geographic region. In general, Device Data Monitor 21 provides various information to Data Center 17 to permit an administrator (e.g., parent or manager) to monitor the activities (e.g., location, communications with a third party, and/or changes to applications or other data within Mobile Communications Device 20) of a user of Mobile Communications Device 20, with an optional alert provided to the administrator if an unauthorized activity occurs.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A system comprising:
   a memory configured to store programs and database information;
   a processor, coupled to the memory, configured to access the database information and run the programs; and
   a communication gateway, coupled to the processor and the memory, configured to receive information, including contextual information, on data service uses from a mobile, wireless, communication device, being monitored by the system, configured to:
   monitor the data service uses;
   compile the information associated with the data service uses; and
   provide the information associated with the data service uses to be received by the communication gateway;
   wherein the data service uses are associated with the mobile, wireless, communication device and comprise:
   inbound and outbound communications of the mobile, wireless, communication device; and
   an addition, modification, and/or deletion within the mobile, wireless, communication device to application data, wherein the information associated with the data service uses comprise message information for a message application data service use, including at least one of associated originating or destination email address, username, or telephone number along with contextual data, and wherein the information further comprises Internet access information and/or application installation information;
   wherein the database information comprises:
   an activity log database configured to store an entry for a data service use based on the information, including the contextual information, received from the mobile, wireless, communication device; and
   a permissions database configured to store rules as to whether the data service use is allowed for the mobile, wireless, communication device; and
   wherein the programs comprise:
   an alert monitor program configured to compare the entry for the data service use stored in the activity log database to an associated rule stored in the permissions database and to provide an alert if the data service use of the mobile, wireless, communication device is not allowed.

2. The system of claim 1, wherein the memory, the processor, and the communication gateway form a data center for monitoring the data service uses;
   wherein the system further comprises the mobile, wireless, communication device, wherein the mobile, wireless, communication device includes a data monitor program configured to perform the monitoring of the data service uses and the compiling of the information associated with the data service uses;
   wherein the data service uses further comprise an addition, modification, and/or deletion within the mobile, wireless, communication device of an application; and
   wherein the information associated with the data service uses comprises:
   telephone call information for a phone application data service use, including associated originating or destination telephone number and contextual data; and
   changes to application data information for at least one of an address book or a calendar along with contextual data.

3. The system of claim 1, wherein the data services associated with the mobile, wireless, communication device comprise a phone application and a text application;
   wherein the alert monitor program is configured to analyze the contextual information along with an associated telephone number, email address, or username to determine if the data service use for the mobile, wireless, communication device is not allowed; and
   wherein the information includes identification of the mobile, wireless, communication device along with a date and time associated with the data service use.

4. The system of claim 3, wherein the data services associated with the mobile, wireless, communication device further comprise an email application, an address book application, a calendar application, a tasks application, an instant messaging application, and a multimedia application, and wherein the contextual information includes a combination of two or more of text, message content, files, pictures, and audio information associated with the data service uses.

5. The system of claim 1, wherein the database information further comprises:

an address book database configured to store address book information of the mobile, wireless, communication device;

a calendar database configured to store calendar information of the mobile, wireless, communication device; and wherein the alert monitor program determines whether the data service use is allowed based at least in part on whether an identity that is in communication with the mobile, wireless, communication device and associated with the data service use is found in the address book database.

6. The system of claim 1, wherein the mobile, wireless, communication device comprises a cell phone, a personal digital assistant, or a smartphone, and wherein the data services associated with the mobile, wireless communication device comprises a location determination application.

7. The system of claim 1, wherein the programs further comprise a data gateway program tool configured to route the information on the data service uses received from the mobile, wireless, communication device being monitored to the memory and to route the alert from the alert monitor program to a designated external device.

8. The system of claim 1, wherein the system monitors communications to and from the mobile, wireless, communication device by monitoring the information on the data service uses to detect unauthorized activity, and wherein the system further provides web-based access to the database information for an administrator to review the information on the data service uses of the mobile, wireless, communication device and modify the associated rule.

9. The system of claim 1, wherein the information on the data service uses comprises inbound and outbound telephone voice information, inbound and outbound text information, and changes to the application data within the mobile, wireless communication device, and wherein the alert monitor program is configured to analyze the contextual information to determine if the data service use for the mobile, wireless, communication device is not allowed, with the contextual information comprising a combination of two or more of text, files, pictures, and audio information associated with the data service uses.

10. The system of claim 9, wherein the information on the data service uses further comprises a change to an address book, a change to a calendar, a change to a task, inbound and outbound email information, and inbound and outbound instant messaging information, and further includes inbound and outbound multimedia information, a web browser request, and/or an application installation.

11. The system of claim 10, wherein the alert is provided to the mobile, wireless, communication device to prevent the data service use that is not allowed based on the rules stored in the permissions database.

12. A mobile communications device comprising:
a memory configured to store programs and data;
a processor, coupled to the memory, configured to run the programs stored in the memory; and
a communications port configured to wirelessly communicate with a data center;
wherein the programs comprise a data monitor program configured to:
monitor data service uses of the mobile communications device, wherein the mobile communication device comprises a cell phone, a personal digital assistant, or a Smartphone, and wherein the data services for the mobile, wireless communication device comprise a location determination application;
compile information, including contextual information, of the data service uses; and
transmit the information to the data center via the communications port; and
wherein the data service uses, for data services associated with the mobile communication device, comprise:
inbound and outbound communications of the mobile communication device;
additions, modifications, and/or deletions within the mobile communication device to applications; and
additions, modifications, and/or deletions within the mobile communication device to application data.

13. The mobile communications device of claim 12, wherein the data services comprise a phone application and a text application, wherein the information comprises:
telephone call information for a phone application data service use, including associated originating or destination telephone number and contextual data;
messages information for a text application data service use, including an associated telephone number along with contextual data; and
wherein the contextual information comprises a combination of two or more of text, files, pictures, and audio information associated with the data service uses.

14. The mobile communications device of claim 13, wherein the data services further comprise an email application, an instant messaging application, an address book application, a calendar application, a tasks application, a web browser application, an installation application, and a multimedia application; and
wherein the information comprises:
email information for an email application data service use, including email address, date/time stamp, and contextual data;
instant messaging information for an instant messaging application data service use, including username, date/time stamp, and contextual data;
address book information for an address book application data service use, including date/time stamp and contextual data associated with the address book application data service use;
calendar information for a calendar application data service use, including date/time stamp and contextual data associated with the calendar application data service use;
task information for a task application data service use, including date/time stamp and contextual data associated with the task application data service use;
web browser information for a web browser application data service use, including date/time stamp, uniform resource locator, and contextual data associated with the web browser application data service use;
installation application information for an installation application data service use, including date/time stamp and contextual data associated with the installation application data service use; and
multimedia application information for a multimedia application data service use, including date/time stamp and contextual data associated with the multimedia application data service use.

15. The mobile communications device of claim 12, wherein the data monitor program is further configured to prevent an unauthorized data service use based on information received from the data center via the communications port.

16. A method of monitoring a mobile communication device configured to monitor data service uses, compile information, including corresponding contextual information associated with the data service uses, and provide the information associated with the data service uses to a remote data center, the method comprising:
storing rules associated with the data service uses for the mobile communication device at the remote data center, wherein the data service uses, for data services associated with the mobile communication device, comprise:
inbound and outbound communications of the mobile communication device;
additions, modifications, and/or deletions within the mobile communication device to applications; and
additions, modifications, and/or deletions within the mobile communication device to application data;
receiving the information, including the corresponding contextual information, for a data service use from the mobile communication device, wherein the corresponding contextual information includes a combination of two or more of text, message information, files, pictures, or audio information associated with the data service uses;
storing the information for the data service use;
checking the data service use based on the information to a corresponding rule associated with the data service use;
providing an alert that the data service use is unauthorized based on the corresponding rule;
providing for an administrator web-based access to the rules and the data service uses stored; and
permitting the administrator to modify the rules.

17. The method of claim 16, further comprising providing the alert to the mobile communication device to prevent the data service use that is unauthorized, and wherein the checking is based at least in part on whether an identity that is in communication with the mobile communication device and associated with the data service use is an authorized entry within an address book associated with the mobile communication device.

18. The method of claim 16, further comprising providing the alert to an administrator to notify of the data service use that is unauthorized, wherein the checking analyzes the information, including the contextual information, to determine that the data service use for the mobile communication device is unauthorized.

19. The method of claim 16, wherein the data service uses comprise a phone application use, a text application use, and an email application use, wherein the checking is based at least in part on whether an identity that is in communication with the mobile communication device and associated with the data service use is an authorized entry within an address book associated with the mobile communication device, and wherein the information further comprises:
telephone call information for a phone application data service use, including associated originating or destination telephone number and contextual data; and
messages information for a message application data service use, including at least one of associated originating or destination email address, username, or telephone number along with contextual data.

20. The method of claim 19, wherein the data service uses comprise an instant messaging application data service use, an address book application data service use, a calendar application data service use, a tasks application data service use, an installation application data service use, a web browser application data service use, and a multimedia application data service use, and wherein the information further comprises:
changes to application data information for at least one of an address book or a calendar along with contextual data;
instant messaging information for the instant messaging application data service use, including username, date/time stamp, and contextual data;
task information for the tasks application data service use, including date/time stamp and contextual data associated with a task addition, modification, and/or deletion;
web browser information for the web browser application data service use, including date/time stamp, uniform resource locator, and contextual data;
installation application information for the installation application data service use, including date/time stamp and contextual data associated with the installation application data service use; and
multimedia application information for the multimedia application data service use, including date/time stamp and contextual data associated with the multimedia application data service use.

21. The method of claim 16, wherein the mobile communication device comprises a cell phone, a personal digital assistant, or a Smartphone, wherein the data service use for the mobile, wireless communication device comprises a location determination application, and wherein the information includes identification of the mobile communication device along with a date and time associated with the data service use.

22. A method of monitoring a mobile communication device, the method comprising:
monitoring data service uses of the mobile communication device, wherein the data service uses, for data services associated with the mobile communication device, comprise:
inbound and outbound communications of the mobile communication device; and
additions, modifications, and/or deletions within the mobile communication device to application data;
detecting an initiation of a data service use;
capturing information, including contextual information, associated with the data service use based on the detecting, wherein the information comprises message information for a message application data service use, including at least one of associated originating or destination email address, username, or telephone number along with contextual data, wherein the data services comprise a phone application and/or a text application, and wherein the contextual information comprises any combination of text, files, pictures, and audio information associated with the data service use;
compiling the information based on the capturing; and
transmitting the information to a data center to store the information.

23. The method of claim 22, wherein the information comprises telephone call information for a phone application data service use, including associated originating or destination telephone number and contextual data.

24. The method of claim 23, wherein the data service uses further comprise an addition, modification, and/or deletion within the mobile, wireless, communication device of an email application, an instant messaging application, an address book application, a calendar application, a tasks application, a web browser application, an installation application, and a multimedia application, and wherein the information comprises:

email information for an email application data service use, including email address, date/time stamp, and contextual data;

instant messaging information for the instant messaging application data service use, including username, date/time stamp, and contextual data;

address book information for the address book application, including date/time stamp and contextual data associated with the addition, modification, and/or deletion to the address book application;

calendar information for the calendar application, including date/time stamp and contextual data associated with the addition, modification, and/or deletion to the calendar application;

task information for the tasks application, including date/time stamp and contextual data associated with the addition, modification, and/or deletion to the tasks application;

web browser information for the web browser application, including date/time stamp, uniform resource locator, and contextual data;

installation application information for the installation application, including date/time stamp and contextual data associated with the addition, modification, and/or deletion to the installation application; and multimedia application information for the multimedia application, including date/time stamp and contextual data associated with the addition, modification, and/or deletion to the multimedia application.

25. The method of claim 22, wherein the mobile communication device comprises a cell phone, a personal digital assistant, or a smartphone, and wherein the data service use for the mobile, wireless communication device comprises a location determination application use.

26. The method of claim 22, further comprising:
receiving, from the data center, authorization information regarding the data service use; and
preventing the data service use if the authorization information indicates that the data service use is unauthorized.

27. A non-transitory computer-readable medium on which is stored a computer program for performing a method of monitoring a mobile communication device configured to monitor data service uses, compile information, including corresponding contextual information associated with the data service uses, and provide the information associated with the data service uses to a remote data center, the method comprising:
storing rules associated with the data service uses for the mobile communication device at the remote data center, wherein the data service uses, for data services associated with the mobile communication device, comprise:
inbound and outbound communications of the mobile communication device;
additions, modifications, and/or deletions within the mobile communication device to applications; and
additions, modifications, and/or deletions within the mobile communication device to application data;
receiving the information, including the corresponding contextual information, for a data service use from the mobile communication device, wherein the information comprises message information for a message application data service use, including at least one of associated originating email address, destination email address, username, or telephone number along with contextual data, and wherein the contextual information includes a combination of two or more of text, message content, files, pictures, and audio information associated with the data service uses;
storing the information for the data service use;
checking the data service use based on the information to a corresponding rule associated with the data service use, wherein the checking is further based at least in part on whether an identity that is in communication with the mobile communication device and associated with the data service use is an authorized entry within an address book associated with the mobile communication device; and
in response to checking the data service use, performing at least one of:
providing an alert that the data service use is unauthorized to the communication device based on the corresponding rule; and/or
preventing the data service use that is unauthorized on the communication device based on the corresponding rule.

28. The non-transitory computer-readable medium of claim 27, wherein the method further comprises providing the alert to an administrator to notify the administrator of the data service use that is unauthorized, and wherein the checking further analyzes the information, including the contextual information, to determine if the data service use for the mobile communication device is unauthorized.

29. The non-transitory computer-readable medium of claim 27, wherein the data service uses comprise uses of a phone application, a text application, and an email application, and wherein the information comprises telephone call information for a phone application data service use, including associated originating or destination telephone number and contextual data.

30. The non-transitory computer-readable medium of claim 29, wherein the data service uses comprise an email application data service use, an instant messaging application data service use, an address book application data service use, a calendar application data service use, a tasks application data service use, an installation application data service use, a web browser application data service use, and a multimedia application data service use, and wherein the information comprises:
changes to application data information for at least one of an address book or a calendar along with contextual data;
instant messaging information for the instant messaging application data service use, including username, date/time stamp, and contextual data;
task information for the task application data service use, including date/time stamp and contextual data associated with a task addition, modification, and/or deletion;
web browser information for the web browser application data service use, including date/time stamp, uniform resource locator, and contextual data;
installation application information for the installation application data service use, including date/time stamp and contextual data associated with the installation application data service use; and
multimedia application information for the multimedia application data service use, including date/time stamp and contextual data associated with the multimedia application data service use.

31. A non-transitory computer-readable medium on which is stored a computer program for performing a method of monitoring a mobile communication device, the method comprising:
- monitoring data service uses of the mobile communication device, wherein the data service uses, for data services associated with the mobile communication device, comprise:
  - inbound and outbound communications of the mobile communication device;
  - any additions, modifications, and/or deletions within the mobile communication device to applications; and
  - any additions, modifications, and/or deletions within the mobile communication device to application data;
- detecting an initiation of a data service use;
- capturing information, including contextual information, associated with the data service use based on the detecting, wherein the information associated with the data service uses comprise message information for a message application data service use, including at least one of associated originating or destination email address, username, or telephone number along with contextual data, wherein the data service uses comprise a phone application use and/or a text application use, and wherein the contextual information comprises any combination of text, files, pictures, and audio information associated with the data service uses;
- compiling the information based on the capturing; and
- transmitting the information of the data service use to a data center to store the information.

32. The non-transitory computer-readable medium of claim 31, wherein the information comprises telephone call information for a phone application data service use, including associated originating or destination telephone number and contextual data.

33. The non-transitory computer-readable medium of claim 32, wherein the data service uses further comprise an email application data service use, an instant messaging application data service use, an address book application data service use, a calendar application data service use, a tasks application data service use, a web browser application data service use, an installation application data service use, and a multimedia application data service use, and wherein the information comprises:
- email information for the email application data service use, including email address, date/time stamp, and contextual data;
- instant messaging information for the instant messaging application data service use, including username, date/time stamp, and contextual data;
- address book information for the address book application data service use, including date/time stamp and contextual data associated with the address book application data service use;
- calendar information for the calendar application data service use, including date/time stamp and contextual data associated with the calendar application data service use;
- task information for the tasks application data service use, including date/time stamp and contextual data associated with the tasks application data service use;
- web browser information for the web browser application data service use, including date/time stamp, uniform resource locator, and contextual data;
- installation application information for the installation application data service use, including date/time stamp and contextual data associated with the installation application data service use; and
- multimedia application information for the multimedia application data service use, including date/time stamp and contextual data associated with the multimedia application data service use.

34. The non-transitory computer-readable medium of claim 31, wherein the method:
- receiving, from the data center, authorization information regarding the data service use; and
- preventing the data service use if the authorization information indicates that the data service use is unauthorized.

\* \* \* \* \*

UNITED STATES PATENT AND TRADEMARK OFFICE
CERTIFICATE OF CORRECTION

| | | |
|---|---|---|
| PATENT NO. | : 11,089,110 B2 | Page 1 of 1 |
| APPLICATION NO. | : 16/752572 | |
| DATED | : August 10, 2021 | |
| INVENTOR(S) | : Robert A. Lotter and Timothy S. Allard | |

It is certified that error appears in the above-identified patent and that said Letters Patent is hereby corrected as shown below:

In the Claim

In Column 40, Line 35, Claim 34 change "wherein the method:" to --wherein the method further comprises:--

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*